US010419152B2

(12) United States Patent
Hanneman, Jr.

(10) Patent No.: US 10,419,152 B2
(45) Date of Patent: Sep. 17, 2019

(54) COMMUNICATION NETWORK EMPLOYING NETWORK DEVICES WITH PACKET DELIVERY OVER PRE-ASSIGNED OPTICAL CHANNELS

(71) Applicant: Tevetron, LLC, New Berlin, WI (US)

(72) Inventor: Raymond J. Hanneman, Jr., New Berlin, WI (US)

(73) Assignee: Tevetron, LLC, New Berlin, WI (US)

( * ) Notice: Subject to any disclaimer, the term of this patent is extended or adjusted under 35 U.S.C. 154(b) by 120 days.

(21) Appl. No.: 15/559,281

(22) PCT Filed: Mar. 23, 2016

(86) PCT No.: PCT/US2016/023678
§ 371 (c)(1),
(2) Date: Sep. 18, 2017

(87) PCT Pub. No.: WO2016/154248
PCT Pub. Date: Sep. 29, 2016

(65) Prior Publication Data
US 2018/0091251 A1    Mar. 29, 2018

Related U.S. Application Data

(60) Provisional application No. 62/138,102, filed on Mar. 25, 2015.

(51) Int. Cl.
H04J 14/02      (2006.01)
G02B 6/293      (2006.01)
(Continued)

(52) U.S. Cl.
CPC ............ *H04J 14/0256* (2013.01); *G02B 6/00* (2013.01); *G02B 6/293* (2013.01); *H04B 10/27* (2013.01);
(Continued)

(58) Field of Classification Search
None
See application file for complete search history.

(56) References Cited

U.S. PATENT DOCUMENTS 6,826,368 B1 * 11/2004 Koren ................. H04J 14/0227
370/466
2002/0105692 A1 * 8/2002 Lauder ................ H04J 14/0208
398/83
(Continued)

FOREIGN PATENT DOCUMENTS

WO    WO2007084597 A2    7/2007

*Primary Examiner* — Darren E Wolf
(74) *Attorney, Agent, or Firm* — Gordon & Jacobson, P.C.

(57) ABSTRACT

An apparatus that includes one or more electrical or optical I/O ports that interface to external communication equipment, one or more optical ports that interface to an optical transport network that carries wavelength-division-multiplexed (WDM) optical signals, one or more tunable optical transceivers, and packet switching logic. The apparatus is configured to perform packet processing operations for ingress and egress data frames or packets. The apparatus can further include control circuitry that can take part in an automatic provisioning process that configures the tunable optical transceiver units of the network device, specifically configuring the optical channels/wavelengths of the optical signals that are transmitted by the tunable optical transceivers. The apparatus can also implement a method of processing and/or managing the optical channels/wavelengths of the optical signals that are transmitted by the tunable optical transceivers based upon the destination address of ingress data frames or packets. Multiple units can interface to the optical transport network for communication of optical packet data between the units over the optical transport network as described herein.

21 Claims, 30 Drawing Sheets

(51) Int. Cl.
*H04B 10/27* (2013.01)
*H04B 10/40* (2013.01)
*H04Q 11/00* (2006.01)
*G02B 6/00* (2006.01)
*G02B 6/12* (2006.01)
*H04L 12/46* (2006.01)
*H04L 29/12* (2006.01)

(52) U.S. Cl.
CPC ............. *H04B 10/40* (2013.01); *H04J 14/02* (2013.01); *H04J 14/0201* (2013.01); *H04J 14/0272* (2013.01); *H04J 14/0283* (2013.01); *H04Q 11/0005* (2013.01); *H04Q 11/0066* (2013.01); *G02B 6/12026* (2013.01); *H04L 12/4633* (2013.01); *H04L 12/4641* (2013.01); *H04L 61/2007* (2013.01); *H04Q 2011/0016* (2013.01); *H04Q 2011/0073* (2013.01)

(56) References Cited

U.S. PATENT DOCUMENTS

| | | | |
|---|---|---|---|
| 2005/0041933 A1* | 2/2005 | Meadowcroft | G02B 6/4201 385/92 |
| 2013/0223794 A1* | 8/2013 | Boduch | H04J 14/0204 385/24 |
| 2014/0087577 A1 | 3/2014 | Oki | |
| 2014/0270764 A1 | 9/2014 | Rothenberg | |

* cited by examiner

Network Delivery Tables for IOLM unit

Transmit Table
   Address Type | Destination Address | SFP ID | Tx Wavelength/
                                                                                                Channel ID Receive Table
  SFP ID | Rx Wavelength/Channel ID | Electrical I/O Port ID

Figure 4

IOLM Unit 1

| SFP Port ID | Assigned Rx Wavelength/ Channel ID | Electrical I/O Port ID | Destination Address | List of Supported Tx Wavelength/ Channel IDs/In-Service Flags/ Destination Addresses |
|---|---|---|---|---|
| 1 | C1 | 1 | DA1 | (C1, ISF, DA), (C2,ISF, DA), (C3, ISF, DA), (C4, ISF, DA) ... |
| 2 | C2 | 2 | DA2 | (C1, ISF, DA), (C2,ISF, DA), (C3, ISF, DA), (C4, ISF, DA) ... |
| ... | | | | |

Figure 8A

IOLM Unit 2

| SFP Port ID | Assigned Rx Wavelength/ Channel ID | Electrical I/O Port ID | Destination Address | List of Supported Tx Wavelength/ Channel IDs/In-Service Flags/ Destination Addresses |
|---|---|---|---|---|
| 1 | C3 | 1 | DA3 | (C1, ISF, DA), (C2,ISF, DA), (C3, ISF, DA), (C4, ISF, DA) ... |
| 2 | C4 | 2 | DA4 | (C1, ISF, DA), (C2,ISF, DA), (C3, ISF, DA), (C4, ISF, DA) ... |
| ... | | | | |

Figure 8B

| IOLM Unit 3 | | | |
|---|---|---|---|
| SFP Port ID | Assigned Rx Wavelength/ Channel ID | Electrical I/O Port ID | Destination Address | List of Supported Tx Wavelength/ Channel IDs/In-Service Flags/ Destination Addresses |
| 1 | C5 | 1 | DA5 | (C1, ISF, DA), (C2,ISF, DA), (C3, ISF, DA), (C4, ISF, DA) ... |
| 2 | C6 | 2 | DA6 | (C1, ISF, DA), (C2,ISF, DA), (C3, ISF, DA), (C4, ISF, DA) ... |
| ... | | | | |

Figure 8C

| IOLM Unit 4 | | | |
|---|---|---|---|
| SFP Port ID | Assigned Rx Wavelength/ Channel ID | Electrical I/O Port ID | Destination Address | List of Supported Tx Wavelength/ Channel IDs/In-Service Flags/ Destination Addresses |
| 1 | C7 | 1 | DA7 | (C1, ISF, DA), (C2,ISF, DA), (C3, ISF, DA), (C4, ISF, DA) ... |
| 2 | C8 | 2 | DA8 | (C1, ISF, DA), (C2,ISF, DA), (C3, ISF, DA), (C4, ISF, DA) ... |
| ... | | | | |

Figure 8D

| IOLM Unit 5 | | | |
|---|---|---|---|
| SFP Port ID | Assigned Rx Wavelength/ Channel ID | Electrical I/O Port ID | Destination Address | List of Supported Tx Wavelength/ Channel IDs/In-Service Flags/ Destination Addresses |
| 1 | C9 | 1 | DA9 | (C1, ISF, DA), (C2,ISF, DA), (C3, ISF, DA), (C4, ISF, DA) ... |
| 2 | C10 | 2 | DA10 | (C1, ISF, DA), (C2,ISF, DA), (C3, ISF, DA), (C4, ISF, DA) ... |
| ... | | | | |

Figure 8E

Static IOLM WDM Configuration

- WDM 4 of IOLM-1 configured to receive/drop optical signal with Rx Wavelength (nm) = 1528.77

WDM 4 of IOLM-2 statically configured to receive/drop optical signal with Rx Wavelength (nm) = 1568.77

- WDM 4 of IOLM-3 statically configured to receive/drop optical signal with Rx Wavelength (nm) = 1567.95

Static IOLM SFP configuration

- SFP ID 1 of IOLM-1 receives the drop optical signal with Rx Wavelength = 1528.77 from WDM4 of IOLM-1
- SFP ID 1 of IOLM-1 transmits with Tx Wavelength = 1568.77 (for communication to IOLM-2)
- SFP ID 2 of IOLM-1 transmits with Tx Wavelength = 1567.77 (for communication to IOLM-3)

- SFP ID 1 of IOLM-2 receives the drop optical signal with Rx Wavelength = 1568.77 from WDM4 of IOLM-2
- SFP ID 1 of IOLM-2 transmits with Tx Wavelength = 1528.77 (for communication to IOLM-1)
- SFP ID 2 of IOLM-2 transmits with Tx Wavelength = 1567.77 (for communication to IOLM-3)

- SFP ID 1 of IOLM-3 receives the drop optical signal with Rx Wavelength = 1567.77 from WDM4 of IOLM-3
- SFP ID 1 of IOLM-3 transmits with Tx Wavelength = 1528.77 (for communication to IOLM-1)
- SFP ID 2 of IOLM-3 transmits with Tx Wavelength = 1568.77 (for communication to IOLM-2)

Figure 11

Network Delivery Tables for IOLM-1

Transmit Table

| Type | Destination Address | SFP ID | Tx Wavelength ID |
|---|---|---|---|
| IPv4 | 192.168.1.2 | 1 | 1568.77 |
| IPv4 | 192.168.1.3 | 2 | 1567.77 |

Receive Table

| SFP ID | Rx Wavelength ID | Electrical I/O Port ID |
|---|---|---|
| 1 | 1528.77 | 1 |

Figure 12A

Network Delivery Tables for IOLM-2

Transmit Table

| Type | Destination Address | SFP ID | Tx Wavelength ID |
|---|---|---|---|
| IPv4 | 192.168.1.1 | 1 | 1528.77 |
| IPv4 | 192.168.1.3 | 2 | 1567.77 |

Receive Table

| SFP ID | Rx Wavelength ID | Electrical I/O Port ID |
|---|---|---|
| 1 | 1568.77 | 1 |

Figure 12B

Network Delivery Tables for IOLM-3

Transmit Table

| Type | Destination Address | SFP ID | Tx Wavelength ID |
|---|---|---|---|
| IPv4 | 192.168.1.1 | 1 | 1528.77 |
| IPv4 | 192.168.1.2 | 2 | 1568.77 |

Receive Table

| SFP ID | Rx Wavelength ID | Electrical I/O Port ID |
|---|---|---|
| 1 | 1567.77 | 1 |

Figure 12C

Static IOLM WDM Configuration

- WDM 4 of IOLM-1 configured to receive/drop optical signal with Rx Wavelength = 1528.77

- WDM 4 of IOLM-2 statically configured to receive/drop optical signal with Rx Wavelength = 1568.77

- WDM 4 of IOLM-3 statically configured to receive/drop optical signal with Rx Wavelength = 1567.95

Static IOLM SFP configuration

- SFP ID 1 of IOLM-1 receives the drop optical signal with Rx Wavelength = 1528.77 from WDM4 of IOLM-1
- SFP ID 1 of IOLM-1 supports transmission at Tx Wavelength = 1568.77 (for communication to IOLM-2) and Tx Wavelength = 1567.77 (for communication to IOLM-3)

- SFP ID 1 of IOLM-2 receives the drop optical signal with Rx Wavelength = 1568.77 from WDM4 of IOLM-2
- SFP ID 1 of IOLM-2 supports transmission at Tx Wavelength = 1528.77 (for communication to IOLM-1) and Tx Wavelength = 1567.77 (for communication to IOLM-3)

- SFP ID 1 of IOLM-3 receives the drop optical signal with Rx Wavelength = 1567.77 from WDM4 of IOLM-3
- SFP ID 1 of IOLM-3 supports transmission at Tx Wavelength = 1528.77 (for communication to IOLM-1) and Tx Wavelength = 1567.77 (for communication to IOLM-2)

Figure 18

Network Delivery Tables for IOLM-1

Transmit Table

| Type | Destination Address | SFP ID | Tx Wavelength ID |
|---|---|---|---|
| IPv4 | 192.168.1.12 | 1 | 1568.77 |
| IPv4 | 192.168.1.13 | 1 | 1567.95 |

Receive Table

| SFP ID | Rx Wavelength ID | Electrical I/O Port ID |
|---|---|---|
| 1 | 1528.77 | 1 |

Figure 19A

Network Delivery Tables for IOLM-2

Transmit Table

| Type | Destination Address | SFP ID | Tx Wavelength ID |
|---|---|---|---|
| IPv4 | 192.168.1.11 | 1 | 1528.77 |
| IPv4 | 192.168.1.13 | 1 | 1567.95 |

Receive Table

| SFP ID | Rx Wavelength ID | Electrical I/O Port ID |
|---|---|---|
| 1 | 1568.77 | 1 |

Figure 19B

Network Delivery Tables for IOLM-3

Transmit Table

| Type | Destination Address | SFP ID | Tx Wavelength ID |
|------|--------------------|--------|------------------|
| IPv4 | 192.168.1.11 | 1 | 1528.77 |
| IPv4 | 192.168.1.12 | 1 | 1568.77 |

Receive Table

| SFP ID | Rx Wavelength ID | Electrical I/O Port ID |
|--------|------------------|------------------------|
| 1 | 1567.95 | 1 |

Figure 19C

| ITU Channel (xx) | Frequency (THz) | Wavelength (nm) | ITU Channel (xx) | Frequency (THz) | Wavelength (nm) |
| --- | --- | --- | --- | --- | --- |
| 11 | 191.1 | 1568.77 | 37 | 193.7 | 1547.72 |
| 12 | 191.2 | 1567.95 | 38 | 193.8 | 1546.92 |
| 13 | 191.3 | 1567.13 | 39 | 193.9 | 1546.12 |
| 14 | 191.4 | 1566.31 | 40 | 194.0 | 1545.32 |
| 15 | 191.5 | 1565.50 | 41 | 194.1 | 1544.53 |
| 16 | 191.6 | 1564.68 | 42 | 194.2 | 1543.73 |
| 17 | 191.7 | 1563.86 | 43 | 194.3 | 1542.94 |
| 18 | 191.8 | 1563.05 | 44 | 194.4 | 1542.14 |
| 19 | 191.9 | 1562.23 | 45 | 194.5 | 1541.35 |
| 20 | 192.0 | 1561.42 | 46 | 194.6 | 1540.56 |
| 21 | 192.1 | 1560.61 | 47 | 194.7 | 1539.77 |
| 22 | 192.2 | 1559.79 | 48 | 194.8 | 1538.98 |
| 23 | 192.3 | 1558.98 | 49 | 194.9 | 1538.19 |
| 24 | 192.4 | 1558.17 | 50 | 195.0 | 1537.40 |
| 25 | 192.5 | 1557.36 | 51 | 195.1 | 1536.61 |
| 26 | 192.6 | 1556.55 | 52 | 195.2 | 1535.82 |
| 27 | 192.7 | 1555.75 | 53 | 195.3 | 1535.04 |
| 28 | 192.8 | 1554.94 | 54 | 195.4 | 1534.25 |
| 29 | 192.9 | 1554.13 | 55 | 195.5 | 1533.47 |
| 30 | 193.0 | 1553.33 | 56 | 195.6 | 1532.68 |
| 31 | 193.1 | 1552.52 | 57 | 195.7 | 1531.90 |
| 32 | 193.2 | 1551.72 | 58 | 195.8 | 1531.12 |
| 33 | 193.3 | 1550.92 | 59 | 195.9 | 1530.33 |
| 34 | 193.4 | 1550.12 | 60 | 196.0 | 1529.55 |
| 35 | 193.5 | 1549.32 | 61 | 196.1 | 1528.77 |
| 36 | 193.6 | 1548.51 | | | |

Figure 22

| MAC destination address | MAC source address | 802.1Q tag (optional) | Ethertype or length | Payload | Frame check sequence (32-bit CRC) |
|---|---|---|---|---|---|
| 6 octets (bytes) | 6 octets | (4 octets) | 2 octets | 46(42)–1500 octets | 4 octets |

COMMUNICATION NETWORK EMPLOYING NETWORK DEVICES WITH PACKET DELIVERY OVER PRE-ASSIGNED OPTICAL CHANNELS

BACKGROUND

1. Field

The present application relates to networks, systems and methods for optical communication.

2. State of the Art

The OSI Model is a conceptual model that characterizes and standardizes the communication functions of a telecommunication or computing system without regard of its underlying internal structure and technology. The goal of the OSI Model is the interoperability of diverse communication systems with standard protocols. The OSI model partitions the communication functions into seven layers as follows:

Layer 1: Physical Layer
Layer 2: Data Link Layer
Layer 3: Network Layer
Layer 4: Transport Layer
Layer 5: Session Layer
Layer 6: Presentation Layer
Layer 7: Application Layer Each one of layers 2-7 serve the layer above it, and each one of layers 1-6 is served by the layer below it. For example, a layer that provides error-free communications across a network provides the path needed by applications above it, while it calls the next lower layer to send and receive packets that comprise the contents of that path. Two instances at the same layer are visualized as connected by a horizontal connection in that layer.

Layer 1 (Physical Layer) of the OSI Model performs the following major tasks:

- it defines the electrical and physical specifications of the data connection;
- it defines the relationship between a device and a physical transmission medium (e.g., copper wires, fiber optical cable, radio frequency over the air);
- it defines transmission mode (e.g., simplex, half duplex, full duplex); and
- it defines a network topology (such as a bus, mesh, or ring being some of the most common).

Examples of common Physical Layers include wired Ethernet Physical Layers (such as 100BASE-T and 1000BASE-T), Wi-Fi Physical Layers (such as 802.11 PHY), DSL, ISDN, T1 and E1 and other carrier links, SONET/SDH, optical Physical Layers such (SONET/SDH, OTN, CWDM-ITU-T G.694.2, and DWDM-ITU-T G.694.1).

Layer 2 (Data Link Layer) of the OSI Model provides node-to-node transfer of datagrams which are more specifically referred to as Layer 2 protocol data units or frames. Thus, the Data Link Layer provides a link that communicates Layer 2 frames between two directly connected nodes. It detects and possibly corrects errors that may occur in the Physical Layer. For this purpose, the Data Link Layer protocols defines structures for the Layer 2 frames that are transferred from node-to-node. The Data Link Layer also defines the protocol to establish and terminate a connection between two physically connected devices. It can also define the protocol for flow control between them. Examples of common Data Link Layers include IEEE 802 networks (such as 802.3 Ethernet, 802.11 Wi-Fi, 802.15.4 Short-range Wireless, and 802.16 WiMax), Frame Relay, FDDI, HDLC, High-Level Data Link Control, and ITU-T G.hn Data Link Layer.

Note that the IEEE 802 networks divide the Data Link Layer into two sublayers: the Media Access Control (MAC) sublayer (which is responsible for controlling how devices in a network gain access to data and permission to transmit it) and the Logical Link Control (LLC) sublayer (which is responsible for identifying network layer protocols and then encapsulating them and controls error checking and packet synchronization). The MAC and LLC sublayers of such IEEE 802 networks (such as 802.3 Ethernet, 802.11 Wi-Fi, 802.15.4 Short-range Wireless, and 802.16 WiMax) operate as the Data Link Layer.

Layer 3 (Network Layer) and Layer 4 (Transport Layer) of the OSI Model provides the functional and procedural means of transferring datagrams (which are more specifically referred to as packets or packet data) from one node to another over connections provide by one or more networks. The Internet Protocol (IP) is commonly used as part of the Network Layer for relaying packet data across network boundaries. Its routing function enables internetworking, and essentially establishes the Internet. IP has the task of delivering packet data from the source host to the destination host based on the IP addresses in the packet data headers. For this purpose, IP defines structures for the packet data where such structures encapsulate the data to be delivered. It also defines addressing methods that are used to label the packet data with source and destination address information. The Transport Layer controls the reliability of a given link through flow control, packet segmentation/desegmentation, and error control. Some protocols are state-oriented and connection-oriented. This means that the Transport Layer can keep track of the segments and retransmit those that fail. The Transport Layer also provides the acknowledgement of the successful data transmission and sends the next data if no errors occurred. The Transmission Control Protocol (TCP) and the User Datagram Protocol (UDP), which usually reside on top of the Internet Protocol (IP), are examples of protocols that embody the Transport Layer.

Layer 5 (Session Layer) of the OSI Model controls the dialogues (connections) between nodes. It establishes, manages and terminates the connections between nodes. It provides for full-duplex, half-duplex, or simplex operation, and establishes checkpointing, adjournment, termination, and restart procedures. The Session Layer is commonly implemented explicitly in application environments that use remote procedure calls.

Layer 6 (Presentation Layer) of the OSI Model establishes context between Application Layer entities, in which the Application Layer entities may use different syntax and semantics if the presentation service provides a big mapping between them. If a mapping is available, presentation service data units are encapsulated into session protocol data units, and passed down the protocol stack. The Presentation Layer provides independence from data representation (e.g., encryption) by translating between application and network formats. The Presentation Layer transforms data into the form that the Application Layer accepts. The Presentation Layer formats and encrypts data to be sent across a network. It is sometimes called the Syntax Layer.

Layer 7 (Application Layer) of the OSI Model is closest to the end user, which means both the Application Layer and the user interact directly with the software application. This layer interacts with software applications that implement a communicating component. Such application programs fall outside the scope of the OSI model. The Application Layer typically functions to identify communication partners, determine resource availability, and synchronize communication. When identifying communication partners, the Application Layer determines the identity and availability of communication partners for an application with data to transmit. When determining resource availability, the Application Layer must decide whether sufficient network or the requested communication exists. In synchronizing communication, all communication between applications requires cooperation that is managed by the Application Layer.

Layer 2 switching or a Layer 2 switch operates at the Data Link Layer (e.g., the MAC sublayer for Ethernet) and typically relays Layer 2 frames (such as Ethernet frames) to specific switch ports based on the destination addresses (e.g., destination MAC addresses for Ethernet) of the Layer 2 frames. The destination address, also commonly referred to as a physical address, is a unique identifier assigned to a network interface support Layer 2 data communications. The destination address of a given Layer 2 frame is the unique identifier assigned to the network interface of the destination network device that is intended to receive the given Layer 2 frame.

For illustration, FIG. 23A shows the structure of an 802.3 Ethernet Frame, which includes a MAC destination address of 6 octets (bytes), a MAC source address of 6 octets, an optional 801.1Q tag of 4 octets, an Ethertype or length field of 2 octets, a payload of 46 (or 42) to 1500 octets, and a Frame check sequence (32-bit CRC) of 4 octets. Note that the 802.3 Ethernet frame of FIG. 22A starts following a seven-octet preamble and one-octet start frame delimiter, both of which are part of the Ethernet packet enveloping the Ethernet frame.

Layer 3 routing or a Layer 3 router or switch operates at the Network Layer and performs IP data packet routing (where an IP data packet is encapsulated in a Layer 2 frame that is directed to a specific next-hop physical address) based on the destination IP address specified in the header of the IP data packet. An IP address is a numerical label assigned to a network interface for data communications using the IP. The designers of the initial version of the IP (IPv4) defined an IP address as a 32-bit number. A new version of IP (IPv6) that uses 128-bit numbers for the IP address was standardized as RFC 2460 in 1998 and its deployment has been ongoing since the mid-2000s. The destination IP address of a given IP data packet is the unique numerical label (32-bits for IPv4 or 128-bits for IP v6) that is assigned to the network interface that is intended to receive the given IP packet.

For illustration, FIG. 23B shows the structure of a TCP/IP packet for IPv4. The packet includes a header (labeled "IP Header") and a TCP part. The header includes both a source IP address (labeled "Source Address") and a destination IP address (labeled "Destination Address").

Switching can also be performed at higher layers. For example, Layer-4 switching provides for network address translation and/or load distribution. Layer-7 switching distributes loads based on Uniform Resource Locator URL or by some installation-specific technique to recognize application-level transactions. Layer-7 switching can also include a web cache and participate in a content delivery network.

A virtual local area network (VLAN) is a broadcast domain that is partitioned and isolated in a computer network at the Data Link Layer. A broadcast domain is a logical division of a computer network, in which all nodes can reach each other by broadcast at the Data Link Layer. A broadcast domain can be within the same LAN segment or it can be bridged to other LAN segments. VLANs allow network administrators to group network devices or hosts together even if the network devices are not on the same network switch. This can greatly simplify network design and deployment, because VLAN membership can be configured through software. Without VLANs, grouping networking devices according to their resource needs necessitates the labor of relocating nodes or rewiring data links. VLAN membership can be classified by port, MAC address, protocol type, or IP Subnet Address. For the case of classification by port, a VLAN identifier is associated with a port of network switch such that the particular network interface connected to that port is a member of the VLAN identified by the corresponding VLAN identifier. For the case of classification by MAC address, a VLAN identifier is associated with a MAC address of a particular network interface such that the particular network interface is a member of the VLAN identified by the corresponding VLAN identifier. For the case of classification by protocol type, a VLAN identifier is associated with a particular protocol type such that a network interface that communicates using the particular protocol type is a member of the VLAN identified by the corresponding VLAN identifier. For the case of classification by IP Subnet Mask, a VLAN identifier is associated with a particular IP Subnet Mask such that network interfaces with assigned IP addresses that fall within the IP address range defined by the particular Subnet Mask are a member of the VLAN identified by the corresponding VLAN identifier.

IEEE 802.1Q is a networking standard that supports VLANs on an Ethernet network. The IEEE 802.1Q standard defines a system of VLAN tagging for Ethernet frames and the accompanying procedures to be used by Ethernet bridges and switches in handling such Ethernet frames. Portions of the network which are VLAN-aware (i.e., IEEE 802.1Q conformant) can communicate Ethernet frames that include VLAN tags. Specifically, when an Ethernet frame enters the VLAN-aware portion of the network, a tag is added to represent the VLAN membership of the frame's port or the port/protocol combination, depending on whether port-based or port-and-protocol-based VLAN classification is being used. Each Ethernet frame must be distinguishable as being within exactly one VLAN. An Ethernet frame in the VLAN-aware portion of the network that does not contain a VLAN tag is assumed to be flowing on the native (or default) VLAN. The IEEE 802.1Q standard adds a 32-bit field between the source MAC address and the EtherType/length fields of the Ethernet frame, leaving the minimum frame size unchanged at 64 bytes (octets) and extending the maximum frame size from 1,518 bytes to 1,522 bytes. This 32-bit field includes a 16-bit Tag protocol identifier (TPID), a 3-bit Priority code point (PCP), a 1-bit Drop eligible indicator (DEI), and a 12-bit VLAN identifier (VID). The TPID is set to a value of 0x8100 in order to identify the Ethernet frame as an IEEE 802.1Q-tagged Ethernet frame. This field is located at the same position as the EtherType/length field in untagged Ethernet frames, and is thus used to distinguish the tagged Ethernet frame from untagged Ethernet frames. The PCP refers to the IEEE 802.1p class of service and maps to the frame priority level. Values in order of priority are: 1 (background), 0 (best effort), 2 (excellent effort), 3 (critical application), . . . , 7 (network control). These values can be used to prioritize different classes of traffic (voice, video, data, etc.). The DEI may be used separately or in conjunction with the PCP to indicate Ethernet frames eligible to be dropped in the presence of congestion. The VID specifies the VLAN to which the Ethernet frame belongs. The hexadecimal values of 0x000 and 0xFFF are reserved. All other values may be used as VLAN identifiers, allowing up to 4,094 VLANs. The reserved value 0x000 indicates that the frame does not carry a VLAN ID; in this case, the 802.1Q tag specifies only a priority and is referred to as a priority tag. On bridges, VID 0x001 (the default VLAN ID) is often reserved for a management VLAN; this is vendor-specific. The VID value 0xFFF is reserved for implementation use; it must not be configured or transmitted. 0xFFF can be used to indicate a wildcard match in management operations or filtering database entries.

Demand for increased network bandwidth is one of the most critical issues facing current network infrastructures. It is commonplace for current enterprise and campus network infrastructures to employ 10Gb Ethernet and, it is projected that in a majority of these networks will employ 100Gbe Ethernet in the near future. Six key factors driving the demand for network bandwidth are network I/O, virtualization, cloud computing, critical data backup, disaster recovery and network storage.

Current network enterprise and campus networks typically incorporate level-2 and level 3 switching and optical networking, in the form of inter-connects, to provide highly scalable network architecture for the delivery network services, which provide adequate solutions for the current high-speed service. These networks traditionally include an optical transport platform and a switching platform. The optical transport platform is responsible for providing point-to-point physical connections. These physical connections are also referred to as trunks. The switching platform, which typically involves layer 2 and layer 3 switching functions is then responsible for connecting these optical trunks in order to provide an end-to-end logical topology. The point-to-point physical connections provided by the optical transport platform are generally fixed by design. Thus, the connection paths provided by the switching platforms are usually configured manually, and cannot be re-routed without manual intervention. For large networks with many point-to-point physical connections, such manual configuration can be cumbersome, time-consuming, and thus expensive to implement.

SUMMARY

An apparatus for communicating optical packet data over an optical transport network is provided that includes at least one tunable optical transceiver configured to transmit optical packet data for output to the optical transport network, wherein the optical packet data transmitted by a given tunable optical transceiver represents a data frame that is transmitted at a specific characteristic optical wavelength corresponding to a particular destination address that is part of the data frame.

The apparatus can further include configuration circuitry that statically configures the given tunable optical transceiver to transmit optical packet data at the specific characteristic optical wavelength that corresponds to the particular destination address. The configuration circuitry can include a controller that cooperates with an external network manager to carry out an automatic provisioning process that associates a number of destination addresses to different statically provisioned characteristic optical wavelengths, including an association between the particular destination address and the specific characteristic optical wavelength. The apparatus can further include a Transmit Table memory structure that stores an entry that maps the particular destination address to the given tunable optical transceiver that is statically configured to transmit optical packet data at the specific characteristic optical wavelength corresponding to the particular destination address.

In an alternate embodiment, the configuration circuitry comprises a controller that cooperates with an external network manager to carry out an automatic provisioning process that associates a number of destination addresses to different statically provisioned characteristic optical wavelengths, including an association between the particular destination address and the specific characteristic optical wavelength. The apparatus can further include a Transmit Table memory structure that stores an entry that maps the particular destination address to data that represents or otherwise identifies the corresponding characteristic optical wavelength. The apparatus can include control circuitry that accesses the Transmit Table memory structure using the destination address that is part of the data frame and uses the data that represents or otherwise identifies the corresponding characteristic optical wavelength mapped to this destination address by the matching entry of the Transmit Table memory structure to dynamically configure the given tunable optical transceiver such that it transmits at the specific characteristic optical wavelength corresponding to the particular destination address that is part of the data frame. The apparatus can include packet switching logic that forwards on the data frame to one or more devices coupled to the given tunable optical receiver such that the given tunable optical transceiver transmits optical packet data that represents the data frame at the specific characteristic optical wavelength corresponding to the particular destination address that is part of the data frame.

In yet another embodiment, the data frame can include information that represents or otherwise identifies the specific characteristic optical wavelength that corresponds to the particular destination address that is part of the data frame. The apparatus can include control circuitry that uses the information that represents or otherwise identifies the specific characteristic optical wavelength that is part of the data frame to configure the given tunable optical transceiver such that it transmits at the specific characteristic optical wavelength corresponding to the particular destination address that is part of the data frame. The apparatus can include packet switching logic that forwards on the data frame to at least one device coupled to the given tunable optical receiver such that the given tunable optical transceiver transmits optical packet data that represents the data frame at the specific characteristic optical wavelength corresponding to the particular destination address that is part of the data frame.

In one embodiment, the destination address that is part of the data frame can be selected from the group consisting of: i) a Destination IP Address that is part of the header of IP packet data encapsulated by the data frame, ii) a Destination MAC address that is part of the header of the data frame or part thereof, iii) a VLAN identifier that is part of the data frame, and iv) a VLAN identifier associated with the port, protocol, Source IP address, subnet mask or other VLAN classifier associated with the data frame.

In another embodiment, the at least one tunable optical transceiver of the apparatus can include a plurality of tunable optical transceivers.

In still another embodiment, the at least one tunable optical transceiver of the apparatus can have a standardized pluggable form factor.

In yet another embodiment, the at least one tunable optical transceiver of the apparatus can include at least one transmit function that transmits at a particular characteristic optical wavelength based on configuration information maintained by the tunable optical transceiver.

In one embodiment, the apparatus can include at least one add device that multiplexes the optical packet data transmitted by the at least one tunable optical transceiver into wavelength division multiplexed optical signals transported on the optical transport network. The apparatus can also include at least one drop device that demultiplexes optical packet data signals of a predefined characteristic optical wavelength from the wavelength division multiplexed optical signals transported on the optical transport network for supply, wherein the drop device is configured to supply optical packet data signals of the predefined characteristic optical wavelength to a receive function of an optical transceiver of the apparatus. The drop device can be an athermal array waveguide grating. The apparatus can further include at least one input/output port coupled to external communication equipment and packet switching logic. The receive function of the optical transceiver generates data frames corresponding to the optical packet data signals of the predefined characteristic optical wavelength received from the drop device, and the packet switching logic forwards the data frames to one or devices coupled to the at least one input/output port for delivery of the data frames to the external equipment.

In one embodiment, the packet switching logic can be configured to forward the data frames to one or devices coupled to the at least one input/output port according to one or more entries stored in a Receive Table memory structure of the apparatus, wherein each entry of the Receive Table memory structure maps data that represents or otherwise identifies the receive function of a respective optical transceiver of the apparatus to data that represents or otherwise identifies a respective input/output port of the apparatus.

In another aspect, an optical communication network includes a plurality of units that are coupled to one another by an optical transport network that transports wavelength division multiplexed optical signals, where each unit is also connected to external communication equipment. Furthermore, each given unit includes at least one tunable optical transceiver configured to transmit optical packet data for output to the optical transport network, wherein the optical packet data transmitted by a given tunable optical transceiver represents a data frame that originates from the external communication equipment that is associated with the given unit and is transmitted at a specific characteristic optical wavelength corresponding to a particular destination address that is part of the data frame.

In one embodiment, each given unit can include at least one add device that multiplexes the optical packet data transmitted by the at least one tunable optical transceiver into the wavelength division multiplexed optical signals transported on the optical transport network. Each given unit can also include at least one drop device that demultiplexes optical packet data signals of a predefined characteristic optical wavelength from the wavelength division multiplexed optical signals transported on the optical transport network, wherein the drop device is configured to supply optical packet data signals of the predefined characteristic optical wavelength to a receive function of an optical transceiver of the given unit. Each given unit can further include at least one input/output port coupled to the external communication equipment, and packet switching logic. The receive function of optical transceiver of the given unit generates data frames corresponding to the optical packet data signals of the predefined characteristic optical wavelength received from the drop device, and wherein the packet switching logic forwards the data frames to one or devices coupled to the at least one input/output port for delivery of the data frames to the external equipment.

In one embodiment, the optical transport network can include an optical ring with a number of units coupled to the optical ring by add/drop wavelength division multiplexing devices. The optical transport network can also include one or more direct unit-to-unit optical links.

The network can include a network manager that cooperates by network communication with the plurality of units to carry out an automatic provisioning process that associates a number of destination addresses to different statically provisioned characteristic optical wavelengths for use in configuring the plurality of units of the network.

In one embodiment, the automatic provisioning process can statically configure a tunable optical transceiver of a respective unit to transmit optical packet data at the specific characteristic optical wavelength that corresponds to a particular destination address. The automatic provisioning process can also update a Transmit Table memory structure maintained by a respective unit to store an entry that maps the particular destination address to the tunable optical transceiver that is statically configured to transmit optical packet data at the specific characteristic optical wavelength corresponding to the particular destination address.

In another embodiment, the automatic provisioning process can update a Transmit Table memory structure maintained by a respective unit to store an entry that maps the particular destination address to data that represents or otherwise identifies the corresponding characteristic optical wavelength. The entries of the Transmit Table memory structure maintained by a respective unit can be used to dynamically configure the transmit function of an optical transceiver of the respective unit to transmit packet data at a specific characteristic optical wavelength corresponding to a particular destination address that is part of the data frame.

BRIEF DESCRIPTION OF THE DRAWINGS

FIG. 4 is a schematic illustration of information stored as entries in a Transmit Table and Receive Table (collectively referred to a "Network Delivery Tables") that can be maintained by an IOLM unit of the network.

FIGS. 8A-8E are examples of data structures that can be maintained by the Network Manager and the IOLM units of the network for use in the automatic provisioning process of FIGS. 7A and 7B.

FIG. 11 is a table describing the static configuration of the WDM components and optical transceiver components of the IOLM units of the network of FIG. 10.

FIG. 12A is a schematic illustration of information stored as entries in a Transmit Table and Receive Table of IOLM-1 of FIG. 10.

FIG. 12B is a schematic illustration of information stored as entries in a Transmit Table and Receive Table of IOLM-2 of FIG. 10.

FIG. 12C is a schematic illustration of information stored as entries in a Transmit Table and Receive Table of IOLM-3 of FIG. 10.

FIG. 18 is a table describing the static configuration of the WDM components and optical transceiver components of the IOLM units of the network of FIG. 17.

FIG. 19A is a schematic illustration of information stored as entries in a Transmit Table and Receive Table of IOLM-1 of FIG. 17.

FIG. 19B is a schematic illustration of information stored as entries in a Transmit Table and Receive Table of IOLM-2 of FIG. 17.

FIG. 19C is a schematic illustration of information stored as entries in a Transmit Table and Receive Table of IOLM-3 of FIG. 17.

FIG. 22 is a table illustrating exemplary ITU optical wavelengths commonly used for Dense-Wavelength-Division Multiplexed (DWDM) optical signals

DETAILED DESCRIPTION OF ILLUSTRATIVE EMBODIMENTS

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
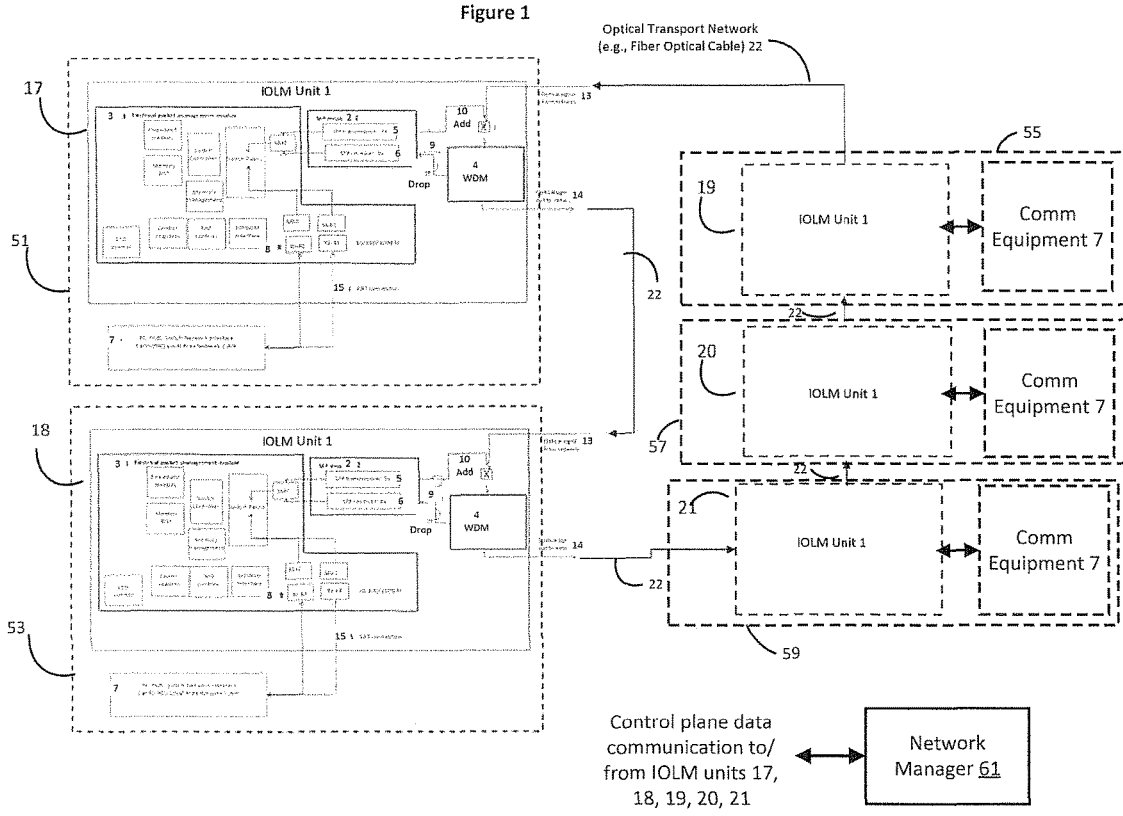
FIG. 1 is a high level schematic diagram of an illustrative network architecture according to the present disclosure.
Figure 2:
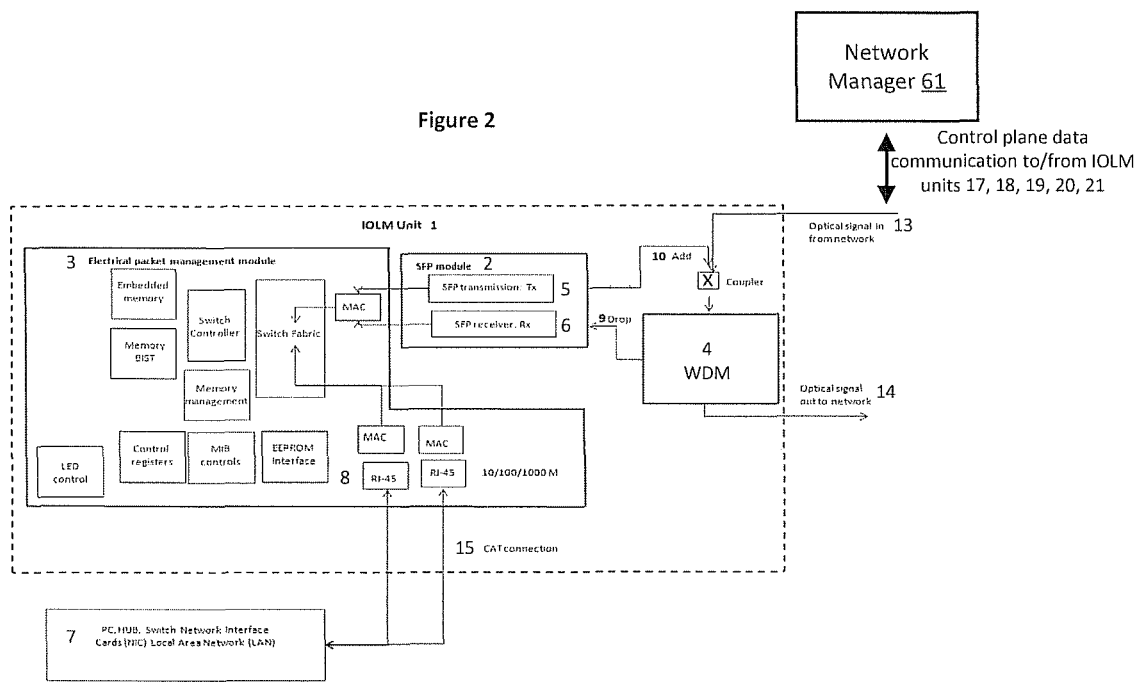
FIG. 2 is a schematic diagram of an embodiment of an IOLM unit, which can be used to implement the IOLM units of the network architecture of FIG. 1.

FIGS. 1 and 2 illustrate an embodiment of an optical communication network that employs Intrinsic Optical Location Module (IOLM) units to establish communication between a number of different communication equipment or network devices. The IOLM units and corresponding communication equipment can be distributed over different locations as part of a campus network or other interconnection of local area networks or devices. FIG. 2 is a detailed schematic view of a respective IOLM unit of FIG. 1. The reference numerals for FIGS. 1 and 2 correspond to the following elements:

1 IOLM unit
2. optical transceiver device (e.g., SFP module)
3. Electrical Packet Management Module
4. WDM device of the Optical Transport Network 22; includes elements that perform multiplexing of an add optical signal 10 into WDM optical signals transported on the Optical Transport Network 22 and demultiplexing of a drop optical signal 9 from the WDM optical signals transported on the Optical Transport Network 22
5. optical transmitter of the optical transceiver device 2
6. optical receiver of the optical transceiver device 2
7. communication equipment connected to the IOLM unit 1
8. Input/Output (I/O) connector port (e.g., RJ-45 connector port) for a network connection between the IOLM unit 1 and the communication equipment 7
9. drop optical signal of a particular frequency/channel that is demultiplexed or dropped from the WDM optical signals transported on the Optical Transport Network 22
10. add optical signal of a particular frequency/channel that is added or multiplexed into the WDM optical signals transported on the Optical Transport Network 22
13. WDM optical signals transported on the Optical Transport Network 22 that are input into the WDM device 4 of the IOLM unit 1
14. WDM optical signals transported on the Optical Transport Network 22 that are output from the WDM device 4 of the IOLM unit 1
15. physical media (such as a network cable) that provides connection between the IOLM unit 1 and the communication equipment 7
17. First IOLM Unit
18. Second IOLM Unit
19. Third IOLM Unit
20. Fourth IOLM Unit
21. Fifth IOLM Unit
22. Optical Transport Network (such as one or more optical fiber cables) that transports optical signals (including WDM optical signals) between IOLM units of the network
51. First location of the First IOLM Unit 17 and corresponding communication equipment 7
53. Second location of the Second IOLM Unit 18 and corresponding communication equipment 7
55. Third location of the Third IOLM Unit 19 and corresponding communication equipment 7
57. Fourth location of the Fourth IOLM Unit 20 and corresponding communication equipment 7

59. Fifth location of the Fifth IOLM Unit 21 and corresponding communication equipment 7

61. Network Manager that communicates with IOLM units 17, 18, 19, 20 and 21 for configuration and management of such IOLM units The network architecture of the present disclosure includes a number of IOLM units that communication with one another over an Optical Transport Network. The IOLM units can be arranged in an individual layout, multiple layout, stacked layout, parallel layout, and serial layout. FIG. 1 illustrates a serial layout of five IOL units labeled 17, 18, 19, 20, and 21 that communicate with one another over a ring-type Optical Transport Network 22. Each IOLM 1 can have the capability of supporting one or more data communication protocols to the communication equipment 7 connected thereto. Such data communication protocols can involve electrical and/or or optical data transmission and reception. For example, such data communication protocols can include, but are not limited to TCP-IP, Ethernet (including 10Base-FL), Fast Ethernet (including 100Base-X) Gigabit Ethernet (including 1.25G, 2.5G, 10G, 100G, 1000Base-X), SONET/SDH (including GR-253-CORE, OC-3, OC-12, OC-48 STM-1, STM-4, STM-16, and G.957), ATM, Fibre Channel: (including FC-1, FC-2, FC-4), FDDI, IBM protocols ESCON and FICON, video protocols (including DVB, SDI, HD-SDI, SMTPE), T1/E1/J1, DS3/E3, IEEE 802.3ae standard, IEEE 802.3ae standard, IEEE 802.3-2000 standards, IEEE 802.3, IEEE 802.3u, ANSI X3T12 TP-PMD standard, ANSI X3.166 FDDI-PMD standard and DSL as well as other data capacity and streaming telecommunications protocols. Each IOLM 1 can also employ one or more connection I/O ports 8 (such as standard RJ-45 Ethernet connection ports) that provide connection to the external communication equipment 7. The communication equipment 7 can be realized by one or more end-point devices, such as PCs, mobile devices, other network devices, and local area network (LAN) or wide area network (WAN) media such as a wired, wireless or optical network of devices. A patch panel can provide connection between the connection ports 8 and the communication equipment 7. As shown in FIG. 1, the IOLM units 17, 18, 19, 20, and 21 and associated communication equipment 7 can be distributed over different locations as desired. The distance between the locations can dictate constraints on the operational requirements of the optical transceivers 2 of the IOLM units as well as the Optical Transport Network 22.

Each IOLM 1 also supports optical data communication over the Optical Transport Network 22, which can include one or more multi-mode or single-mode fiber optic cables as shown. The respective IOLMs 1 can employ one or more optical transceivers 2 (one shown and labeled "SFP module" in FIGS. 1 and 2), a packet management unit 3, and one or more wavelength division multiplexing (WDM) devices 4. The optical transceiver(s) 2 can be a diode laser, SFF, SFP, GBIC, BIDI, BIDI-SFP, BIDI-GBIC, VCSEL chip, and GaAs PIN chip and or a small form-factor pluggable optical transceiver. The optical transceiver 2 performs a transmission (Tx) function that converts electrical data frame signals (e.g., electrical voltage signals representing binary bits of data that make up the electrical data frames) into optical (light) signals that are transported on the Optical Transport Network 22. The optical transceiver 2 also performs a receive (Rx) function that converts optical (light) signals that are supplied thereto into electrical data frames.

The optical transceivers 2 and WDM devices 4 of IOLM units and the Optical Transport Network 22 can be configured in a ring topology that carries WDM optical signals over the ring. The ring can possibly be redundant and provide mechanisms for self-healing as is well known in the communication arts. In the ring topology, the optical signals generated by one or more optical transceivers 2 of an IOLM unit 1 can be supplied to WDM device(s) 4 for multiplexing and transport as part of WDM optical signals transported on the Optical Transport Network 22. Furthermore, the WDM device(s) 4 of the IOLM unit 1 can demultiplex the optical signal of a particular optical channel/wavelength from the WDM optical signals transported on the Optical Transport Network 22 for supply to the receive function of a corresponding optical transceiver 2 of the IOLM unit 1.

The optical transceivers 2 and WDM devices 4 of the IOLM units and the Optical Transport Network 22 can possibly support other network topologies, such as point-to-point topologies, diverse point-to-point topologies, star (point-to-multipoint) topologies, and combination of such topologies such as ring and point-to-point topologies or ring and star topologies. For the point-to-point topologies and star topologies, direct point-to-point optical links can be provided between one or more IOLM unit pairs by the optical transceivers 2 of each respective IOM unit pair. The point-to-point optical links can employ multiple fiber waveguides for the bidirectional optical signals communicated between IOLM unit pairs. Alternatively, the point-to-point optical links can possibly employ a single fiber optic waveguide carrying WDM bidirectional optical signals communicated between IOLM unit pairs as is well known.

The packet management unit 3 of the respective IOLM Unit 1 can include a switch fabric that forwards or moves electrical data frames received by one or more link layer and physical devices (e.g., MAC/PHY devices) that are connected by the demarcation devices (connection port(s) 8) to the communication equipment 7 to one or more link layer and physical devices (e.g., MAC/PHY devices) that are connected to the optical transceiver(s) 2 of the IOLM unit 1 and vice versa. The packet management unit 3 can also include a switch controller that receives and/or stores configuration information pertaining to the optical transceiver(s) 2 of the IOLM unit 1. The switch controller can use such configuration information maintained by the packet management unit 3 of the respective IOLM Unit 1 to configure the operation of the optical transceiver(s) 2 the IOLM unit 1 as described herein. The switch controller can also use such configuration information to control the packet switching operation of the switch fabric as described herein. The switch controller and/or the switch fabric can be realized by programmable microprocessor and/or other programmable logic circuits and/or dedicated hardware and logic circuits such as an ASIC or FPGA.

The WDM device(s) 4 provide an interface between the optical transceiver(s) 2 and the Optical Transport Network 22 in order to multiplex or add the optical signal(s) transmitted by the optical transceiver(s) 2 to WDM optical signals transported on the Optical Transport Network 22 and to demuliplex or drop optical signal(s) of particular optical channel(s)/wavelength(s) transported on the Optical Transport Network 22 and supply such optical signal(s) of particular optical channel(s)/wavelength(s) to the optical transceiver(s) 2 of the IOLM unit 1 for reception. The optical demultiplexing/drop functionality of the WDM device(s) 4 can be realized by an arrayed waveguide grating or AWG (including athermal AWG), a filter (including CWDM, DWDM, WDM filters), a modulator or other suitable optical demultiplexer. The optical multiplexing/add functionality of the WDM device(s) 4 can be realized by an optical coupler, an arrayed waveguide grating or AWG (including athermal AWG) or other suitable optical multiplexer. In one embodiment, the WDM device(s) 4 can support multiple optical channel configurations typically between but not limited to the 5 GHz to 500 GHz spacing. The respective optical channels/wavelengths of the optical signal(s) that are demultiplexed or dropped by the WDM device(s) 4 of the IOLM unit 1 can be fixed or statically assigned by the design of the drop function of the WDM device(s) 4 and can be supplied to predetermined receive function ports of the optical transceiver(s) 2. This architecture allows a particular IOLM unit to receive point-to-point optical communication from any other IOLM unit using the optical channel(s)/wavelength(s) that are demultiplexed or dropped by the WDM device(s) 4 of the particular IOLM unit.

The data frame processing operations of the packet management unit 3 of a respective IOLM unit 1 can logically partitioned into two groups. The first group involves the processing of electrical data plane frames communicated over the Optical Transport Network 22. Such electrical data plane frames encapsulate information generated by end-stations (e.g., which are part of the communication equipment 7) and are forwarded by the switching fabric of the packet management unit 3 of the respective IOLM unit 1 for delivery to the destination end station over the Optical Transport Network 22. From the perspective of the packet management unit 3 of the respective IOLM unit 1, the data plane frames have a destination IP address that refers to the destination end station. The second group involves the processing of control/management plane frames communicated over the Optical Transport Network 22. Such control/management plane frames are generated by the packet management unit 3 of the respective IOLM unit 1 and/or other network devices (including switches and routers) for the creation, operation and management of the network. From the perspective of the packet management unit 3 of the respective IOLM unit 1, control/management plane frames have a destination IP address that refers to the packet management unit 3 of one or more IOLM units and are handled by the referenced destination packet management unit 3 of such IOLM unit(s). Examples of common control plane protocols include ARP and other protocols that glue the network together. Examples of common management plan protocols include Telnet, Secure Shell (SSH), TFTP, SNMP, FTP, NTP, and other management protocols.

The network can also include a Network Manager 61 as shown in FIG. 1. The Network Manager 61 can be configured to use control/management plane frames that are communicated between the Network Manager 61 and the IOLM units 17, 18, 19, 20 and 21 over the Optical Transport Network 22 for configuration and management of such IOLM units. The Network Manager 61 can be realized by a networked computer processing system with one or more network interfaces (e.g., link layer and physical layer devices such as MAC/PHY devices) and optical transceiver) that interface to the Optical Transport Network 22. The networked computer system can be a workstation (including a CPU, memory and persistent file system storage) or a possibly distributed data processing system.

The respective optical transceiver(s) 2 of one or more IOLM units of the network can be tunable and thus can transmit over a number of optical channels/wavelengths. In one embodiment, the optical channels/wavelengths used by the transmit function of the tunable optical transceiver(s) 2 of a given IOLM unit 1 can be statically-provisioned and configured (e.g., tuned) by an automatic provisioning process carried out by the Network Manager 61. The automatic provisioning process can use control/management plane frames that are communicated between the Network Manager 61 and the IOLM units over the Optical Transport Network 22. In this case, the automatic provisioning process derives configuration information that is maintained by the packet management unit 3 of the given IOLM Unit 1. Such configuration information can include information that relates electrical data frame destination addresses to particular statically-provisioned and tuned optical transceiver(s) 2 of the given IOLM unit 1. The switch controller of the packet management unit 3 of the given IOLM Unit 1 can use such configuration information to dynamically control the switching operation of the switch fabric of the packet management unit 3 of the given IOLM Unit 1 such that the switch fabric switches electrical data packets for delivery to the appropriate optical transceiver(s) 2 based on the data frame destination address. The transmit function of the statically-provisioned and tuned optical transceiver(s) 2 performs electrical-to-optical conversion of the electrical data frames employing the statically-provisioned optical channels/wavelengths specified by the automatic provisioning process for output to the Optical Transport Network 22.

In another embodiment, a list of optical channels/wavelengths supported by the transmit function of the tunable optical transceiver(s) 2 of a given IOLM unit 1 can be statically-provisioned by an automatic provisioning process carried out by the Network Manager 61. The automatic provisioning process can use control/management plane frames that are communicated between the Network Manager 61 and the IOLM units over the Optical Transport Network 22. In this case, the automatic provisioning process derives configuration information that is maintained by the packet management unit 3 of the given IOLM Unit 1. Such configuration information can include information that relates electrical data frame destination addresses to particular optical channels/wavelengths supported by the transmit function of the tunable optical transceiver(s) 2 of the given IOLM unit 1. The switch controller of the packet management unit 3 of the given IOLM Unit 1 can use such configuration information to dynamically configure (i.e., tune) the optical channel/wavelength used by the transmit function of the respective optical transceiver(s) 2 and control the switching operation of the switch fabric of the packet management unit 3 of the given IOLM Unit 1 such that the switch fabric forwards or switches electrical data frames for delivery to the appropriate dynamically-tuned optical transceiver(s) 2. The transmit function of the dynamically-tuned optical transceiver(s) 2 performs electrical-to-optical conversion of the electrical data frames employing the optical channels/wavelengths specified by the configuration information for output to the Optical Transport Network 22.

In another embodiment, the configuration information derived by the automatic provisioning process carried out by the Network Manager 61 and maintained by the packet management unit 3 of a given IOLM Unit 1 can also include information that relates the receive functions/ports of certain optical transceiver(s) 2 of a given IOLM Unit 1 to one or more particular media converters and demarcation points or I/O ports 8 of the given IOLM unit 1 that connect to the communication equipment 7. The switch controller of the packet management unit 3 of the given IOLM Unit 1 can use such configuration information to dynamically control the switching operation of the switch fabric of the packet management unit 3 of the given IOLM Unit 1 such that the switch fabric forwards or switches electrical data frames generated by the receive function of a particular optical transceiver 2 for delivery to one or more appropriate media converters and demarcation points or I/O ports 8 of the given IOLM unit 1 as specified by the configuration information. The specified media converter(s) and I/O ports 8 of the given IOLM unit 1 communicates the received electrical data frame to the communication equipment 7 connected thereto.

In one embodiment, the packet management module 3 and optical transceiver(s) 2 of a given IOLM unit 1 can be configured as one or more optical-electrical converters (OECs) each having the ability to couple a first data transmission signal (O/E data frame) of a first type that is supplied to a first I/O port 8, converting the first data transmission signal (optical or electrical) of the first type to a second data transmission signal of the second type (optical data frame) and outputting the second data transmission signal (optical data frame) to the Optical Transport Network 22, for example via the WDM device(s) 4 of FIGS. 1 and 2. The packet management module 3 can include a central processing unit or switch controller that receives user-defined configuration information that is used to configure the operations of the packet management module 3 and optical transceiver(s) 2 in converting the first data transmission signal (optical or electrical) of the first type to the second data transmission signal of the second type (optical data frame) for output to the to the Optical Transport Network 22.

The optical transceiver(s) 2 of a respective IOLM unit 1 can include one or more light transmitters 5 to generate the optical signals at desired wavelengths in support of wavelength-division multiplexing of the optical signals communicated by the system. The light transmitter 5 can be realized by an LED, a solid-state laser, VCSEL chip, GaAs PIN chip or other suitable device. The basic operating principle of the light transmitter 5 is the modulation of an optical signal produced by the light transmitter 5 in accordance with the binary bits of data that make up an egress data frame (e.g., an egress data frame supplied by the communication equipment 7 via demarcation port 8). For example, a laser can be modulated by an external modulator (e.g. a Mach-Zehnder modulator-electrical signals) in accordance with the binary bits of data that make up the egress data frame. Likewise, the optical transceiver(s) 2 of a respective IOLM unit 1 can include one or more optical receivers 6 that receive optical light signals representing ingress data frames and perform optical-to-electrical conversion into corresponding ingress electrical data frames for forwarding by the switch fabric to the appropriate media converter(s) and I/O port(s) 8 of the IOLM unit for supply to the communication equipment 7 connected thereto. The optical receiver 6 typically includes a semiconductor-based photodiode which converts light into electricity using the photoelectric effect. The output of the photo-diode is typically coupled to a transimpedance amplifier and a limiting amplifier or output buffer to produce a digital signal in the electrical domain from the incoming optical signal. Further signal processing (such as clock recovery from data (CDR)) can be applied before the data is passed on.

The respective IOLM units (e.g., IOLM units 17, 18, 19, 20, 21) of the network can connect the external electrical communication equipment 7 (such as 10BASE-T end-stations or network segments, 100BASE-TX end-stations or network segment, and/or 1000BASE-TX or 100BASE-FX Fast Ethernet end-stations or network segments) to the Optical Transport Network 22.

In one embodiment, the Optical Transport Network 22 can carry WDM optical signals as described herein. In this configuration, the IOLM units 1 can employ a variety of optical transceivers 2 known in the art. Such optical transceiver 2 can include an optical transmitter 5 that converts an electrical signal into a modulated light beam (add optical signal 10) for supply by fiber optic waveguide to the WDM device(s) 4, and an optical receiver 6 that receives a modulated light beam (drop optical signal 9) from the WDM device(s) 4 via a fiber optic waveguide and converts it into an electrical signal. The optical transceivers 2 can include tunable and non-tunable diode lasers, transceivers using optical injection locking (OIL) and direct modulation, amplifiers, modulators, optical switches, Brillouin Scattering Induced Transparency (B SIT), which can be used to slow down, speed up, and block light in an optical waveguide and Optical True Time Delay (TTD) devices) of the optical network, including SFP's and XFP form factors and with Ethernet (IEEE 802.3ae standard, IEEE 802.3ae standard, IEEE 802.3-2000 standards, IEEE 802.3, IEEE 802.3u, ANSI X3T12 TP-PMD standard, ANSI X3.166 FDDI-PMD standard), Synchronous Optical Network (SONET), and International Telecommunications Union Synchronous Digital Hierarchy (SDH) compliant transceivers that provide a high speed communications link between computers or communications units over optical fibers, such as used in high throughput fiber optic communications links in local area networks (LAN) and wide area networks (WAN), storage networks, and long distance telecommunication networks using SDH and SONET.

In one embodiment, the optical transceiver(s) 2 of one or more IOLM units can be packaged in accordance with a number of standard form factors which are "hot pluggable" into an IOLM unit chassis or housing. Standard form factors provide standardized dimensions and electrical and optical input/output interfaces that allow devices from different manufacturers to be used interchangeably. Some of the most popular form factors include XENPAK, X2, SFF ("small form factor"), SFP ("small form factor pluggable"), gigabit interface converter (GBIC), XFP (10 Gigabit Small Form Factor Pluggable), and 300 pin MSA (Multisource Agreement). The optical transceivers 2 can provide standard data frame rates of 10/100/1000 Mbps to 1/2/5/10/40/100/400/500 Gbps or other non-standard data frame rates. The electronic processing components of the IOLM units can define the communication protocol. In this case, the optical transceivers 2 can potentially be protocol independent.

In another embodiment, the optical transceiver(s) 2 of one or more IOLM units can be tunable in one or both the C-band and L-bands using wavelengths/frequencies from 200 nm to 3000 nm. The data rates for such tunable optical transceiver(s) 2 can include 10/100/1000 Mbps up to 1/2/5/10/40/100/400/500 Gbps data rates at distances of 1 meter to 3000 kilometers. The optical transceiver(s) 2 can possibly incorporate optical amplification to support distances at the higher end of this range.

In yet another embodiment, the optical transceiver(s) 2 of one or more IOLM units can be realized by a smart optical transceiver that provides for remote control of the wavelength of a tunable transmitter. Such a smart optical transceiver can include a wavelength tunable transceiver at a first end of an optical link, an OAM (Operation/Administration/Maintenance) processor, a PP & Payload processor (proprietary protocol), an optical spectrum analyzer at a second end of the optical link, and a Bit Error Rate Tester (BERT). All of these functions can be can be realized by the functionality of the packet management module 3 and optical transceiver 2 of the IOLM unit. A PP similar to OAM Protocol Data Unit (OAMPDU) (Operation, Administration, and Maintenance Protocol Data Unit) of EFM OAM (Ethernet in the First Mile Operation, Administration, and Maintenance) is a message protocol of changing or monitoring the wavelength of the tunable optical transmitter in the smart optical transceiver in order to maintain the proper delivery parameters. In one configuration, the smart optical transceiver at a first end of the optical link can perform a number of functions specified in IEEE 802.3ah in a passive mode including electrical loopback, EFM, OAM and the PP functions (IEEE 802.3ah: This amendment to IEEE Std 802.3-2002 as amended by IEEE Std 802.3ae-2002, IEEE Std 802.3af-2003, IEEE Std 802.3aj-2003, and IEEE Std 802.3ak-2004 combines a minimal set of extensions to the IEEE 802.3 Media Access Control (MAC) and MAC Control sublayers with a family of Physical (PHY) Layers. These Physical Layers include optical fiber and voice grade copper cable Physical Medium Dependent sublayers (PMDs) for point-to-point connections in subscriber access networks. This amendment also introduces the concept of Ethernet Passive Optical Networks (EPONs), in which a point to multi-point (P2MP) network topology is implemented with passive optical splitters, along with optical fiber PMDs that support this topology. In addition, a mechanism for network Operations, Administration and Maintenance (OAM) is included to facilitate network operation and troubleshooting. To support these innovations, options for unidirectional transmission of frames are provided for 100BASE-X, 1000BASE-X, 10GBASE-R, 10GBASE-W, and 10GBASE-X. In another configuration, the smart transceiver at a first end of the optical link can perform a number of these functions in an active mode wherein the transceiver sends out a commanding message for the adjustment or measurement of the wavelength of the transceiver device over the optical link using PP. The smart transceiver can also be equipped with 1) a circuitry that can adjust the wavelength of a tunable transmitter and 2) a circuitry which can measure a certain parameter of the Tx (transmission) representing the frequency and/or wavelength of the Tx indirectly in the smart transceiver upon receiving a commanding message in PP from the transceiver at a second end of the optical link. The type of the smart transceiver may be a smart SFP transceiver, a smart SFP+ transceiver, a smart XFP transceiver, a smart Duplex transceiver, a smart conventional BiDi transceiver, or a smart SWSF BiDi transceiver.

In still another embodiment, the optical transceiver(s) 2 of one or more IOLM units can also employ a tunable optical laser device that provides a wide tuning range and fast switching times. In addition to its wide tuning range and fast switching speed, the linewidth of the laser of the device can operate at 800 kHz or less from 1 to 200 available channels from 5 GHz to 500 GHz ITU grid. The tunable laser device has the ability to provide a low linewidth; low cost tunable laser such as the SFP laser can improve the performance of wavelength tunable self-coherent transmission systems, and provides an ideal transmitter for the Intrinsic Optical Location Module (IOLM) architecture use in optical access networks that employ advanced modulation formats. The tunable optical laser devices of the IOLM units can be used to generate a coherent comb of wavelengths (>5) separated by an electronically controlled frequency spacing (e.g. 5, 10, 25, 50, 100, 400, 800 GHz) under gain switching. These optical combs can be used as parallel channels on a WDM link requiring only a single wavelength locking element. Thus using the tuning property of the laser, the same laser design can be used to generate combs on a selected frequency separation (e.g., 5, 10, 50, 100, 400, 800 GHz). The IOLM units can employ an array of laser devices can be used to cover the C band and L band frequencies.

In another embodiment, the optical transceiver(s) 2 of one or more IOLM units can employ a multi-section laser separated by at least two slots to define a plurality of sections (such as three sections), where each section adapted to provide an optical gain. Each section can comprise a separate control means to provide an adjustable optical gain in each section. The multi-section laser can incorporate one or more of the following features:

- separate control means for differential current sources for the sections, where the differential current source is configured to inject current into a section to adjust the optical gain of the section;
- the control means can include a voltage control source for at least one section; suitably the voltage applied to one section is less that the bandgap voltage;
- the slots can be dimensioned at a depth to allow for modulation of the wavelength spectrum of the laser; the depth of the slot can be set by an etch stop layer in the laser structure;
- the slots can include partially reflective material;
- the slots can include intermixed material;
- at least one section can include intermixed material;
- at least one section can include material with a different bandgap;
- the slots can define a grid of wavelengths separated by a desired channel spacing;
- the optical gain for the slots and associated channel spacing can be configured such that only one mode can lase during transmission;
- a calibration means with known gain spectrum and resonant modes can be used to program the multi-section laser to operate at any known temperature; and
- the multi-section laser can comprise a Slotted Fabry-Perot Device.

The IOLM units of the network can employ other optical devices such as optical amplifiers, optical modulators, Brillouin Scattering Induced Transparency (BSIT) devices and Optical True Time Delay (TTD) devices. The BSIT and TTD devices can be used to slow down, speed up, and block light in an optical waveguide to allow for management of the optical packet data communicated between IOLM units in the delivery architecture of the network.

The optical transceiver(s) 2 of one or more IOLM units can integrate the transmit and receive signal paths in a unitary module housing. The transmit signal path can incorporate optical modulators that modulates a C-band or L-band integrated laser Mach-Zehnder (ILMZ) and other similar laser diode configurations, enabling optical data transmission over single mode fiber and including tunable and non-tunable optical transceiver devices enabling optical data transmission over multimode and single mode fiber through an industry-standard connector. The receive signal path can include a photodiode device and transimpedance amplifier or other similar device whose output is retimed and passed to an output amplifier or buffer. The transmit path can support full C-band and L-band transmitter tunability with 5 GHz-800 GHz ITU channel spacing with integrated wave locker operating at temperatures from −5° C. to 70° C. and typically have a power dissipation of 3.5 W. The transmit and receive signal paths can provide a wide range of Gbps data rates that are compatible with a variety of optical transport protocols, such as SONET, SDH, Ethernet, and Fibre Channel.

In one embodiment, the optical transceiver(s) 2 of one or more IOLM units can provide a full-duplex serial electric interface as well as a serial optical device with both optical transmit and optical receive functions contained in a single module which provides a high-speed serial link at signaling rates from 1.0 Gbps to 800 Gbps and greater. Furthermore, the optical transceiver(s) 2 can operate at different wavelengths (channels) that cover the ITU grid channels spacing ranges between 5 GHz to 800 GHz for 80 km reach (or greater with amplification) or that cover other channel spacing designs such IEEE 10GBASE-ZR and 10GBASE-ZW DWDM for 80 km or greater reach (Ethernet), and 10GFC DWDM for 80 km or greater (3000 km amplification) reach (Fibre Channel) in both amplified and not amplified applications. The optical transceivers 2 can also be compliant with the 10 Gigabit small form factor XFP pluggable module multisource agreement INF8077i Rev. 4.5. The optical transceivers 2 can also have the ability to lock to data without the requirement of a reference clock. The reference clock inputs can have an internal AC-coupled 100-ohm differential line-to-line termination. The optical transceivers 2 can have several low-speed interface connections including a two-wire serial interface. These connections include: module not ready (Mod_NR), module deselect (Mod_DeSel), interrupt, transmitter disable (TX_DIS), module absent (Mod_ABS), receive loss (RX_LOS), and power down/reset (P_Down/RST). The optical transceivers 2 can also support XFI system loopback. In this mode, data input on the electrical Tx pins of the optical transceiver is retimed and redirected to the Rx pins of the optical transceiver. This facilitates system side test and debug capability.

In another embodiment, the optical transceiver(s) 2 of one or more IOLM units can have a transmit path that converts serial NRZ electrical data or similar data packets (for example, with line rates of 1 Gbps to 800 Gbps or greater) to a standard compliant optical data signal. The optical transceivers 2 of the IOLM units can have a transmit path that accepts a 100Ω differential 120 mV peak-to-peak to 820 mV peak-to-peak 10 Gbps CML electrical signals on TD− and TD+ pins. These differential optical signals can pass through a signal conditioner with the capability of equalization that compensates for losses and deterministic jitter present on the input optical data stream. The transmit path can include a CDR function that generates a clock that is at the same frequency as the incoming data bit rate of the electrical data input. The clock is phase aligned by a phase locked loop (PLL) that samples the data in the center of the data eye pattern. The capability of the CDR function does not require a reference clock to lock to incoming data. The CDR contains a lock detect circuit that indicates successful locking of the PLL onto the incoming data. The output of the optical Tx (transmission) signal conditioner is input to the modulator driver which transforms the small-swing digital voltage (electrical packet data) to an output modulation that drives an optical modulator (such as a cooled InP ILMZ modulator). The optical signal produced by the optical modulator can be configured to meet certain standardized optical signal formations, such as SONET/SDH, 10 Gigabit Ethernet, 10 G Fibre Channel, and corresponding Forward Error Correction (FEC) rates of DWDM specifications at ITU grids with 5 GHz to 800 GHz channel spacing. The optical transceiver 2 can employ closed-loop control of transmitted laser power, modulation swing, and center wavelength over temperature, and voltage variations. The laser and or diode of the optical transceiver can be coupled to single-mode or multimode optical fiber through an industry-standard optical connector.

In yet another embodiment, the optical transceiver(s) 2 of one or more IOLM units can have a receive path that demodulates an incoming optical data signal into serial NRZ electrical data. For example, the receive path can include an optical receiver 6 that converts incoming DC-balanced, serial NRZ optical signal (for example, at line rates of 1 Gbps to 800 Gbps or greater) into serial XFI electrical data. Light can be coupled to the optical receiver (such as an APD photodetector or similar photodetector and associated transimpedance amplifier) from a single-mode and/or multi-mode optical fiber through an industry-standard optical connector. The receive path can also include a signal-conditioning circuit block that provides clock and data recovery. The receive CDR function generates a clock that is at the same frequency as the incoming data bit rate of the optical data input. The clock is phase aligned by a PLL that samples the data in the center of the data eye pattern. The CDR function does not require a reference clock to lock to incoming data. The CDR contains a lock detect circuit that indicates successful locking of the PLL onto the incoming data. The recovered data can be output on output pins as a 100 Ω340 mV peak-to-peak CML signal. The output signal can meet XFP and MSA requirements.

The IOLM units of the network can have capability of being protocol transparent when necessary and can have the ability to include a range of protocols but not limited to: Bluetooth protocols, Fibre Channel network protocols, Internet Protocol Suite, TCP model, TCP stack, OSI, ITU-T Routing protocols, IPv4, IPv6, RTP, RTPS protocol, User Datagram Protocol SSH, FTP, SMTP, TCP, Telnet Telephone Network, HTTP, HTTPS, SFTP, SSL, TLS, POP, E6, NTP, PPP, NNTP, IMAP, and Bitcoin Protocol.

The wavelength division multiplexing (WDM) device(s) 4 of a respective IOLM unit can provide for communication of optical packet data between IOLM units. WDM is a technology which multiplexes different frequencies of light into a single optical waveguide (e.g., optical fiber waveguide). The WDM device(s) 4 can include an optical multiplexer that is optically coupled to the optical transmitter 5 of a given optical transceiver 2 to add the optical packet data transmitted by the optical transmitter 5 to the frequencies/wavelengths of optical packet data transported on the Optical Transport Network 22. The WDM device(s) 4 can also use an optical demultiplexer that is optically coupled to the optical receiver 6 of a given optical transceiver 2 to demultiplex or drop the optical packet data of a particular frequency/wavelength as transported on the Optical Transport Network 22 for supply the optical receiver 6. Since photoreceivers, in contrast to laser sources, tend to be wideband devices the demultiplexer channels provides optical channel/wavelength selectivity and delivery of optical packets to the corresponding optical receiver 6 of the IOLM unit. The WDM device(s) 4 can support coarse (CWDM) and dense (DWDM) wavelength division multiplexing. CWDM in contrast to DWDM uses increased channel spacing to allow less sophisticated and thus cheaper transceiver designs. Thus, CWDM and DWDM are based on the same concept of using multiple wavelengths of light on a single fiber, but differ in the spacing of the wavelengths, number of channels, and the ability to amplify the multiplexed signals in the optical space.

The WDM device(s) 4 of the IOLM units may be arranged in an individual layout, multiple layout, stacked layout, parallel layout, and serial layout of such and connected together using the following but not limited to the following devices: Mechanical optical switch (relay-based optical switch using mirror or index refraction modification), Microelectronics mechanical optical switch (MEMS) are a mini mechanic structure composed of the semiconductor material that combine the electrical, mechanical and optical integration as a whole, so as to transparently transmit different rates and different business services. MEMS optical switch have been widely used in industry. Liquid crystal optical switch, liquid crystal optical switch is based on polarization control. The optic coefficient of liquid crystal electro is high, and it is millions of times greater than of lithium niobate. Thermal optical switch commonly used to make small light switch. Thermal optical switch mainly has two basic types: visual optical switch and interferometric optical switches. Acousto-optic switch, acoustic wave is used to control the deflection of light. Because are no moving parts, it is more reliable to use it. Waveguide silicon, fluoride, and polymer-based optical switch, waveguide-based optical switch is a new optical switch which uses the waveguide structure. It also uses electro-optic, acousto-optic, heat, magnetism, light effect. Magneto-optic switch, Magneto-optic switch makes use of the Faraday rotation effect. It has a high switch speed and higher stability. Magnetic Mirrors, nanoscale antennas so-called "magnetic mirrors," are able to capture and harness electromagnetic radiation to control the deflection for optoelectronic devices. The optical switches are included with the modified TCP or Ethernet protocol of the IOLM based on the frequency and switch channel data packet pathway configuration.

The optical transceiver(s) 2 and/or WDM device(s) 4 of one or more IOLM units of the network can employ optical integrated circuits (OICs) in constructing optical delivery architecture in which light signals are transmitted between transceivers for carrying optical data and other information internally and externally in the IOLM device and in network architecture. The optical integrated circuits can provide for branching, coupling, switching, separating, multiplexing and demultiplexing of optical signals without intermediate transformation between optical and electrical media at the switching level of the module. The optical integrated circuits can include planar lightwave circuits (PLCs) architecture having optical waveguides on flat substrates, which are known to be used for routing optical signals from one of a number of input optical fibers to any one of a number of output optical fibers or optical circuitry. PLCs (WDM, CWDM, DWDM, and AWG's) make it possible to achieve higher densities, greater production volume and more diverse functions within the IOLM device. It is well known that PLCs are constructed to contain optical paths known as waveguides that are formed on a silicon wafer substrate using lithographic processing, wherein the waveguides are made from transmissive media, which have a higher index of refraction than the chip substrate or the outlying cladding layers in order to guide light along the optical path. By using advanced photolithographic and other processes, PLCs can be fashioned to integrate multiple components and functionalities into a single optical chip which can be incorporated into the component or IOLM unit as needed. The optical integrated circuits (e.g., PLCs) can provide wavelength-division multiplexing (WDM) add/drop functions, including DWDM or CWDM add/drop functions. For example, the optical integrated circuits (e.g., PLCs)) can employ an array waveguide grating (AWG) for wavelength-division multiplexing (WDM) add/drop functions, including DWDM or CWDM add/drop functions. Current AWG designs can provide add (multiplexing) or drop (demultiplexing) from 2 to N channels or wavelengths spaced from 5 GHz to 500 GHz. Conventional AWG designs can suffer from temperature sensitivity. Since the waveguide material usually has a temperature dependent refractive index, the channel wavelengths of the AWG shift as the temperature varies. The convention AWG designs typically employed active stabilization of the device operating temperature in order to perform acceptably. This stabilization is typically achieved by the addition of resistive heaters, temperature sensors, active electronics, and in some cases also thermoelectric coolers. A number of manufacturers have developed athermal AWG designs that do not require active temperature stabilization. Such athermal AWG designs can be used as part of the WDM devices 4 of the IOLM units of the system.

Figure 3:
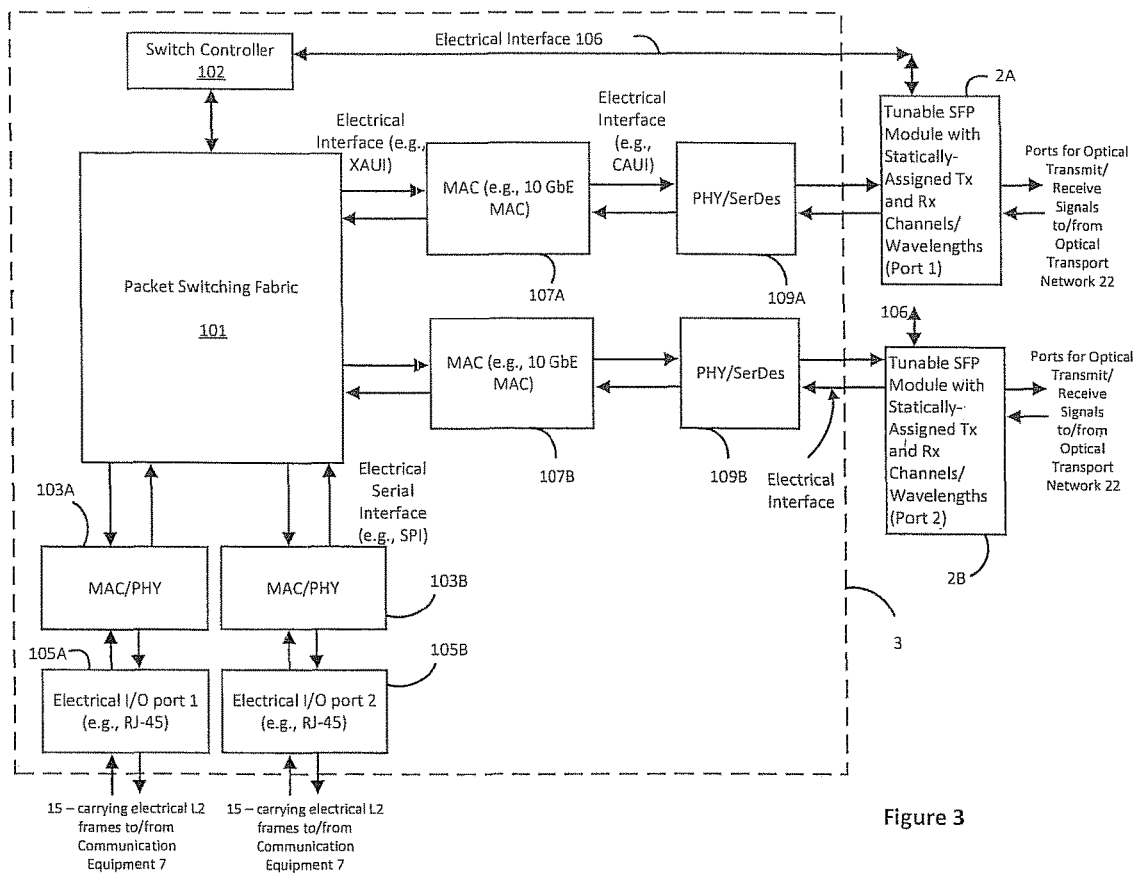
FIG. 3 is a functional block diagram of an embodiment of the packet management module of the IOLM unit of FIG. 2.

FIG. 3 illustrates the components of an exemplary embodiment of the packet management unit 3 of a respective IOLM unit 1 that is used in conjunction with one or more tunable optical transceivers (e.g., two shown and labeled 2A and 2B). The packet management unit 3 includes a packet switching fabric 101 which includes a switch core and digital logic circuitry that buffers or queues ingress electrical Layer 2 (L2) data frames or parts thereof that are received by one or more link layer devices and physical devices (e.g., two shown as MAC/PHY devices 103A, 103B) that are connected by demarcation devices (e.g., electrical I/O port(s) 105A and 105B) to the communication equipment 7. The ingress electronic L2 data frames are inbound from the communication equipment 7 connected to the IOLM unit 1 for communication from the IOLM unit 1 to another IOLM unit over the Optical Transport Network 22. The packet management unit 3 also includes digital logic circuitry (labeled switch controller 102) that matches or looks up a destination address contained in each buffered or queued ingress electrical L2 data frame or part thereof with Transmit Table information maintained by the IOLM unit 1 in order to control the packet switching function of the switch core. As shown in FIG. 4, the Transmit Table stores entries that map destination addresses as contained in the ingress electrical L2 data frames to a corresponding optical transceiver port ID (labeled "SFP ID") or other value that refers to one or more link layer and physical devices (e.g., one or more of the MAC/PHY devices 107A and 109A/107B and 109B) that are connected to the tunable optical transceiver(s) (e.g., tunable SFP modules 2A and 2B) of the IOLM unit 1. The result of the ingress data frame destination address look-up operation performed by the switch controller 102 is used to control the switch core of the packet switching fabric 101 to selectively forward or switch the ingress electrical L2 data frame to one or more of the optical transceiver link layer and physical devices (e.g., one or more of the MAC/PHY devices 107A and 109A/107B and 109B) of the IOLM unit 1. Specifically, if a matching Transmit Table entry is found, the ingress electrical L2 data frame is forwarded to the one or more optical transceiver link layer and physical devices as specified by the optical transceiver port ID of the matching Transmit Table entry for transmission of optical packet data that corresponds to the egress electrical L2 data frame by the one or more optical transceivers of the IOLM unit 1 over the Optical Transport Network 22. If no matching Transmit Table entry is found, the ingress electrical L2 data frame can be forwarded to all of the optical transceiver link layer and physical devices for broadcast for optical packet data that corresponds to the egress electrical L2 data frame by all optical transceivers of the IOLM unit 1 over the Optical Transport Network 22. In this manner, the mappings of egress data frame destination address to optical transceiver port ID stored in the Transmit Table entries are used to control the packet switching operations of egress data frames as carried out by the switch core of the packet switching fabric 101.

The packet switching fabric 101 also includes digital logic circuitry that buffers or queues the egress electrical L2 data frames (or part thereof) that are received by the one or more link layer devices and physical devices (e.g., the MAC/PHY devices 107A and 109A/107B and 109B) that are connected to the tunable optical transceiver(s) (e.g., tunable SFP modules 2A and 2B) of the IOLM unit 1. The egress electronic L2 data frames are inbound to the IOLM unit 1 from other IOLM units via optical-to-electrical conversion by the tunable optical transceiver(s) (e.g., tunable SFP modules 2A and 2B) of the IOLM unit 1 for communication to communication equipment 7 connected to the IOLM unit 1. The switch controller 102 matches or looks up the port ID of the tunable optical transceiver that received each given buffered or queued egress electrical L2 data frame or part thereof with Receive Table information maintained by the IOLM unit 1 in order to control the packet switching function of the switch core. As shown in FIG. 4, the Receive Table stores entries that map an optical transceiver port ID (labeled "SFP ID") or other value that refers to one or more optical transceiver link layer and physical devices (e.g., one or more of the MAC/PHY devices 107A and 109A/107B and 109B) to a port ID (labeled "Electrical I/O Port ID") or other value that refers to one or more link layer devices and physical devices (e.g., two shown as MAC/PHY devices 103A, 103B) that are connected to the communication equipment 7. The result of the ingress optical transceiver port ID look-up is used to control the switch core of the packet switching fabric 101 to selectively forward or switch the ingress electrical L2 data frame to one or more of link layer and physical devices (e.g., one or more of the MAC/PHY devices 103A and 103B) that are connected to the communication equipment 7. Specifically, if a matching Receive Table entry is found, the egress electrical L2 data frame is forwarded to the one or more of the link layer and physical devices that are connected to the communication equipment 7 as specified by the electrical I/O port ID of the matching Receive Table entry for communication of the electrical L2 data frame (or corresponding optical packet data) to the communication equipment 7. If no matching Receive Table entry is found, the egress electrical L2 data frame can be forwarded to all of the link layer and physical devices that are connected to the communication equipment 7 for broadcast of the electrical L2 data frame (or corresponding optical packet data) to the communication equipment 7. In this manner, the mappings of ingress data frame optical transceiver port ID to electrical I/O port ID stored in the Receive Table entries are used to control the packet switching operations of ingress data frames as carried out by the switch core of the packet switching fabric 101.

Note that the packet management unit 3 can employ a variety of memory structures (including associative cache structures and content-addressable memory structures) for storing the Transmit and Receive Table entries, which are collectively referred to as "Network Delivery Tables" in FIG. 4. Furthermore, the Transmit Table entries can include additional information that extends beyond the ingress data frame destination address and corresponding optical transceiver ID. For example, it is contemplated that the Transmit Table entries can include different types of destination addresses, such as i) a Destination IP Address that is part of the header of IP packet data encapsulated by an ingress electronic L2 data frame, ii) a Destination MAC address that is part of the header of an ingress electronic L2 data frame, iii) a VLAN identifier (e.g., VID) that is part of the ingress electronic L2 frame or associated with the port, protocol, or iv) a Source IP address, subnet mask or other VLAN classifier associated with the ingress electronic L2 data frame. In this case, each Transmit Table entry can include an "Address Type" field that specifies the type of destination address stored in the "Destination Address" field of the Transmit Table entry as shown in FIG. 4. Each Transmit Table entry can also possibly store an identifier for the statically-assigned Tx wavelength/optical channel that has been provisioned for the optical transceiver referenced by the optical transceiver ID ("SFP ID") field of the Transmit Table entry as shown in FIG. 4. Furthermore, the Receive Table entries can include additional information that extends beyond the egress data frame optical transceiver ID and corresponding electrical I/O port ID. For example, each Receive Table entry can also possibly store an identifier for the statically-assigned Rx wavelength/optical channel that has been provisioned for the optical transceiver referenced by the optical transceiver ID ("SFP ID") field of the Receive Table entry as shown in FIG. 4.

Furthermore, the packet switching fabric 101 and the switch controller 102 of the packet management unit 3 can be realized by a programmable microprocessor and/or other programmable logic and/or dedicated hardware such as an ASIC or FPGA. Also note that the packet switching fabric 101 can employ output buffers or queues that stores electrical L2 data frames forwarded by the switch core for delivery to the appropriate link layer and physical devices. Furthermore, the link layer and physical devices (e.g., two shown as MAC/PHY devices 103A, 103B) that are connected to the communication equipment 7 can provide common layer 2 functions (such as frame delimiting and recognition, protection against errors by means of generating and checking frame check sequences, and control of access to the physical transmission medium) as well as common layer 1 functions (such as character encoding/decoding and/or SerDes) for the egress data frames and ingress data frames processed by the packet switching fabric 101. And the optical transceiver link layer and physical devices (e.g., the MAC/PHY devices 107A and 109A/107B and 109B) can provide common layer 2 functions (such as frame delimiting and recognition, protection against errors by means of generating and checking frame check sequences, and control of access to the physical transmission medium) as well as common layer 1 functions (such as character encoding/decoding and/or SerDes) for the egress data frames and ingress data frames processed by the packet switching fabric 101.

In the embodiment of FIG. 3, the respective optical channels/wavelengths of the optical signal(s) that are demultiplexed or dropped by the WDM device(s) 4 of the respective IOLM units of the network are fixed or statically assigned by the design of the drop function of the WDM device(s) 4 and can be supplied to predetermined receive function ports of the optical transceiver(s) 2 of the respective IOLM units. This architecture allows a particular IOLM unit to receive point-to-point optical communication from any other IOLM unit using the optical channel(s)/wavelength(s) that are demultiplexed or dropped by the WDM device(s) 4 of the particular IOLM unit. Furthermore, one or more optical transceivers (e.g., tunable SFP modules 2A and 2B) of the respective IOLM units are tunable and thus can transmit over a number of optical channels/wavelengths. In this embodiment, the optical channels/wavelengths used by the transmit function of the tunable optical transceiver(s) (e.g., tunable SFP modules 2A and 2B) of the respective IOLM units are statically-provisioned and configured (i.e., tuned) by an automatic provisioning process carried out by the Network Manager 61. The automatic provisioning process can use control/management plane frames that are communicated between the Network Manager 61 and the IOLM units over the Optical Transport Network 22. In this embodiment, the automatic provisioning process derives configuration information that is communicated to the packet management unit 3 of each IOLM Unit 1 of the network. The configuration information communicated to the packet management unit 3 can be used by the switch controller 102 of the packet management unit 3 to statically provision and configure (i.e., tune) the optical channel/wavelength that is used by each tunable optical transceiver (e.g., tunable SFP modules 2A and 2B) of the IOLM unit 1 via commands or other electrical signals communicated via an electrical interface 106 between the switch controller 102 and the respective tunable optical transceivers. As a result, the transmit function of the statically-provisioned and tuned optical transceivers of the IOLM unit 1 performs electrical-to-optical conversion of the electrical data frames employing the statically-provisioned optical channels/wavelengths specified by the automatic provisioning process for output to the Optical Transport Network 22. The configuration information communicated to the packet management unit 3 can also be used by the switch controller 102 of the packet management unit 3 to initialize and/or update the entries of the Transmit Table and Receive Table maintained by the packet management unit 3. The switch controller 102 can use the entries of the Transmit and Receive Tables to dynamically control the switching operation of the packet switching fabric for ingress and egress data frames as described above.

Figure 5:
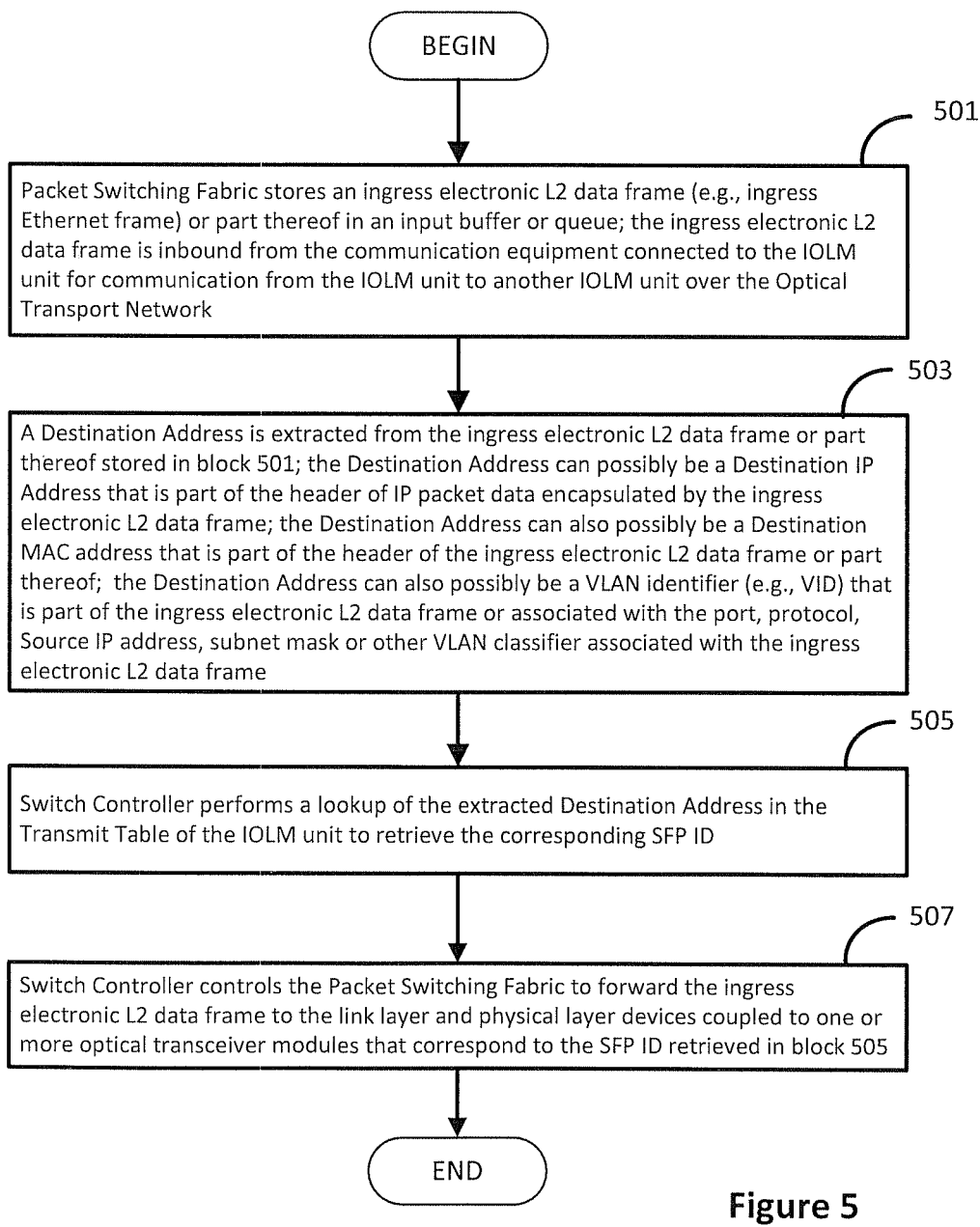
FIG. 5 is a flow chart illustrating ingress data frame processing by the IOLM unit of FIG. 3.

FIG. 5 illustrates the operations of the packet management unit 3 of IOLM unit 1 of FIG. 3 in processing an ingress electrical L2 data frame (e.g., ingress Ethernet frame). The ingress electronic L2 data frame is inbound from the communication equipment 7 connected to the IOLM unit 1 for communication from the IOLM unit 1 to another IOLM unit over the Optical Transport Network 22. The operations begin in block 501 where digital logic circuitry of the Packet Switching Fabric 101 stores the ingress electronic L2 data frame or part thereof in an input buffer or queue.

In block 503, the digital logic circuitry of the Packet Switching Fabric 101 of the packet management unit 3 extracts a Destination Address from the ingress electronic L2 data frame or part thereof stored in block 501. The Destination Address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame.

In block 505, the Switch Controller 102 of the packet management unit 3 performs a lookup of the extracted Destination Address extracted in block 503 in the Transmit Table of the IOLM unit 1 to retrieve the corresponding optical transceiver ID ("SFP ID").

In block 507, the Switch Controller 102 of the packet management unit 3 controls the switch core of the Packet Switching Fabric 101 of the packet management unit 3 to forward the ingress electronic L2 data frame to one or more of the optical transceiver link layer and physical devices that corresponds to the optical transceiver ID ("SFP ID") retrieved in block 505 such that the one or more tunable optical transceivers coupled thereto generate optical packet data representing the ingress electrical L2 data frame for transport on the Optical Transport Network 22.

Figure 6:
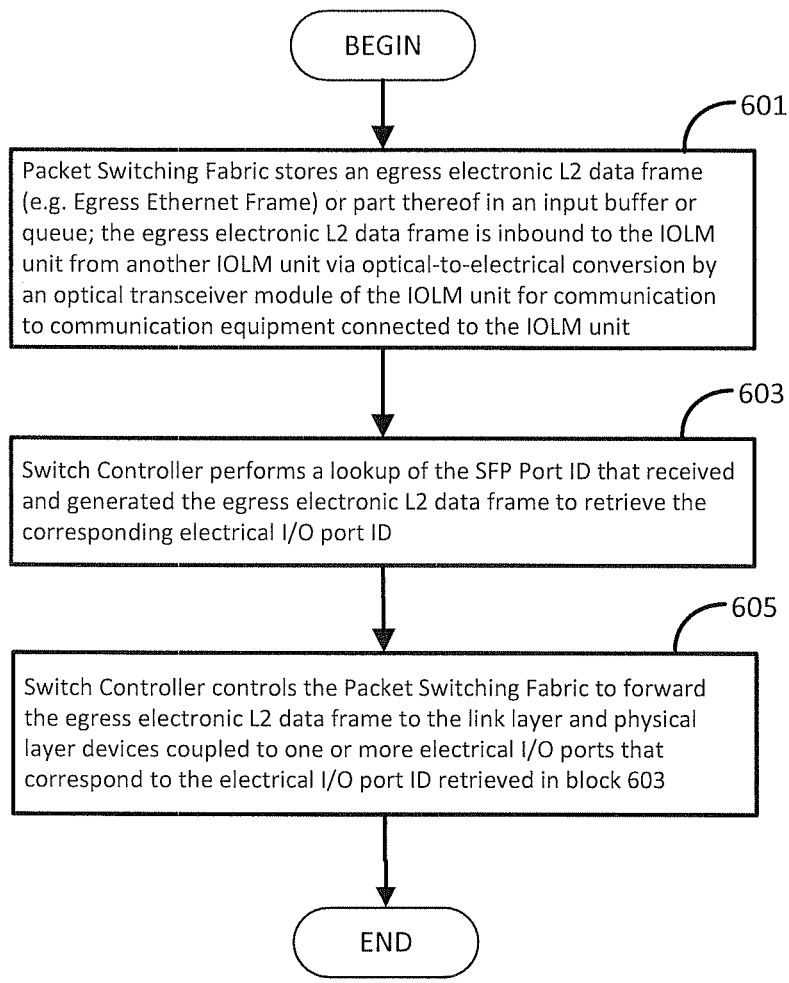
FIG. 6 is a flow chart illustrating egress data frame processing by the IOLM unit of FIG. 3.

FIG. 6 illustrates the operations of the packet management unit 3 of IOLM unit 1 of FIG. 3 in processing an egress electrical L2 data frame (e.g., egress Ethernet frame). The egress electronic L2 data frame is inbound to the IOLM unit 1 from another IOLM unit via optical-to-electrical conversion by a tunable optical transceiver module of the IOLM unit 1 for communication to communication equipment connected to the IOLM unit 1. The operations begin in block 601 where digital logic circuitry of the Packet Switching Fabric 101 stores the ingress electronic L2 data frame or part thereof in an input buffer or queue.

In block 603, the Switch Controller 102 of the packet management unit 3 performs a lookup of the tunable optical transceiver port ID ("SFP ID") that received and generated the egress electronic L2 data frame to retrieve the corresponding electrical I/O port ID.

In block 607, the Switch Controller 102 of the packet management unit 3 controls the switch core of the Packet Switching Fabric 101 of the packet management unit 3 to forward the egress electronic L2 data frame to one or more of the link layer and physical devices that correspond to the electrical I/O port ID retrieved in block 603 for communication of the electrical L2 data frame (or corresponding optical packet data) to the communication equipment 7 connected thereto.

Figure 7A:
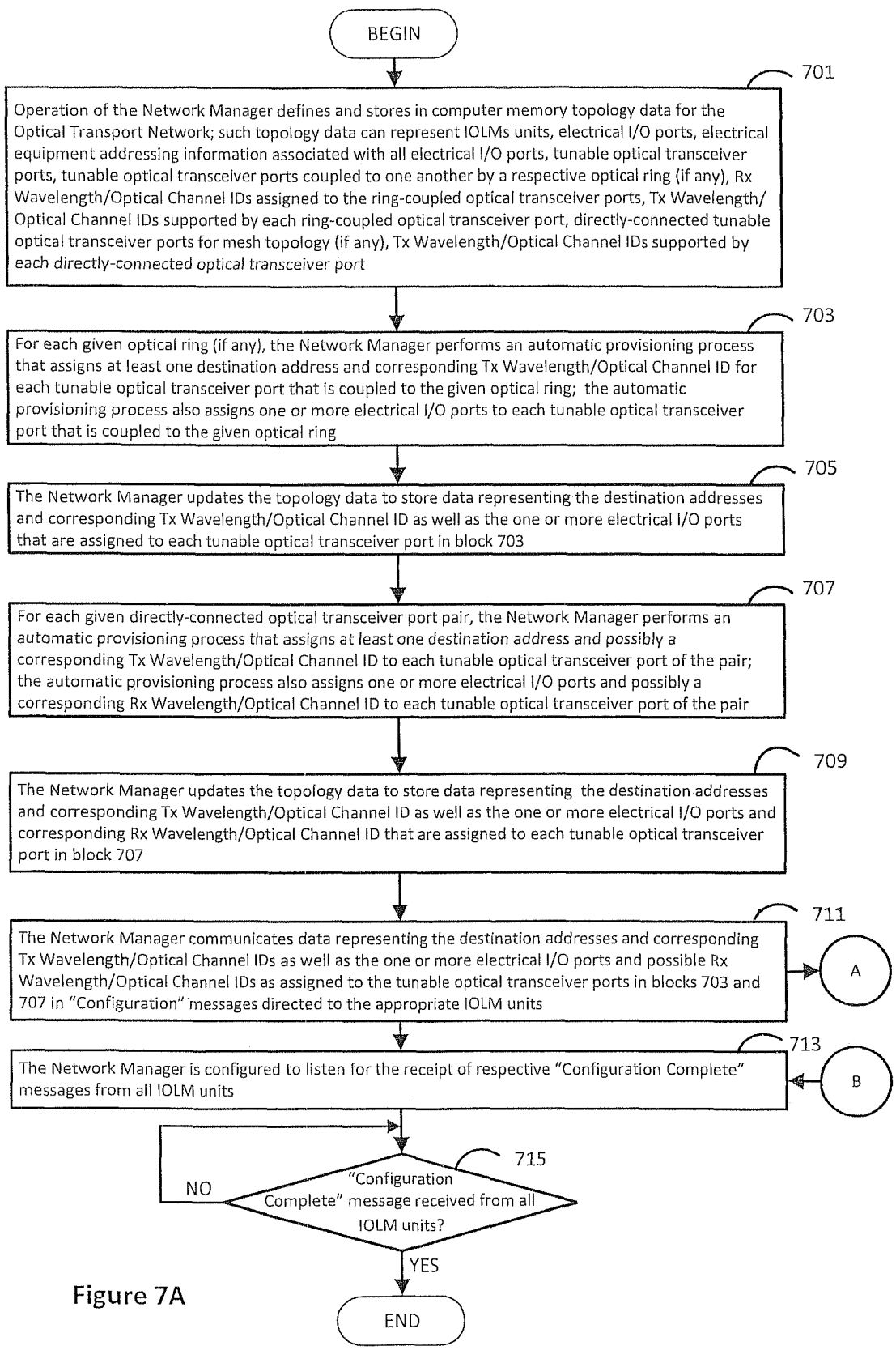
FIGS. 7A and 7B, collectively, is a flow chart illustrating an embodiment of an automatic provisioning process carried out by a network manager and the IOLM units (FIG. 3) of the network.
Figure 7B:
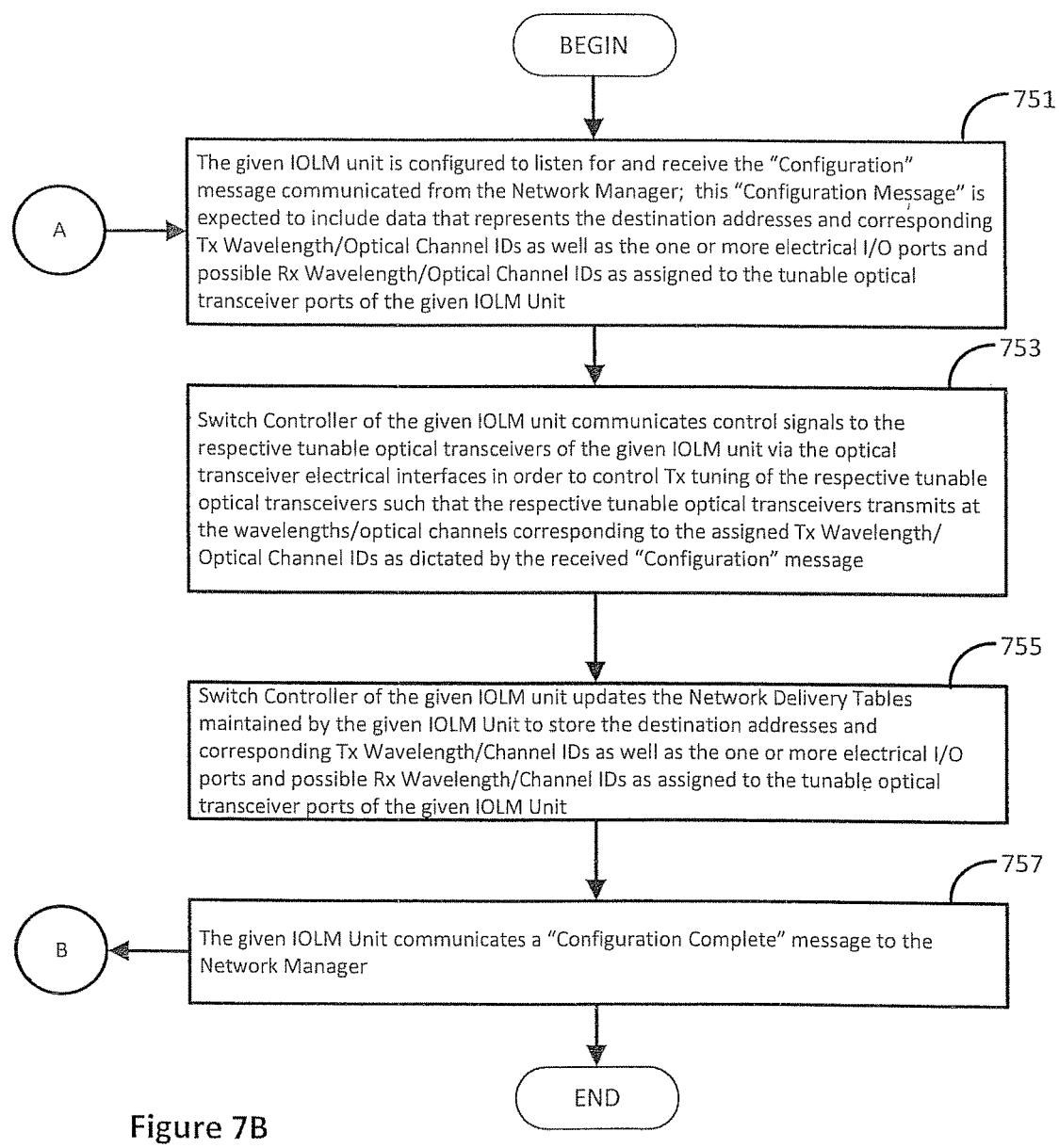

FIGS. 7A and 7B illustrate an example automatic provisioning process carried out by the Network Manager 61 and IOLM units that statically-provisions and configure (i.e., tune) the optical channels/wavelengths used by the transmit function of the tunable optical transceiver(s) (e.g., tunable SFP modules 2A and 2B of FIG. 3) of the respective IOLM units of the network. In the embodiment of FIGS. 7A and 7B, the respective optical channels/wavelengths of optical signal(s) that are demultiplexed or dropped by the WDM device(s) 4 of IOLM units that are configured in an optical ring of the network are fixed or statically assigned by the design of the drop function of such WDM device(s) 4 and can be supplied to predetermined receive function ports of the optical transceiver(s) 2 of the respective IOLM units. This architecture allows a particular IOLM unit to receive point-to-point optical communication from any other IOLM unit coupled to ring using the optical channel(s)/wavelength(s) that are demultiplexed or dropped by the WDM device(s) 4 of the particular IOLM unit. Furthermore, one or more optical transceivers (e.g., tunable SFP modules 2A and 2B of FIG. 3) of the respective IOLM units can be tunable and thus can transmit over a number of optical channels/wavelengths. The operations of the Network Manager 61 are described below with respect to FIG. 7A. The operations of the respective IOLM units are described below with respect to FIG. 7B.

The operations of the Network Manager 61 begin in block 701 where the Network Manager 61 defines and stores in computer memory topology data for the Optical Transport Network 22 and the system elements coupled thereto. Such topology data can represent IOLMs units, IOLM electrical I/O ports, electrical equipment addressing information associated with all IOLM electrical I/O ports, IOLM tunable optical transceiver ports, IOLM tunable optical transceiver ports coupled to one another by a respective optical ring (if any), Rx Wavelength/Channel IDs that are supported by IOLM ring-coupled optical transceiver ports, Rx Wavelength/Channel IDs that are assigned to the IOLM ring-coupled optical transceiver ports, Tx Wavelength/Channel IDs supported by each IOLM ring-coupled optical transceiver port, IOLM directly-connected tunable optical transceiver ports for mesh topology (if any), and Tx Wavelength/Channel IDs supported by each IOLM directly-connected optical transceiver port. The topology data can be derived from configuration information communicated from the respective IOLM units to the Network Manager 61, for example using control/management plane data frames over the Optical Transport Network 22. Alternatively, the topology data can be provided by user-input of the respective parameters with respect to the Network Manager 61.

In block 703, for each given optical ring (if any) of the network, the Network Manager 61 performs an automatic provisioning process that assigns at least one destination address and corresponding Tx Wavelength/Optical Channel ID for each IOLM tunable optical transceiver port that is coupled to the given optical ring. As described above with respect to FIGS. 4 and 5, the destination address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame. The automatic provisioning process can also assign one or more electrical I/O ports to each tunable optical transceiver port that is coupled to the given optical ring.

In block 705, the Network Manager 61 updates the topology data to store data representing the destination addresses and corresponding Tx Wavelength/Optical Channel ID as well as the one or more electrical I/O ports that are assigned to each tunable optical transceiver port in block 703.

In block 707, for each given IOLM directly-connected optical transceiver port pair of the network, the Network Manager 61 performs an automatic provisioning process that assigns at least one destination address and possibly a corresponding Tx Wavelength/Optical Channel ID to each tunable optical transceiver port of the pair. As described above with respect to FIGS. 4 and 5, the destination address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame. The automatic provisioning process can also assign one or more electrical I/O ports and possibly a corresponding Rx Wavelength/Optical Channel ID to each tunable optical transceiver port of the pair.

In block 709, the Network Manager 61 updates the topology data to store data representing the destination addresses and corresponding Tx Wavelength/Optical Channel ID as well as the one or more electrical I/O ports and corresponding Rx Wavelength/Optical Channel ID that are assigned to each tunable optical transceiver port in block 707.

In block 711, the Network Manager 61 communicates data representing the destination addresses and corresponding Tx Wavelength/Optical Channel IDs as well as the one or more electrical I/O ports and possible Rx Wavelength/Optical Channel IDs as assigned to the IOLM tunable optical transceiver ports in blocks 703 and 707 in "Configuration" messages directed to the appropriate IOLM units. The Configuration messages can be communicated from the Network Manager 61 to the appropriate IOLM units using control/management plane data frames transported over the Optical Transport Network 22.

In block 713, the Network Manager 61 is configured to listen for the receipt of respective "Configuration Complete" messages from all IOLM units. The Configuration Complete messages can be communicated from the IOLM units to the Network Manager 61 using control/management plane data frames transported over the Optical Transport Network 22.

In block 715, the Network Manager 61 waits until the "Configuration Complete" message has been received from all IOLM units. If so, the operations of the Network Manager 61 that are part of the automatic provisioning process ends.

Turning now to the operations of a respective IOLM unit as illustrated in FIG. 7B, the operations of a respective IOLM unit begins in block 751 where the given IOLM unit is configured to listen for and receive the Configuration message communicated from the Network Manager 61 in block 711. The Configuration message can be communicated from the Network Manager 61 to the given IOLM unit using control/management plane data frames transported over the Optical Transport Network 22. As described above, this "Configuration Message" is expected to include data that represents the destination addresses and corresponding Tx Wavelength/Optical Channel IDs as well as the one or more electrical I/O ports and possible Rx Wavelength/Optical Channel IDs as assigned to the tunable optical transceiver ports of the given IOLM Unit.

In block 753, the Switch Controller 102 of the packet management unit 3 of the given IOLM unit communicates control signals to the respective tunable optical transceiver(s) of the given IOLM unit via the optical transceiver electrical interfaces 106 in order to control Tx tuning of the respective tunable optical transceiver(s) such that the respective tunable optical transceiver(s) transmits at the wavelength/optical channel corresponding to the assigned Tx Wavelength/Optical Channel ID as dictated by the "Configuration" message received in block 751. The controls signals communicated from Switch Controller 102 to the respective tunable optical transceiver(s) of the given IOLM unit can involve commands or other electrical signals communicated via the electrical interface 106 between the switch controller 102 and the respective tunable optical transceiver(s) of the given IOLM unit.

In block 755, the Switch Controller 102 of the packet management unit 3 of the given IOLM unit updates the Network Delivery Tables maintained by the given IOLM unit to store one or more Transmit Table entries that map the destination addresses and corresponding Tx Wavelength/Channel IDs as assigned to the tunable optical transceiver ports of the given IOLM Unit as well as one or more Receive Table entries that map one or more electrical I/O ports and possible Rx Wavelength/Channel IDs as assigned to the tunable optical transceiver ports of the given IOLM Unit.

In block 757, the given IOLM Unit communicates a Configuration Complete message to the Network Manager 61 for receipt and processing by the Network Manager 61 in blocks 713 and 715, and the operations of the given IOLM unit that are part of the automatic provisioning process ends. The Configuration Complete message can be communicated from the given IOLM unit to the Network Manager 61 using control/management plane data frames transported over the Optical Transport Network 22.

Note that the automatic provisioning process carried out by the Network Manager 61 and IOLM units can be repeated in the event that of a change or update to the network topology or configuration of the Optical Transport Network 22 or the IOLM units or the communication equipment 7 connect thereto.

FIGS. 8A-8E show exemplary data structures (referred to herein as Inventory Tables) that can be maintained by the respective IOLM units of FIG. 1 and communicated or otherwise transferred to the Network Manager 61 and maintained as part of the topology data stored in the memory of the Network manager in block 701 of FIG. 7A. The Inventory Table for each respective IOLM unit can include information that relates to each optical transceiver of the IOLM unit, including i) an optical transceiver port ID ("SFP Port ID"), ii) an identifier for the Rx Wavelength/Optical Channel ID assigned to the Rx function of the optical transceiver, iii) an identifier for one or more electrical I/O ports that are mapped to the Rx Wavelength/Optical Channel ID assigned to the Rx function of the optical transceiver, iv) one or more destination addresses for communication equipment connected to the electrical I/O ports that are mapped to the Rx Wavelength/Optical Channel ID assigned to the Rx function of the optical transceiver, and v) a list of Tx Wavelength/Optical Channel IDs and associated In-Service-Flags and mapped-to-destination addresses for the Tx function of the optical transceiver as shown.

FIG. 22 lists a number of exemplary optical channels (ITU channels 11-61) that can be supported by the optical transceiver(s) 2 of the IOLM units of the network. These ITU channels are commonly used in modern DWDM optical communication networks.

Figure 9:
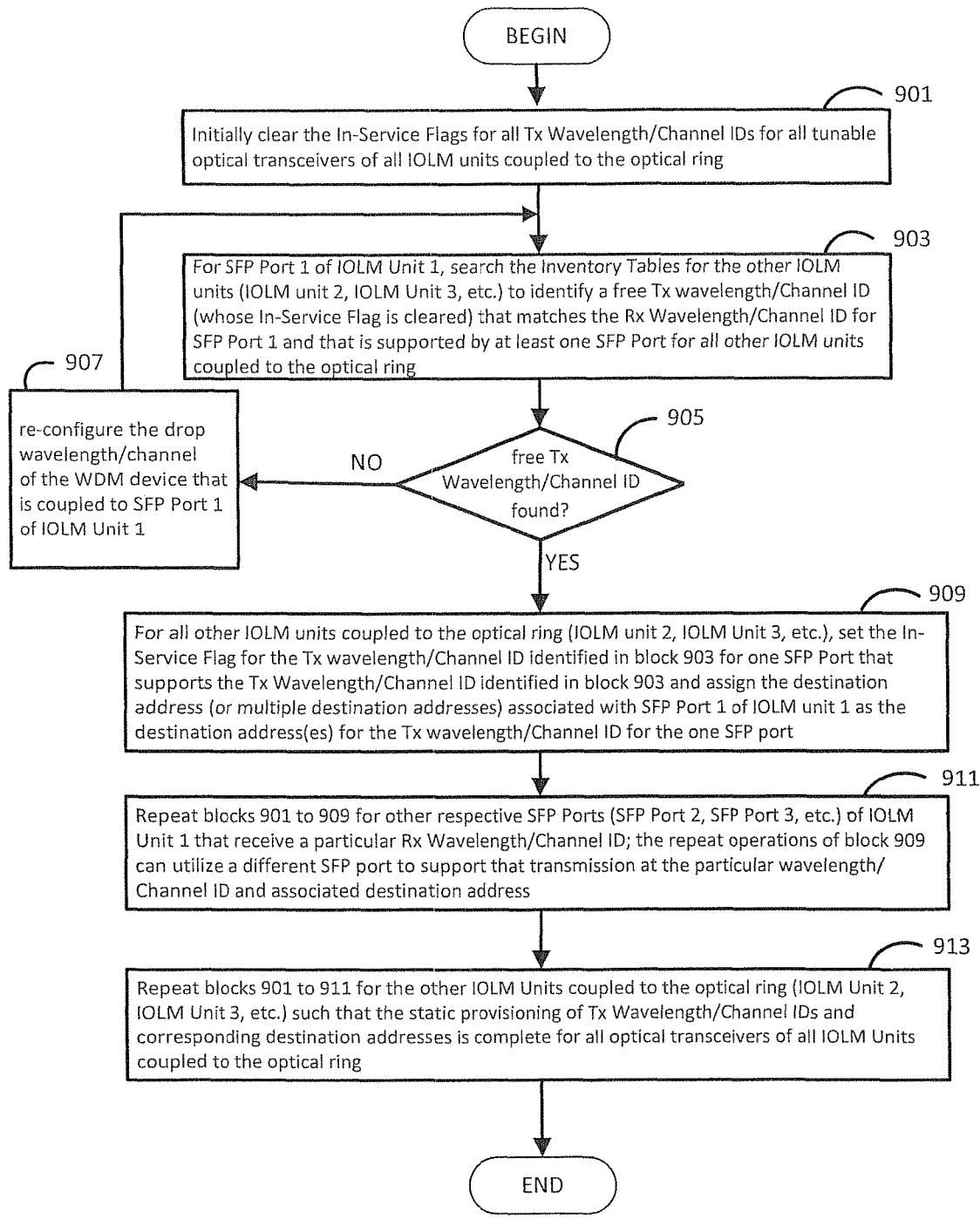
FIG. 9 is a flow chart illustrating an embodiment of automatic provisioning operations for optical transceivers that are coupled together in a ring topology, which can be part of the automatic provisioning process of FIGS. 7A and 7B.

FIG. 9 illustrates an exemplary embodiment of detailed operations of the Network Manager 61 in carrying out the automatic provisioning process of the ring-coupled optical transceivers of the IOLM units as part of block 703 of FIG. 7A. These operations can use the Inventory Tables of FIGS. 8A-8E in the automatic provisioning process as will be evident from the description below.

The operations begin in block 901 where the Network Manager 61 initially clears the In-Service Flags for all Tx wavelength/optical channel IDs for all tunable optical transceivers of all IOLM units coupled to the optical ring.

In block 903, for optical transceiver port 1 (SFP Port 1) of IOLM Unit 1, the Network Manager 61 searches the Inventory Tables for the other IOLM units (IOLM unit 2, IOLM Unit 3, etc.) to identify a free Tx wavelength/optical channel ID (whose In-Service Flag is cleared) that matches the Rx wavelength/optical channel ID for optical transceiver port 1 and that is supported by at least one optical transceiver port for all other IOLM units coupled to the optical ring.

In block 905, the Network Manager 61 determines whether a free Tx wavelength/optical channel ID was found in the search of block 903. If so, the operations continue to block 909. If not, the operations continue to block 907 where the network operator is instructed to re-configure the drop wavelength/optical channel of the WDM device that is coupled to the optical transceiver port 1 of IOLM Unit 1. A recommendation for the drop wavelength/optical channel can identified by searching the Inventory Tables to identify a free Tx wavelength/Channel ID (whose In-Service Flag is cleared) that is supported by at least one optical transceiver port for all other IOLM units coupled to the optical ring. After re-configuring the drop wavelength/optical channel of the WDM device that is coupled to the optical transceiver port 1 of IOLM Unit 1, the operations return to block 903 to repeat the processing of blocks 903 to 907.

In block 909, for all other IOLM units coupled to the optical ring (IOLM unit 2, IOLM Unit 3, etc.), the Network Manager 61 sets the In-Service Flag for the Tx wavelength/optical channel ID identified in block 903 for one particular optical transceiver port that supports the Tx wavelength/optical channel ID identified in block 903 and assigns the destination address (or possibly multiple destination addresses) associated with the optical transceiver port 1 of IOLM unit 1 as the destination address(es) for the Tx wavelength/optical channel ID for that one particular optical transceiver port.

In block 911, the Network Manager 61 repeats the operations of blocks 901 to 909 for other respective optical transceiver ports (SFP Port 2, SFP Port 3, etc.) of IOLM Unit 1 that receive a particular Rx wavelength/optical channel ID. Note that the repeat operations of block 909 can utilize a different optical transceiver port to support that transmission at the particular wavelength/optical channel ID and associated destination address(es).

In block 913, the Network Manager 61 repeats the operations of blocks 901 to 911 for the other IOLM Units coupled to the optical ring (IOLM Unit 2, IOLM Unit 3, etc.) such that the static provisioning of Tx wavelength/optical channel IDs and corresponding destination addresses is complete for all optical transceivers of all IOLM Units coupled to the optical ring.

Figure 10:
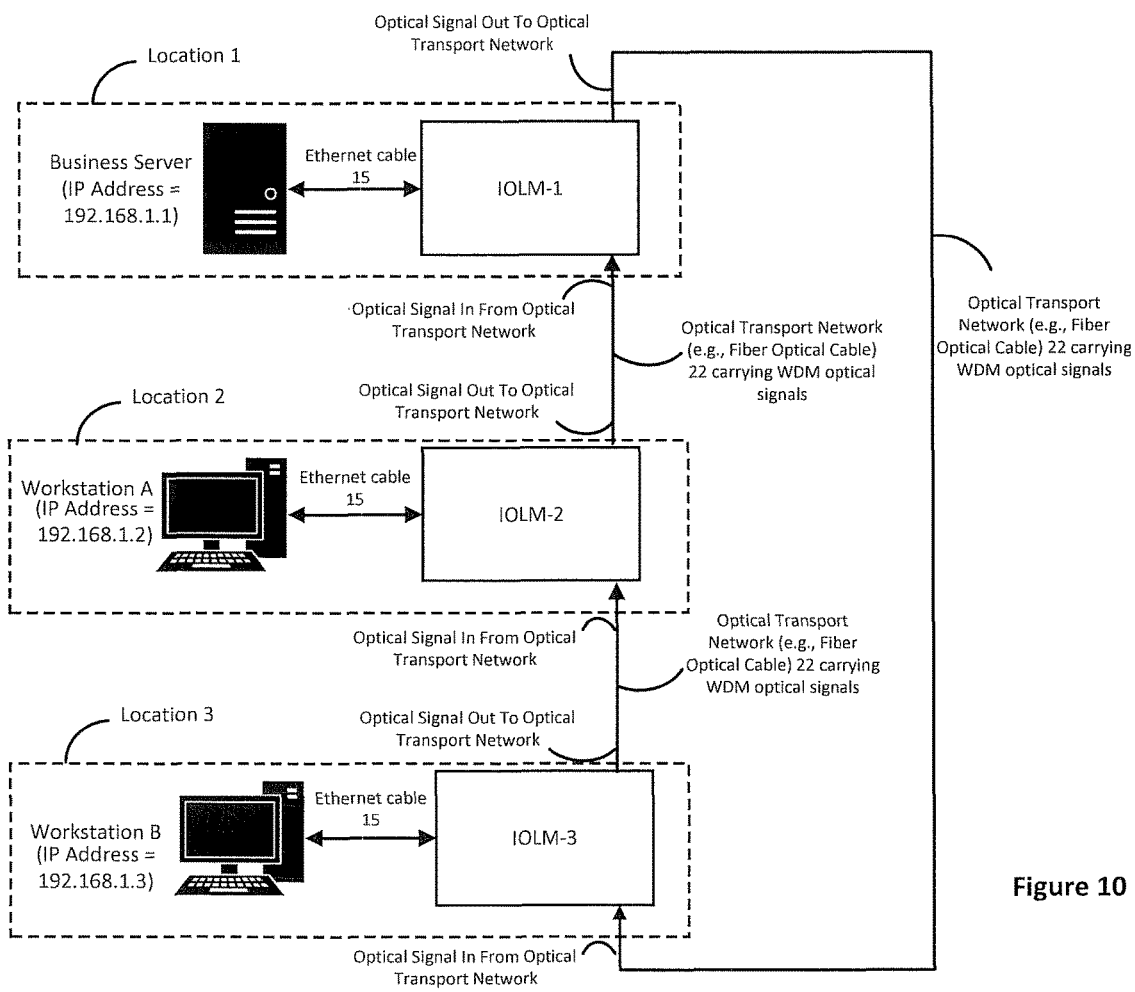
FIG. 10 is a high level schematic diagram of network architecture that employs an optical ring of three IOLM units (FIG. 3) according to the present disclosure.

FIG. 10 is a schematic illustration of an exemplary network that employs three IOLM units (labeled IOLM-1, IOLM-2, IOLM-3) that are configured in a ring topology via the Optical Transport Network 22. A first computer system (labeled "Business Server") having an assigned IP Address of 192.168.001.001 is connected to the demarcation port 8 of the IOLM-1 via an Ethernet cable with the Business Server and IOLM-1 located at a first premises (labeled "Location 1"). The Business Server corresponds to the computer equipment 7 of FIGS. 1 and 2 that are connected to the demarcation port 8 of the respective IOLM unit. A second computer system (labeled "Workstation A") having an assigned IP Address of 192.168.001.002 is connected to the demarcation port 8 of the IOLM-2 via an Ethernet cable with Workstation A and IOLM-2 located at a second premises (labeled "Location 2"). Workstation A corresponds to the computer equipment 7 of FIGS. 1 and 2 that are connected to the demarcation port 8 of the respective IOLM unit. A third computer system (labeled "Workstation B") having an assigned IP Address of 192.168.001.003 is connected to the demarcation port 8 of the IOLM-3 via an Ethernet cable with Workstation B and IOLM-3 located at a third premises (labeled "Location 3"). Workstation B corresponds to the computer equipment 7 of FIGS. 1 and 2 that are connected to the demarcation port 8 of the respective IOLM unit. The first, second and third premises (locations 1, 2, and 3) can be remotely located relative to one another, such as in different buildings on a campus or different floors in an office building. The Optical Transport Network 22 transports WDM optical signals (optical packet data) between the premises to allow for communication between the IOLM units of the network over optical channels/wavelengths that are provisioned for point-to-point communication between IOLM units. The IOLM units perform packet switching operations that are configured to support the optical channels/wavelengths that are provisioned for point-to-point communication between IOLM units.

The IP addresses of the Business Server, Workstation A and Workstation B can support internal network and external network identification. In this case, the destination address of the Layer 2 data frames that originate from the Business Server, Workstation A and Workstation B, whether transmitted or received, can traverse multiple network segments. Furthermore, it is assumed that network segments are within the same enterprise. It is also contemplated that the network segments can be on separate subnet masks for isolation and separate gateways to prevent packet collisions if the destination is the same.

FIG. 11 illustrates the static provisioning and configuration of the WDM devices and optical transceiver modules of the IOLM units of the network of FIG. 10. More specifically, the WDM device 4 of IOLM-1 is statically configured to receive/drop the optical signal with Rx Wavelength (in nm) of 1528.77. The WDM device 4 of IOLM-2 is statically configured to receive/drop the optical signal with Rx Wavelength (in nm) of 1568.77. The WDM device 4 of IOLM-3 is statically configured to receive/drop the optical signal with Rx Wavelength (in nm) of 1567.95.

Furthermore, IOLM-1 has two optical transceivers, which are identified by an SFP ID of 1 and an SFP ID of 2. The Rx function of the optical transceiver identified by the SFP ID of 1 receives the drop optical signal with the Rx Wavelength of 1528.77 from the WDM device 4 of IOLM-1. The Tx function of the optical transceiver identified by the SFP ID of 1 transmits with a Tx Wavelength of 1568.77 for communication to IOLM-2. The Tx function of the optical transceiver identified by the SFP ID of 2 transmits with a Tx Wavelength of 1567.77 for communication to IOLM-3.

IOLM-2 has two optical transceivers, which are identified by an SFP ID of 1 and an SFP ID of 2. The Rx function of the optical transceiver identified by the SFP ID of 1 receives the drop optical signal with the Rx Wavelength of 1568.77 from the WDM device 4 of IOLM-2. The Tx function of the optical transceiver identified by the SFP ID of 1 transmits with a Tx Wavelength of 1528.77 for communication to IOLM-1. The Tx function of the optical transceiver identified by the SFP ID of 2 transmits with a Tx Wavelength of 1567.77 for communication to IOLM-3.

IOLM-3 has two optical transceivers, which are identified by an SFP ID of 1 and an SFP ID of 2. The Rx function of the optical transceiver identified by the SFP ID of 1 receives the drop optical signal with the Rx Wavelength of 1567.77 from the WDM device 4 of IOLM-3. The Tx function of the optical transceiver identified by the SFP ID of 1 transmits with a Tx Wavelength of 1528.77 for communication to IOLM-1. The Tx function of the optical transceiver identified by the SFP ID of 2 transmits with a Tx Wavelength of 1568.77 for communication to IOLM-2.

FIGS. 12A, 12B, 12C illustrate the Network Delivery Tables for IOLM-1, IOLM-2 and IOLM-3, respectively. Note that the Transmit Table for IOLM-1 includes i) a first entry that maps the Destination IP address of 192.168.001.002 (the IP address assigned to Workstation A that is connected to IOLM-2) to the Tx function of the optical transceiver identified by the SFP ID of 1, which transmits with a Tx Wavelength of 1568.77 for communication to IOLM-2, and ii) a second entry that maps the Destination IP address of 192.168.001.003 (the IP address assigned to Workstation B that is connected to IOLM-3) to the Tx function of the optical transceiver identified by the SFP ID of 2, which transmits with a Tx Wavelength of 1567.77 for communication to IOLM-3. Note that the Receive Table for IOLM-1 includes a single entry that maps the Rx function of the optical transceiver identified by the SFP ID of 1 (which receives a Rx Wavelength of 1528.77 for communication to IOLM-1) to the electrical I/O port identified by the electrical I/O port ID of 1 that is connected to the Business Server.

Note that the Transmit Table for IOLM-2 includes i) a first entry that maps the Destination IP address of 192.168.001.001 (the IP address assigned to Business Server that is connected to IOLM-1) to the Tx function of the optical transceiver identified by the SFP ID of 1, which transmits with a Tx Wavelength of 1528.77 for communication to IOLM-1, and ii) a second entry that maps the Destination IP address of 192.168.001.003 (the IP address assigned to Workstation B that is connected to IOLM-3) to the Tx function of the optical transceiver identified by the SFP ID of 2, which transmits with a Tx Wavelength of 1567.77 for communication to IOLM-3. Note that the Receive Table for IOLM-2 includes a single entry that maps the Rx function of the optical transceiver identified by the SFP ID of 1 (which receives a Rx Wavelength of 1568.77 for communication to IOLM-1) to the electrical I/O port identified by the electrical I/O port ID of 1 that is connected to the Workstation A.

Note that the Transmit Table for IOLM-3 includes i) a first entry that maps the Destination IP address of 192.168.001.001 (the IP address assigned to Business Server that is connected to IOLM-1) to the Tx function of the optical transceiver identified by the SFP ID of 1, which transmits with a Tx Wavelength of 1528.77 for communication to IOLM-1, and ii) a second entry that maps the Destination IP address of 192.168.001.002 (the IP address assigned to Workstation A that is connected to IOLM-2) to the Tx function of the optical transceiver identified by the SFP ID of 2, which transmits with a Tx Wavelength of 1568.77 for communication to IOLM-2. Note that the Receive Table for IOLM-3 includes a single entry that maps the Rx function of the optical transceiver identified by the SFP ID of 1 (which receives a Rx Wavelength of 1567.77 for communication to IOLM-3) to the electrical I/O port identified by the electrical I/O port ID of 1 that is connected to the Workstation B.

With this configuration, an L2 data frame that originates from the Business Server and encapsulate an IP packet having a destination IP address of 192.168.001.002 (the IP address assigned to Workstation A that is connected to IOLM-2) is switched by the packet switching function of IOLM-1 to the link layer and physical devices for the Tx function of the optical transceiver identified by the SFP ID of 1 of IOLM-1 according to the mapping providing by first Transmit Table entry of IOLM-1, which transmits optical packet data with a Tx Wavelength of 1568.77 for communication to IOLM-2. The Rx function of the optical transceiver identified by the SFP ID of 1 of IOLM-2 receives and converts the optical packet data into an L2 data frame. This L2 data frame is switched by the packet switching function of IOLM-2 to the link layer and physical devices for the electrical I/O port identified by the electrical I/O port ID 1 that is mapped to the Rx function of the optical transceiver identified by the SFP ID of 1 of IOLM-2 according to the single Receive Table entry of IOLM-2. The L2 data frame is then output from the electrical I/O port identified by the electrical I/O port ID 1 of IOLM-2 to the Workstation A connected thereto.

Similarly, an L2 data frame that originates from the Business Server and encapsulates an IP packet having a destination IP address of 192.168.001.003 (the IP address assigned to Workstation B that is connected to IOLM-2) is switched by the packet switching function of IOLM-1 to the link layer and physical devices for the Tx function of the optical transceiver identified by the SFP ID of 2 of IOLM-1 according to the mapping providing by second Transmit Table entry of IOLM-1, which transmits optical packet data with a Tx Wavelength of 1567.77 for communication to IOLM-3. The Rx function of the optical transceiver identified by the SFP ID of 1 of IOLM-3 receives and converts the optical packet data into an L2 data frame. This L2 data frame is switched by the packet switching function of IOLM-3 to the link layer and physical devices for the electrical I/O port identified by the electrical I/O port ID 1 that is mapped to the Rx function of the optical transceiver identified by the SFP ID of 1 of IOLM-3 according to the single Receive Table entry of IOLM-3. The L2 data frame is then output from the electrical I/O port identified by the electrical I/O port ID 1 of IOLM-3 to the Workstation B connected thereto.

Similar operations are provided for other end-point to end-point communications, such as from Workstation A to the Business Server, Workstation A to Workstation B, Workstation B to the Business Server and Workstation B to Workstation A.

Figure 13:
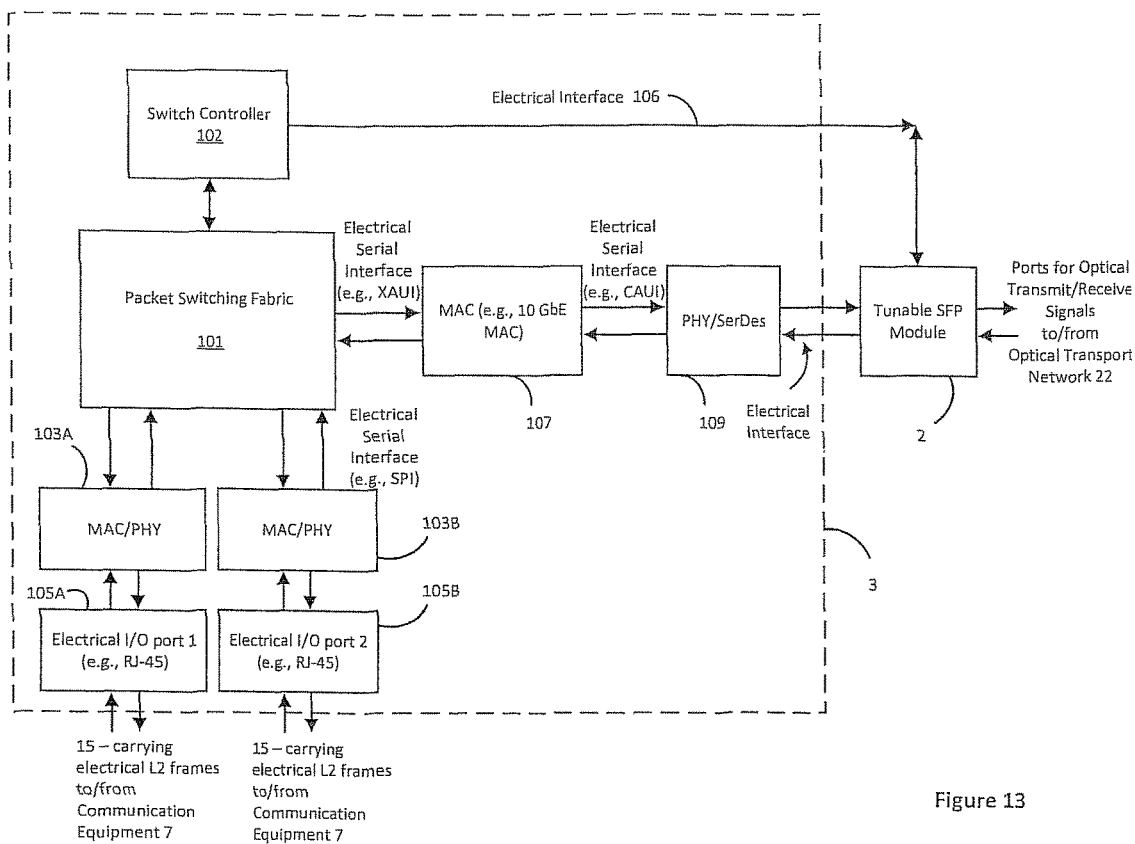
FIG. 13 is a functional block diagram of an embodiment of the packet management module of the IOLM units of the network.

FIG. 13 illustrates the components of another exemplary embodiment of the packet management unit 3 of a respective IOLM unit 1 that is used in conjunction with one or more tunable optical transceivers (e.g., one shown and labeled Tunable SFP Module 2). Similar to the embodiment of FIG. 3, the packet management unit 3 includes a packet switching fabric 101 which includes a switch core and digital logic circuitry that buffers or queues ingress electrical Layer 2 (L2) data frames or parts thereof that are received by one or more link layer devices and physical devices (e.g., two shown as MAC/PHY devices 103A, 103B) that are connected by demarcation devices (e.g., electrical I/O port(s) 105A and 105B) to the communication equipment 7. The ingress electronic L2 data frames are inbound from the communication equipment 7 connected to the IOLM unit 1 for communication from the IOLM unit 1 to another IOLM unit over the Optical Transport Network 22. The packet management unit 3 also includes digital logic circuitry (labeled switch controller 102) that matches or looks up a destination address contained in each buffered or queued ingress electrical L2 data frame or part thereof with Transmit Table information maintained by the IOLM unit 1 in order to dynamically configure (i.e., tune) the transmit function of an optical transceiver (if need be) and control the packet switching function of the switch core. As shown in FIG. 4, the Transmit Table stores entries that map destination addresses as contained in the ingress electrical L2 data frames to a corresponding optical transceiver port ID (labeled "SFP ID") and Tx Wavelength/Optical Channel ID. The optical transceiver port ID refers to link layer and physical devices (e.g., MAC/PHY devices 107 and 109) that are connected to a tunable optical transceiver (e.g., tunable SFP module 2) of the IOLM unit 1. The result of the destination address lookup in the Transmit Table is used by the switch controller 102 to dynamically configure (i.e., tune) the optical channel/wavelength used by the transmit function of the referenced optical transceiver and to control the switch core of the packet switching fabric 101 to selectively forward or switch the ingress electrical L2 data frame to the link layer and physical devices (e.g., MAC/PHY devices 107 and 109) that are connected to the dynamically-tuned optical transceiver 2 of the IOLM unit 1. Specifically, if a matching Transmit Table entry is found, the Tx function of the optical transceiver identified by the optical transceiver port ID referenced by the matching Transmit Table entry is dynamically configured (i.e., tuned) to the optical channel/wavelength referenced by the Tx Wavelength/Optical Channel ID of the matching Transmit Table entry. Furthermore, the ingress electrical L2 data frame is forwarded to the link layer and physical devices as specified by the optical transceiver port ID of the matching Transmit Table entry for delivery to the Tx function of the dynamically-tuned optical transceiver 2 of the IOLM unit 1. The Tx function of the dynamically-tuned optical transceiver 2 transmits optical packet data that corresponds to the egress electrical L2 data frame at the optical channel/wavelength referenced by the matching Transmit Table entry for delivery over the Optical Transport Network 22. If no matching Transmit Table entry is found, an error can be raised as no communication pathway is present. In this case, the egress electrical L2 data frame can be dropped and possibly an error message can be returned to the source of the data frame. In this manner, the mappings of egress data frame destination address to optical transceiver port ID and optical channel/wavelength as stored in the Transmit Table entries are used to control the packet switching operations of egress data frames as carried out by the switch core of the packet switching fabric 101.

In an alternate embodiment, the Transmit Table can store entries that map destination addresses as contained in the ingress electrical L2 data frames to a corresponding Tx Wavelength/Optical Channel ID and one or more optical transceiver port IDs that refer to a group of one or more optical transceivers that support transmission at that Tx Wavelength/Optical Channel ID. The switch controller 102 can also maintain heuristic data that tracks the last used Tx Wavelength/Optical Channel ID for the optical transceiver(s) of the IOLM unit. After looking up and accessing the matching Transmit Table entry, the switch controller 102 can use the heuristic data to selectively forward the ingress L2 data frame to the link layer and physical devices for the optical transceiver that was last used to transmit at the Tx Wavelength/Optical Channel ID as specified by the matching Transmit Table entry without tuning this last used optical transceiver. The switch controller 102 can also use the heuristic data together with the one or more optical transceiver port IDs of the matching Transmit Table entry to provide for load balancing of tuning and optical packet transmission by the group of optical transceivers that support transmission at the Tx Wavelength/Optical Channel ID as specified by the matching Transmit Table entry.

The packet switching fabric 101 also includes digital logic circuitry that buffers or queues the egress electrical L2 data frames (or part thereof) that are received by the one or more link layer devices and physical devices (e.g., the MAC/PHY devices 107 and 109) that are connected to the tunable optical transceiver(s) (e.g., tunable SFP 2) of the IOLM unit 1. The egress electronic L2 data frames are inbound to the IOLM unit 1 from other IOLM units via optical-to-electrical conversion by the tunable optical transceiver(s) (e.g., tunable SFP 2) of the IOLM unit 1 for communication to communication equipment 7 connected to the IOLM unit 1. The switch controller 102 matches or looks up the port ID of the tunable optical transceiver that received each given buffered or queued egress electrical L2 data frame or part thereof with Receive Table information maintained by the IOLM unit 1 in order to control the packet switching function of the switch core. As shown in FIG. 4, the Receive Table stores entries that map an optical transceiver port ID (labeled "SFP ID") or other value that refers to one or more optical transceiver link layer and physical devices (e.g., one or more of the MAC/PHY devices 107A and 109A/107B and 109B) to an electrical I/O port ID (labeled "Electrical I/O Port ID") or other value that refers to one or more link layer devices and physical devices (e.g., two shown as MAC/PHY devices 103A, 103B) that are connected to the communication equipment 7. The result of the ingress optical transceiver port ID look-up in the Receive Table is used to control the switch core of the packet switching fabric 101 to selectively forward or switch the ingress electrical L2 data frame to one or more of link layer and physical devices (e.g., one or more of the MAC/PHY devices 103A and 103B) that are connected to the communication equipment 7. Specifically, if a matching Receive Table entry is found, the egress electrical L2 data frame is forwarded to the one or more of the link layer and physical devices that are connected to the communication equipment 7 as specified by the electrical I/O port ID of the matching Receive Table entry for communication of the electrical L2 data frame (or corresponding optical packet data) to the communication equipment 7. If no matching Receive Table entry is found, the egress electrical L2 data frame can be forwarded to all of the link layer and physical devices that are connected to external communication equipment 7 for broadcast of the electrical L2 data frame (or corresponding optical packet data) to the communication equipment 7. In this manner, the mappings of ingress data frame optical transceiver port ID to electrical I/O port ID stored in the Receive Table entries are used to control the packet switching operations of ingress data frames as carried out by the switch core of the packet switching fabric 101.

Note that the packet management unit 3 can employ a variety of memory structures (including associative and content-addressable memory structures) for storing the Network Delivery Tables. Furthermore, the Transmit Table entries can include additional information that extends beyond the ingress data frame destination address and corresponding optical transceiver ID and Tx Optical Channel/Wavelength ID. For example, it is contemplated that the Transmit Table entries can include different types of destination addresses, such as i) a Destination IP Address that is part of the header of IP packet data encapsulated by an ingress electronic L2 data frame, ii) a Destination MAC address that is part of the header of an ingress electronic L2 data frame, iii) a VLAN identifier (e.g., VID) that is part of the ingress electronic L2 frame or associated with the port, protocol, or iv) a Source IP address, subnet mask or other VLAN classifier associated with the ingress electronic L2 data frame. In this case, each Transmit Table entry can include an "Address Type" field that specifies the type of destination address stored in the "Destination Address" field of the Transmit Table entry as shown in FIG. 4. Furthermore, the Receive Table entries can include additional information that extends beyond the egress data frame optical transceiver ID and corresponding electrical I/O port ID. For example, each Receive Table entry can also possibly store an identifier for the statically-assigned Rx wavelength/optical channel that has been provisioned for the optical transceiver referenced by the optical transceiver ID ("SFP ID") field of the Receive Table entry as shown in FIG. 4.

Furthermore, the packet switching fabric 101 and the switch controller 102 of the packet management unit 3 can be realized by a programmable microprocessor and/or other programmable logic and/or dedicated hardware such as an ASIC or FPGA. Also note that the packet switching fabric 101 can employ output buffers or queues that stores electrical L2 data frames forwarded by the switch core for delivery to the appropriate link layer and physical devices. Furthermore, the link layer and physical devices (e.g., two shown as MAC/PHY devices 103A, 103B) that are connected to the communication equipment 7 can provide common layer 2 functions (such as frame delimiting and recognition, protection against errors by means of generating and checking frame check sequences, and control of access to the physical transmission medium) as well as common layer 1 functions (such as character encoding/decoding and/or SerDes) for the egress data frames and ingress data frames processed by the packet switching fabric 101. And the optical transceiver link layer and physical devices (e.g., the MAC/PHY devices 107A and 109A/107B and 109B) can provide common layer 2 functions (such as frame delimiting and recognition, protection against errors by means of generating and checking frame check sequences, and control of access to the physical transmission medium) as well as common layer 1 functions (such as character encoding/decoding and/or SerDes) for the egress data frames and ingress data frames processed by the packet switching fabric 101.

In the embodiment of FIG. 13, the respective optical channels/wavelengths of the optical signal(s) that are demultiplexed or dropped by the WDM device(s) 4 of the respective IOLM units of the network are fixed or statically assigned by the design of the drop function of the WDM device(s) 4 and can be supplied to predetermined receive function ports of the optical transceiver(s) 2 of the respective IOLM units. This architecture allows a particular IOLM unit to receive point-to-point optical communication from any other IOLM unit using the optical channel(s)/wavelength(s) that are demultiplexed or dropped by the WDM device(s) 4 of the particular IOLM unit. Furthermore, one or more optical transceivers (e.g., tunable SFP module 2) of the respective IOLM units are tunable and thus can transmit over a number of optical channels/wavelengths. In this embodiment, a list of optical channels/wavelengths that are used by the transmit function of the tunable optical transceiver(s) (e.g., tunable SFP module 2) of the respective IOLM units are provisioned by an automatic provisioning process carried out by the Network Manager 61. The automatic provisioning process can use control/management plane frames that are communicated between the Network Manager 61 and the IOLM units over the Optical Transport Network 22. In this embodiment, the automatic provisioning process derives configuration information that is communicated to the packet management unit 3 of each IOLM Unit 1 of the network. The configuration information includes a list of destination addresses and corresponding optical channels/wavelengths that are used by each tunable optical transceiver (e.g., tunable SFP module 2) an of the IOLM unit 1. Such configuration information (including the list of destination addresses and corresponding optical channels/wavelengths that are used by each tunable optical transceiver of the IOLM unit 1) can be used by the switch controller 102 of the packet management unit 3 to initialize and/or update the entries of the Transmit Table and Receive Table maintained by the packet management unit 3. The switch controller 102 can use the entries of the Transmit Table to dynamically configure (i.e., tune) the Tx function(s) of the optical transceiver(s) of the IOLM unit based on the destination address of ingress data frames and to control the switching operation of the packet switching fabric for ingress data frames as described above. The switch controller 102 can also use the entries of the Receive Table to control the switching operation of the packet switching fabric for egress data frames as described above.

Figure 14:
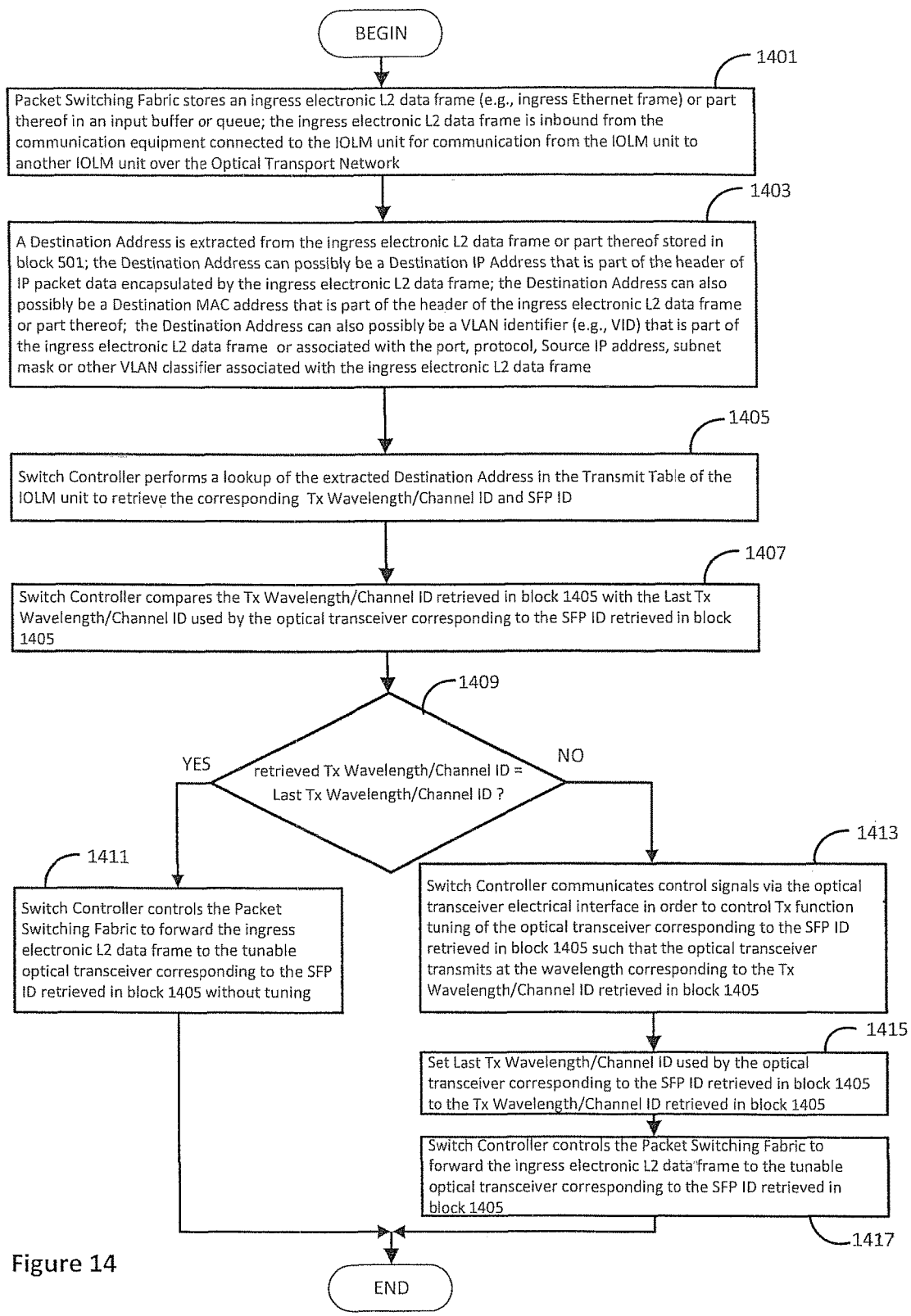
FIG. 14 is a flow chart illustrating ingress data frame processing by the IOLM unit of FIG. 13.

FIG. 14 illustrates the operations of the packet management unit 3 of IOLM unit 1 of FIG. 13 in processing an ingress electrical L2 data frame (e.g., ingress Ethernet frame). The ingress electronic L2 data frame is inbound from the communication equipment 7 connected to the IOLM unit 1 for communication from the IOLM unit 1 to another IOLM unit over the Optical Transport Network 22. The operations begin in block 1401 where digital logic circuitry of the Packet Switching Fabric 101 stores the ingress electronic L2 data frame or part thereof in an input buffer or queue.

In block 1403, the digital logic circuitry of the Packet Switching Fabric 101 of the packet management unit 3 extracts a Destination Address from the ingress electronic L2 data frame or part thereof stored in block 1401. The Destination Address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame.

In block 1405, the Switch Controller 102 of the packet management unit 3 performs a lookup of the Destination Address extracted in block 1403 in the Transmit Table of the IOLM unit 1 to retrieve the corresponding Tx Wavelength/ Optical channel ID and optical transceiver ID ("SFP ID").

In block 1407, the Switch Controller 102 of the packet management unit 3 compares the Tx Wavelength/Channel ID retrieved in block 1405 with the Last Tx Wavelength/ Channel ID used by the optical transceiver corresponding to the SFP ID retrieved in block 1405.

In block 1409, the Switch Controller 102 of the packet management unit 3 evaluates the comparison of block 1407 to determine if Tx Wavelength/Channel ID retrieved in block 1405 matches the Last Tx Wavelength/Channel ID used by the optical transceiver corresponding to the SFP ID retrieved in block 1405. If so, the operations continue to block 1411; otherwise, the operations continue to blocks 1413 to 1417.

In block 1411, the Switch Controller 102 controls the Packet Switching Fabric 101 of the packet management unit 3 to forward the ingress electronic L2 data frame to the link layer and physical devices coupled to tunable optical transceiver corresponding to the SFP ID retrieved in block 1405 without tuning such that the tunable optical transceiver transmits optical packet data corresponding to the ingress electronic L2 data frame at the wavelength corresponding to the Tx Wavelength/Channel ID retrieved in block 1405 for transport on the Optical Transport Network 22, and the operations end.

In block 1413, the Switch Controller 102 of the packet management unit 3 communicates control signals via the optical transceiver electrical interface 106 in order to control Tx function tuning of the optical transceiver corresponding to the SFP ID retrieved in block 1405 such that the optical transceiver transmits at the wavelength corresponding to the Tx Wavelength/Channel ID retrieved in block 1405.

In block 1415, the Switch Controller 102 of the packet management unit 3 sets the Last Tx Wavelength/Channel ID used by the optical transceiver corresponding to the SFP ID retrieved in block 1405 to the Tx Wavelength/Channel ID retrieved in block 1405.

In block 1417, the Switch Controller 102 controls the Packet Switching Fabric 101 of the packet management unit 3 to forward the ingress electronic L2 data frame to the link layer and physical devices coupled to tunable optical transceiver corresponding to the SFP ID retrieved in block 1405 (which was tuned in block 1413) such that the optical transceiver transmits optical packet data corresponding to the ingress electronic L2 data frame at the wavelength corresponding to the Tx Wavelength/Channel ID retrieved in block 1405 for transport on the Optical Transport Network 22, and the operations end.

The operations of the packet management unit 3 of IOLM unit 1 of FIG. 13 in processing an egress electrical L2 data frame (e.g., egress Ethernet frame) are similar to those described above in conjunction with FIG. 5.

Figure 15A:
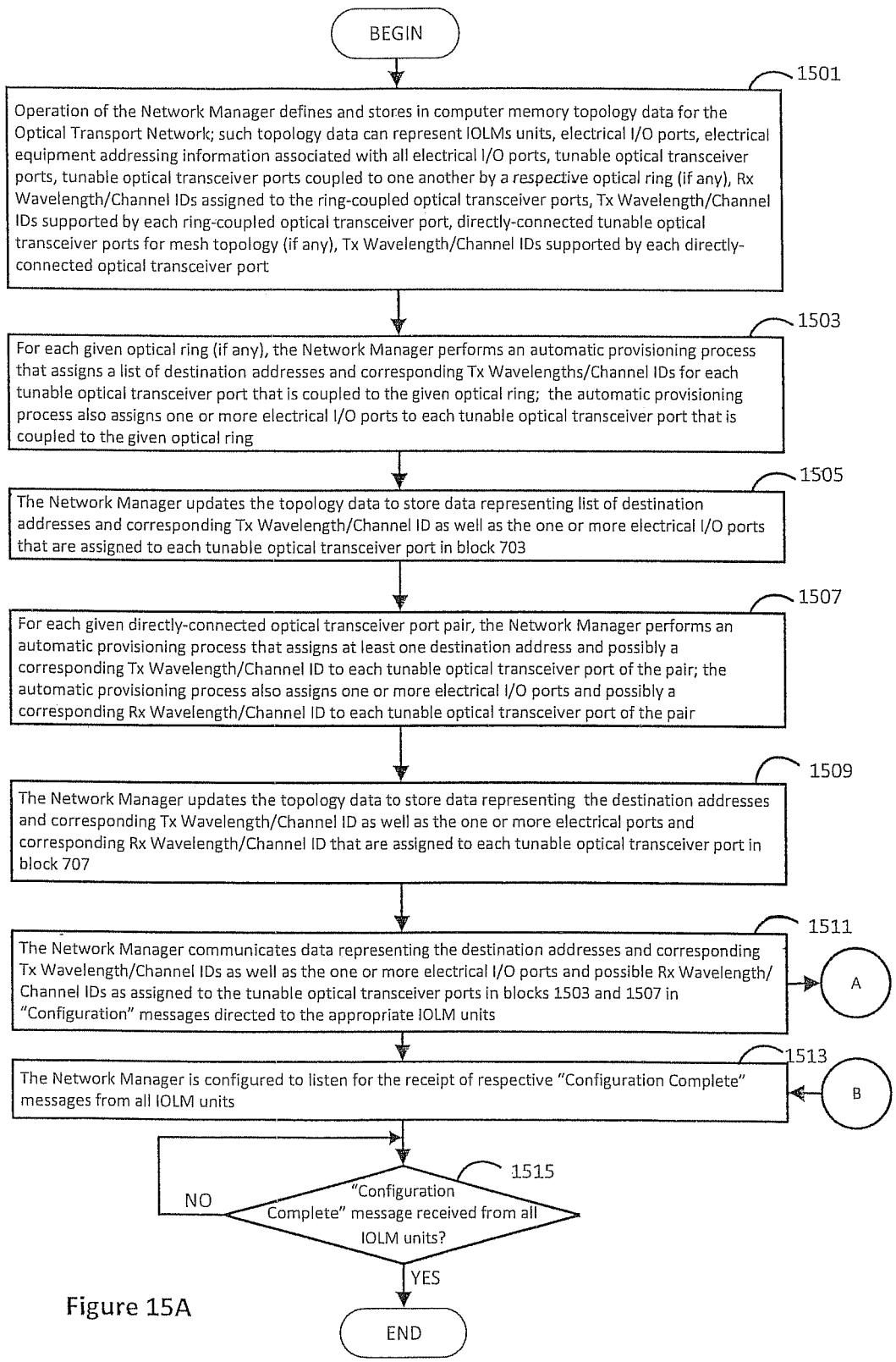
FIGS. 15A and 15B, collectively, is a flow chart illustrating an embodiment of an automatic provisioning process carried out by a network manager and the IOLM units (FIG. 13) of the network.
Figure 15B:
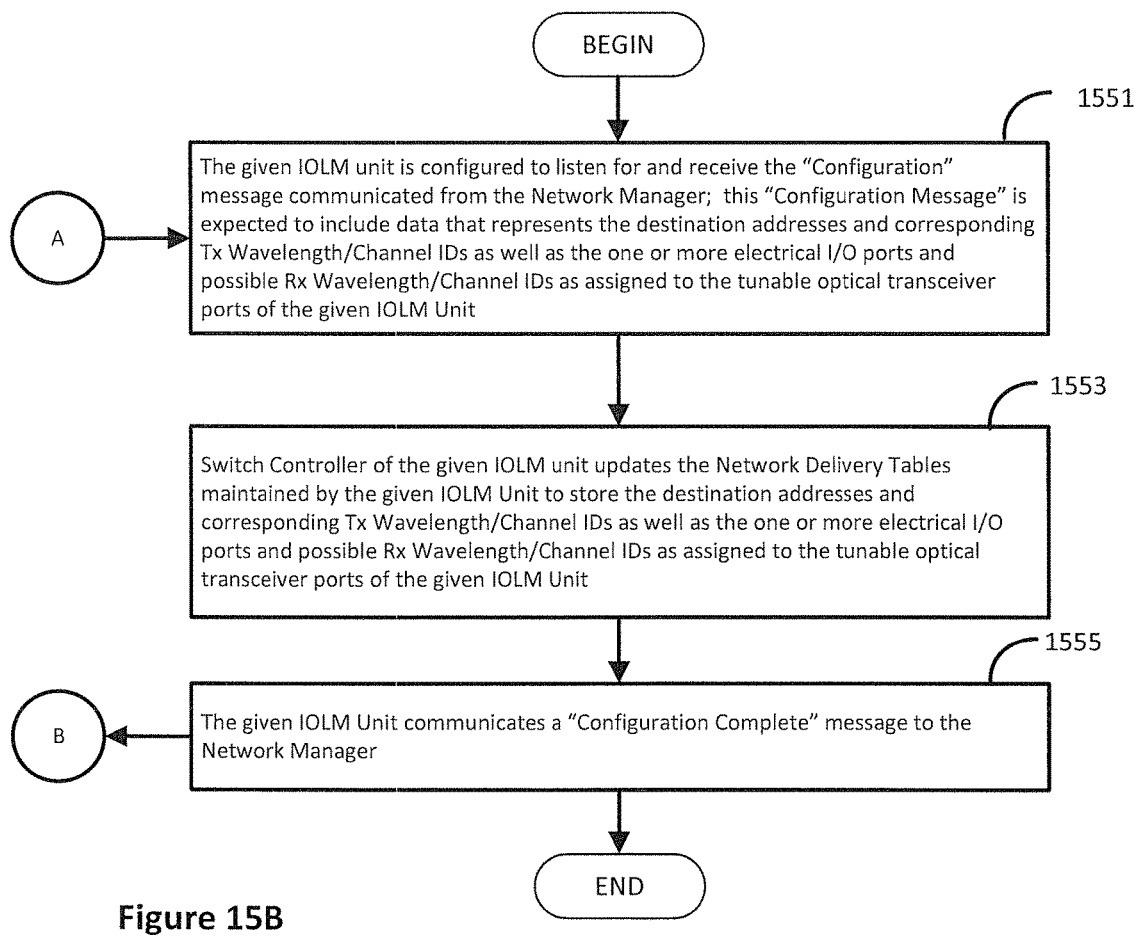

FIGS. 15A and 15B illustrate an example automatic provisioning process carried out by the Network Manager 61 and IOLM units that statically-provisions and configures (i.e., tunes) the optical channels/wavelengths used by the transmit function of the tunable optical transceiver(s) (e.g., tunable SFP module 2 of FIG. 13) of the respective IOLM units of the network. In the embodiment of FIGS. 15A and 15B, the respective optical channels/wavelengths of optical signal(s) that are demultiplexed or dropped by the WDM device(s) 4 of IOLM units that are configured in an optical ring of the network are fixed or statically assigned by the design of the drop function of such WDM device(s) 4 and can be supplied to predetermined receive function ports of the optical transceiver(s) 2 of the respective IOLM units. This architecture allows a particular IOLM unit to receive point-to-point optical communication from any other IOLM unit using the optical channel(s)/wavelength(s) that are demultiplexed or dropped by the WDM device(s) 4 of the particular IOLM unit. Furthermore, one or more optical transceivers (e.g., tunable SFP module 2 of FIG. 13) of the respective IOLM units can be tunable and thus can transmit over a number of optical channels/wavelengths. The operations of the Network Manager 61 are described below with respect to FIG. 15A. The operations of the respective IOLM units are described below with respect to FIG. 15B.

The operations of the Network Manager 61 begin in block 1501 where the Network Manager 61 defines and stores in computer memory topology data for the Optical Transport Network 22 and the system elements coupled thereto. Such topology data can represent IOLMs units, IOLM electrical I/O ports, electrical equipment addressing information associated with all IOLM electrical I/O ports, IOLM tunable optical transceiver ports, IOLM tunable optical transceiver ports coupled to one another by a respective optical ring (if any), Rx Wavelength/Channel IDs that are supported by IOLM ring-coupled optical transceiver ports, Rx Wavelength/Channel IDs that are assigned to the IOLM ring-coupled optical transceiver ports, Tx Wavelength/Channel IDs supported by each IOLM ring-coupled optical transceiver port, IOLM directly-connected tunable optical transceiver ports for mesh topology (if any), and Tx Wavelength/ Channel IDs supported by each IOLM directly-connected optical transceiver port. The topology data can be provided by user-input of the respective parameters with respect to the Network Manager 61. Alternatively, the parameters can be derived from configuration information communicated from the respective IOLM units to the Network Manager 61, for example using control/management plane data frames over the Optical Transport Network 22.

In block 1503, for each given optical ring (if any) of the network, the Network Manager 61 performs an automatic provisioning process that assigns a list of destination addresses and corresponding Tx Wavelength/Optical Channel ID for each IOLM tunable optical transceiver port that is coupled to the given optical ring. As described above, the destination address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame. The automatic provisioning process can also assign one or more electrical I/O ports to each tunable optical transceiver port that is coupled to the given optical ring.

In block 1505, the Network Manager 61 updates the topology data to store data representing the destination addresses and corresponding Tx Wavelength/Optical Channel ID as well as the one or more electrical I/O ports that are assigned to each tunable optical transceiver port in block 1503.

In block 1507, for each given IOLM directly-connected optical transceiver port pair of the network, the Network Manager 61 performs an automatic provisioning process that assigns at least one destination address and possibly a corresponding Tx Wavelength/Optical Channel ID to each tunable optical transceiver port of the pair. As described above, the destination address can possibly be one if many types, such as i) a Destination IP Address that is part of the header of IP packet data encapsulated by the ingress electronic L2 data frame, ii) a Destination MAC address that is part of the header of the ingress electronic L2 data frame or part thereof, iii) a VLAN identifier (e.g., VID) that is part of the ingress electronic L2 data frame, or iv) a VLAN identifier associated with the port, protocol, Source IP address, subnet mask or other VLAN classifier associated with the ingress electronic L2 data frame. The automatic provisioning process can also assign one or more electrical I/O ports and possibly a corresponding Rx Wavelength/Optical Channel ID to each tunable optical transceiver port of the pair.

In block 1509, the Network Manager 61 updates the topology data to store data representing the destination addresses and corresponding Tx Wavelength/Optical Channel ID as well as the one or more electrical I/O ports and corresponding Rx Wavelength/Optical Channel ID that are assigned to each tunable optical transceiver port in block 1507.

In block 1511, the Network Manager 61 communicates data representing the destination addresses and corresponding Tx Wavelength/Optical Channel IDs as well as the one or more electrical I/O ports and possible Rx Wavelength/Optical Channel IDs as assigned to the IOLM tunable optical transceiver ports in blocks 1503 and 1507 in "Configuration" messages directed to the appropriate IOLM units. The Configuration messages can be communicated from the Network Manager 61 to the appropriate IOLM units using control/management plane data frames transported over the Optical Transport Network 22.

In block 1513, the Network Manager 61 is configured to listen for the receipt of respective "Configuration Complete" messages from all IOLM units. The Configuration Complete messages can be communicated from the IOLM units to the Network Manager 61 using control/management plane data frames transported over the Optical Transport Network 22.

In block 1515, the Network Manager 61 waits until the "Configuration Complete" message has been received from all IOLM units. If so, the operations of the Network Manager 61 that are part of the automatic provisioning process ends.

Turning now to the operations of a respective IOLM unit as illustrated in FIG. 15B, the operations of a respective IOLM unit begins in block 1551 where the given IOLM unit is configured to listen for and receive the Configuration message communicated from the Network Manager 61 in block 1511. The Configuration message can be communicated from the Network Manager 61 to the given IOLM unit using control/management plane data frames transported over the Optical Transport Network 22. As described above, this "Configuration Message" is expected to include data that represents the destination addresses and corresponding Tx Wavelength/Optical Channel IDs as well as the one or more electrical I/O ports and possible Rx Wavelength/Optical Channel IDs as assigned to the tunable optical transceiver ports of the given IOLM Unit.

In block 1553, the Switch Controller 102 of the packet management unit 3 of the given IOLM unit updates the Network Delivery Tables maintained by the given IOLM unit to store one or more Transmit Table entries that map the destination addresses and corresponding Tx Wavelength/Channel IDs as assigned to the tunable optical transceiver ports of the given IOLM Unit as well as one or more Receive Table entries that map one or more electrical I/O ports and possible Rx Wavelength/Channel IDs as assigned to the tunable optical transceiver ports of the given IOLM Unit.

In block 1555, the given IOLM Unit communicates a Configuration Complete message to the Network Manager 61 for receipt and processing by the Network Manager 61 in blocks 1513 and 1515, and the operations of the given IOLM unit that are part of the automatic provisioning process ends. The Configuration Complete message can be communicated from the given IOLM unit to the Network Manager 61 using control/management plane data frames transported over the Optical Transport Network 22.

Note that the automatic provisioning process carried out by the Network Manager 61 and IOLM units can be repeated in the event that of a change or update to the network topology or configuration of the Optical Transport Network 22 or the IOLM units or the communication equipment 7 connect thereto.

FIGS. 8A-8E show exemplary data structures (referred to herein as Inventory Tables) that can be maintained by the respective IOLM units of FIG. 1 and communicated or otherwise transferred to the Network Manager 61 and maintained as part of the topology data stored in the memory of the Network Manager in block 1501 of FIG. 15A. The Inventory Table for each respective IOLM unit can include information that relates to each optical transceiver of the IOLM unit, including i) an optical transceiver port ID ("SFP Port ID"), ii) an identifier for the Rx Wavelength/Optical Channel ID assigned to the Rx function of the optical transceiver, iii) an identifier for one or more electrical I/O ports that are mapped to the Rx Wavelength/Optical Channel ID assigned to the Rx function of the optical transceiver, iv) one or more destination addresses for communication equipment connected to the electrical I/O ports that are mapped to the Rx Wavelength/Optical Channel ID assigned to the Rx function of the optical transceiver, and v) a list of Tx Wavelength/Optical Channel IDs and associated In-Service-Flags and mapped-to-destination addresses for the Tx function of the optical transceiver as shown.

Figure 16:
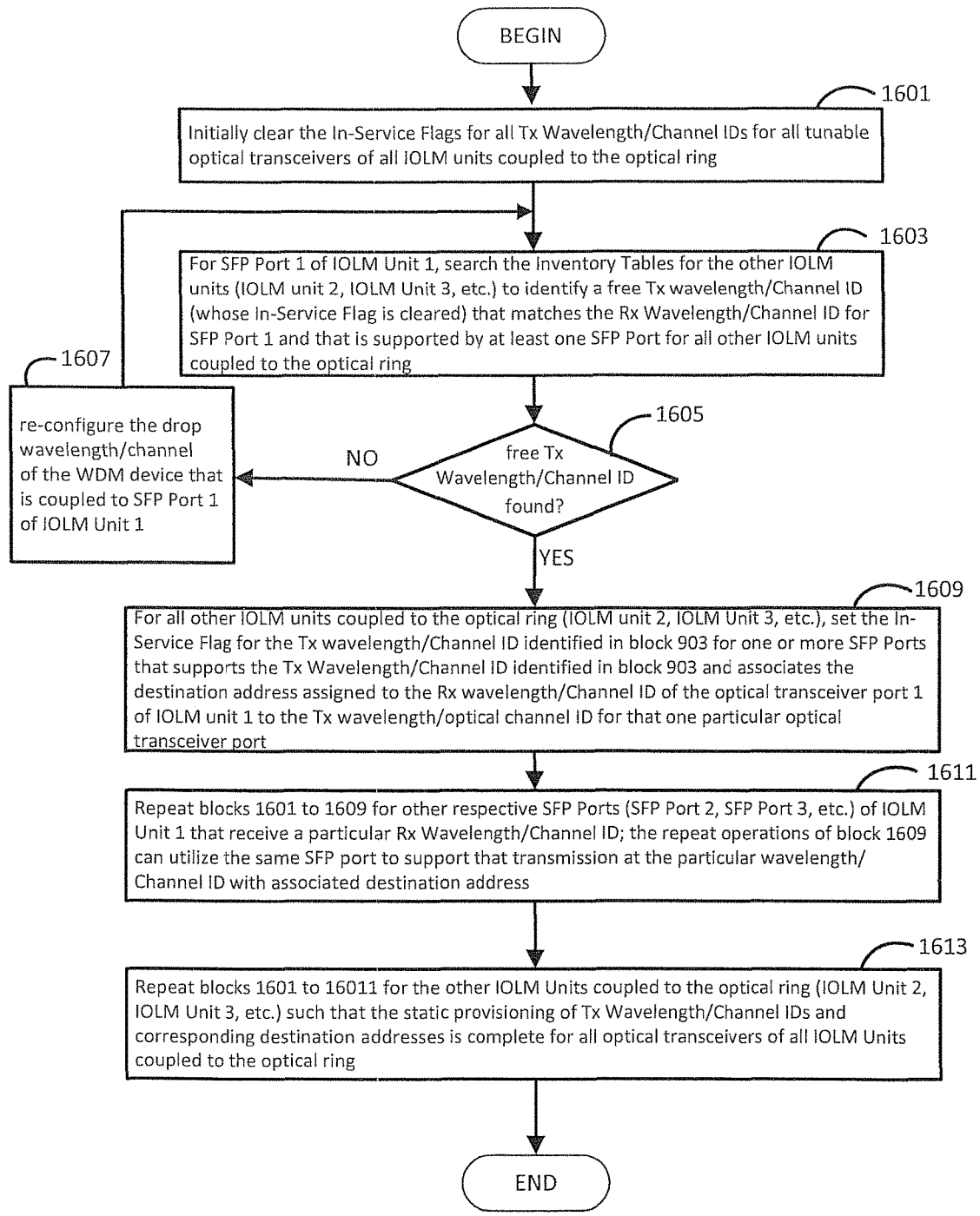
FIG. 16 is a flow chart illustrating an embodiment of automatic provisioning operations for optical transceivers that are coupled together in a ring topology, which can be part of the automatic provisioning process of FIGS. 15A and 15B.

FIG. 16 illustrates an exemplary embodiment of detailed operations of the Network Manager 61 in carrying out the automatic provisioning process of the ring-coupled optical transceivers of the IOLM units as part of block 1503 of FIG. 15A. These operations can use the Inventory Tables of FIGS. 8A-8E in the automatic provisioning process as will be evident from the description below.

The operations begin in block 1601 where the Network Manager 61 initially clears the In-Service Flags for all Tx wavelength/optical channel IDs for all tunable optical transceivers of all IOLM units coupled to the optical ring.

In block 1603, for optical transceiver port 1 (SFP Port 1) of IOLM Unit 1, the Network Manager 61 searches the Inventory Tables for the other IOLM units (IOLM unit 2, IOLM Unit 3, etc.) to identify a free Tx wavelength/optical channel ID (whose In-Service Flag is cleared) that matches the Rx wavelength/optical channel ID for optical transceiver port 1 and that is supported by at least one optical transceiver port for all other IOLM units coupled to the optical ring.

In block 1605, the Network Manager 61 determines whether a free Tx wavelength/optical channel ID was found in the search of block 1603. If so, the operations continue to block 1609. If not, the operations continue to block 1607 where the network operator is instructed to re-configure the drop wavelength/optical channel of the WDM device that is coupled to the optical transceiver port 1 of IOLM Unit 1. A recommendation for the drop wavelength/optical channel can identified by searching the Inventory Tables to identify a free Tx wavelength/Channel ID (whose In-Service Flag is cleared) that is supported by at least one optical transceiver port for all other IOLM units coupled to the optical ring. After re-configuring the drop wavelength/optical channel of the WDM device that is coupled to the optical transceiver port 1 of IOLM Unit 1, the operations return to block 1603 to repeat the processing of blocks 1603 to 1607.

In block 1609, for all other IOLM units coupled to the optical ring (IOLM unit 2, IOLM Unit 3, etc.), the Network Manager 61 sets the In-Service Flag for the Tx wavelength/optical channel ID identified in block 903 for one particular optical transceiver port that supports the Tx wavelength/optical channel ID identified in block 903 and associates the destination address assigned to the Rx wavelength/Channel ID of the optical transceiver port 1 of IOLM unit 1 to the Tx wavelength/optical channel ID for that one particular optical transceiver port.

In block 1611, the Network Manager 61 repeats the operations of blocks 1601 to 1609 for other respective optical transceiver ports (SFP Port 2, SFP Port 3, etc.) of IOLM Unit 1 that receive a particular Rx wavelength/optical channel ID. Note that the repeat operations of block 1609 can utilize a different optical transceiver port to support that transmission at the particular wavelength/optical channel ID and associated destination address(es).

In block 1613, the Network Manager 61 repeats the operations of blocks 1601 to 1611 for the other IOLM Units coupled to the optical ring (IOLM Unit 2, IOLM Unit 3, etc.) such that the static provisioning of Tx wavelength/optical channel IDs and corresponding destination addresses is complete for all optical transceivers of all IOLM Units coupled to the optical ring.

Figure 17:
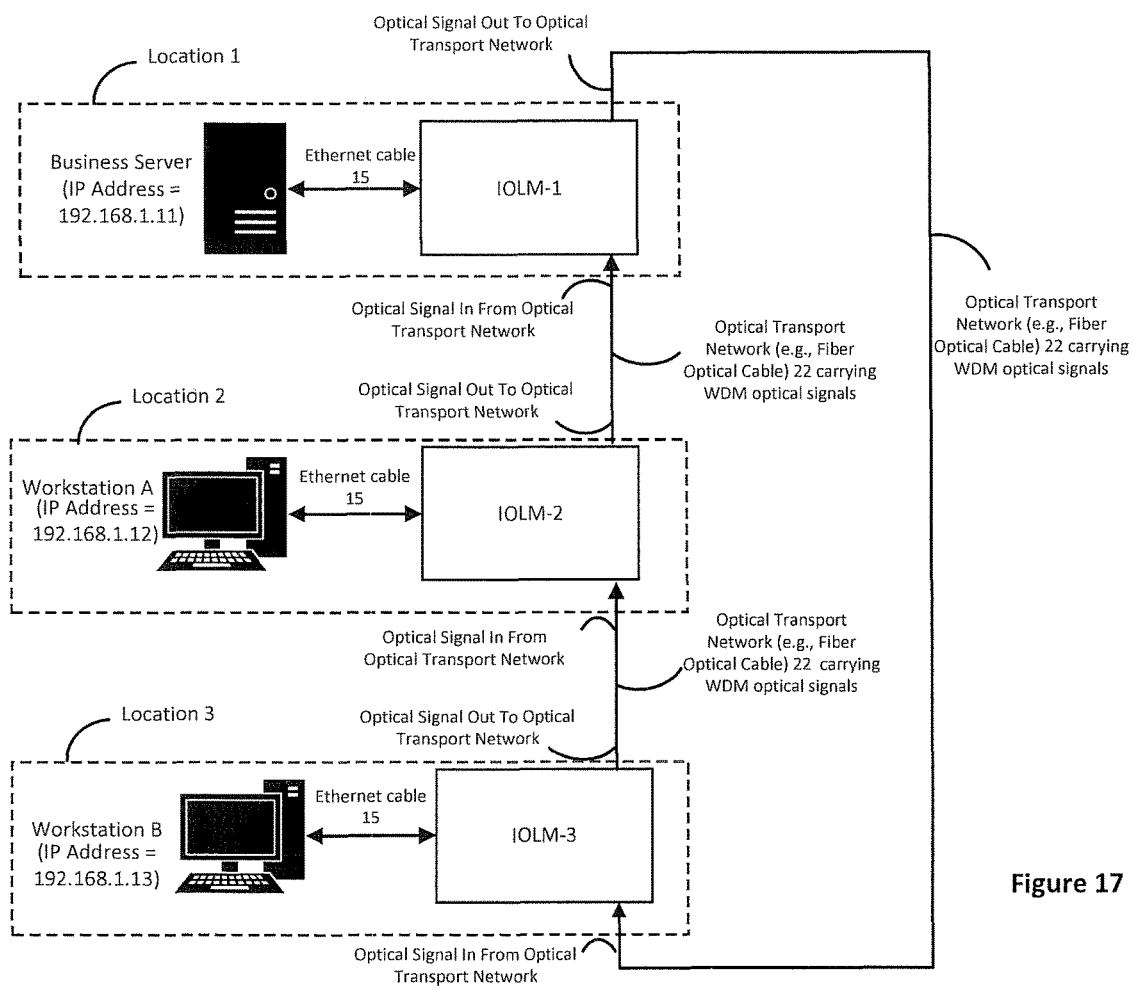
FIG. 17 is a high level schematic diagram of a network architecture that employs an optical ring of three IOLM units (FIG. 13) according to the present disclosure.

FIG. 17 is a schematic illustration of an exemplary network that employs three IOLM units (labeled IOLM-1, IOLM-2, IOLM-3) that are configured in a ring topology via the Optical Transport Network 22. A first computer system (labeled "Business Server") having an assigned IP Address of 192.168.001.001 is connected to the demarcation port 8 of the IOLM-1 via an Ethernet cable with the Business Server and IOLM-1 located at a first premises (labeled "Location 1"). The Business Server corresponds to the computer equipment 7 of FIGS. 1 and 2 that are connected to the demarcation port 8 of the respective IOLM unit. A second computer system (labeled "Workstation A") having an assigned IP Address of 192.168.001.002 is connected to the demarcation port 8 of the IOLM-2 via an Ethernet cable with Workstation A and IOLM-2 located at a second premises (labeled "Location 2"). Workstation A corresponds to the computer equipment 7 of FIGS. 1 and 2 that are connected to the demarcation port 8 of the respective IOLM unit. A third computer system (labeled "Workstation B") having an assigned IP Address of 192.168.001.003 is connected to the demarcation port 8 of the IOLM-3 via an Ethernet cable with Workstation B and IOLM-3 located at a third premises (labeled "Location 3"). Workstation B corresponds to the computer equipment 7 of FIGS. 1 and 2 that are connected to the demarcation port 8 of the respective IOLM unit. The first, second and third premises (locations 1, 2, and 3) can be remotely located relative to one another, such as in different buildings on a campus or different floors in an office building. The Optical Transport Network 22 transports WDM optical signals (optical packet data) between the premises to allow for communication between the IOLM units of the network over optical channels/wavelengths that are provisioned for point-to-point communication between IOLM units. The IOLM units perform packet switching operations that are configured to support the optical channels/wavelengths that are provisioned for point-to-point communication between IOLM units.

The IP addresses of the Business Server, Workstation A and Workstation B can support internal network and external network identification. In this case, the destination address of the Layer 2 data frames that originate from the Business Server, Workstation A and Workstation B, whether transmitted or received, can traverse multiple network segments. Furthermore, it is assumed that network segments are within the same enterprise. It is also contemplated that the network segments can be on separate subnet masks for isolation and separate gateways to prevent packet collisions if the destination is the same.

FIG. 18 illustrates the static provisioning and configuration of the WDM devices and optical transceiver modules of the IOLM units of the network of FIG. 17. More specifically, the WDM device 4 of IOLM-1 is statically configured to receive/drop the optical signal with Rx Wavelength (in nm) of 1528.77. The WDM device 4 of IOLM-2 is statically configured to receive/drop the optical signal with Rx Wavelength (in nm) of 1568.77. The WDM device 4 of IOLM-3 is statically configured to receive/drop the optical signal with Rx Wavelength (in nm) of 1567.95.

Furthermore, IOLM-1 has one optical transceiver, which is identified by an SFP ID of 1. The Rx function of the optical transceiver identified by the SFP ID of 1 receives the drop optical signal with the Rx Wavelength of 1528.77 from the WDM device 4 of IOLM-1. The Tx function of the optical transceiver identified by the SFP ID of 1 is dynamically tunable and supports transmission with a Tx Wavelength of 1568.77 for communication to IOLM-2 as well as transmission with a Tx Wavelength of 1567.77 for communication to IOLM-3.

IOLM-2 has a one optical transceiver, which is identified by an SFP ID of 1. The Rx function of the optical transceiver identified by the SFP ID of 1 receives the drop optical signal with the Rx Wavelength of 1568.77 from the WDM device 4 of IOLM-2. The Tx function of the optical transceiver identified by the SFP ID of 1 is dynamically tunable and supports transmission with a Tx Wavelength of 1528.77 for communication to IOLM-1 as well as transmission with a Tx Wavelength of 1567.77 for communication to IOLM-3.

IOLM-3 has one optical transceiver, which are identified by an SFP ID of 1. The Rx function of the optical transceiver identified by the SFP ID of 1 receives the drop optical signal with the Rx Wavelength of 1567.77 from the WDM device 4 of IOLM-3. The Tx function of the optical transceiver identified by the SFP ID of 1 is dynamically tunable and supports transmission with a Tx Wavelength of 1528.77 for communication to IOLM-1 as well as transmission with a Tx Wavelength of 1568.77 for communication to IOLM-2.

FIGS. 19A, 19B, 19C illustrate the Network Delivery Tables for IOLM-1, IOLM-2 and IOLM-3, respectively. Note that the Transmit Table for IOLM-1 includes i) a first entry that maps the Destination IP address of 192.168.001.002 (the IP address assigned to Workstation A that is connected to IOLM-2) to the Tx function of the optical transceiver identified by the SFP ID of 1 and a Tx Wavelength of 1568.77 for communication to IOLM-2, and ii) a second entry that maps the Destination IP address of 192.168.001.003 (the IP address assigned to Workstation B that is connected to IOLM-3) to the Tx function of the optical transceiver identified by the SFP ID of 1 and a Tx Wavelength of 1567.77 for communication to IOLM-3. Note that the Receive Table for IOLM-1 includes a single entry that maps the Rx function of the optical transceiver identified by the SFP ID of 1 (which receives a Rx Wavelength of 1528.77 for communication to IOLM-1) to the electrical I/O port identified by the electrical I/O port ID of 1 that is connected to the Business Server.

Note that the Transmit Table for IOLM-2 includes i) a first entry that maps the Destination IP address of 192.168.001.001 (the IP address assigned to Business Server that is connected to IOLM-1) to the Tx function of the optical transceiver identified by the SFP ID of 1 and a Tx Wavelength of 1528.77 for communication to IOLM-1, and ii) a second entry that maps the Destination IP address of 192.168.001.003 (the IP address assigned to Workstation B that is connected to IOLM-3) to the Tx function of the optical transceiver identified by the SFP ID of 1 and a Tx Wavelength of 1567.77 for communication to IOLM-3. Note that the Receive Table for IOLM-2 includes a single entry that maps the Rx function of the optical transceiver identified by the SFP ID of 1 (which receives a Rx Wavelength of 1568.77 for communication to IOLM-1) to the electrical I/O port identified by the electrical I/O port ID of 1 that is connected to the Workstation A.

Note that the Transmit Table for IOLM-3 includes i) a first entry that maps the Destination IP address of 192.168.001.001 (the IP address assigned to Business Server that is connected to IOLM-1) to the Tx function of the optical transceiver identified by the SFP ID of 1 and the Tx Wavelength of 1528.77 for communication to IOLM-1, and ii) a second entry that maps the Destination IP address of 192.168.001.002 (the IP address assigned to Workstation A that is connected to IOLM-2) to the Tx function of the optical transceiver identified by the SFP ID of 1 and a Tx Wavelength of 1568.77 for communication to IOLM-2. Note that the Receive Table for IOLM-3 includes a single entry that maps the Rx function of the optical transceiver identified by the SFP ID of 1 (which receives a Rx Wavelength of 1567.77 for communication to IOLM-3) to the electrical I/O port identified by the electrical I/O port ID of 1 that is connected to the Workstation B.

With this configuration, an L2 data frame that originates from the Business Server and encapsulates an IP packet having a destination IP address of 192.168.001.002 (the IP address assigned to Workstation A that is connected to IOLM-2) is processed by the packet switching function of IOLM-1 by tuning to the Tx function of the optical transceiver identified by the SFP ID of 1 of IOLM-1 to the Tx Wavelength of 1568.77 (if not already tuned to the Tx Wavelength of 1568.77) according to the mapping providing by first Transmit Table entry of IOLM-1 (which matches the destination IP address encapsulated by the L2 data frame) and by forwarding the L2 data frame to the link layer and physical devices for the tuned Tx function of the optical transceiver identified by the SFP ID of 1 of IOLM-1, which transmits optical packet data with the Tx Wavelength of 1568.77 for communication to IOLM-2. The Rx function of the optical transceiver identified by the SFP ID of 1 of IOLM-2 receives and converts the optical packet data into an L2 data frame. This L2 data frame is switched by the packet switching function of IOLM-2 to the link layer and physical devices for the electrical I/O port identified by the electrical I/O port ID 1 that is mapped to the Rx function of the optical transceiver identified by the SFP ID of 1 of IOLM-2 according to the single Receive Table entry of IOLM-2. The L2 data frame is then output from the electrical I/O port identified by the electrical I/O port ID 1 of IOLM-2 to the Workstation A connected thereto.

Similarly, an L2 data frame that originates from the Business Server and encapsulate an IP packet having a destination IP address of 192.168.001.003 (the IP address assigned to Workstation B that is connected to IOLM-2) is processed by the packet switching function of IOLM-1 by tuning to the Tx function of the optical transceiver identified by the SFP ID of 1 of IOLM-1 to the Tx Wavelength of 1567.77 (if not already tuned to the Tx Wavelength of 1568.67) according to the mapping providing by second Transmit Table entry of IOLM-1 (which matches the destination IP address encapsulated by the L2 data frame) and by forwarding the L2 data frame to the link layer and physical devices for the tuned Tx function of the optical transceiver identified by the SFP ID of 2 of IOLM-1, which transmits optical packet data with a Tx Wavelength of 1567.77 for communication to IOLM-3. The Rx function of the optical transceiver identified by the SFP ID of 1 of IOLM-3 receives and converts the optical packet data into an L2 data frame. This L2 data frame is switched by the packet switching function of IOLM-3 to the link layer and physical devices for the electrical I/O port identified by the electrical I/O port ID 1 that is mapped to the Rx function of the optical transceiver identified by the SFP ID of 1 of IOLM-3 according to the single Receive Table entry of IOLM-3. The L2 data frame is then output from the electrical I/O port identified by the electrical I/O port ID 1 of IOLM-3 to the Workstation B connected thereto.

Similar operations are provided for other end-point to end-point communications, such as from Workstation A to the Business Server, Workstation A to Workstation B, Workstation B to the Business Server and Workstation B to Workstation A.

Figure 20:
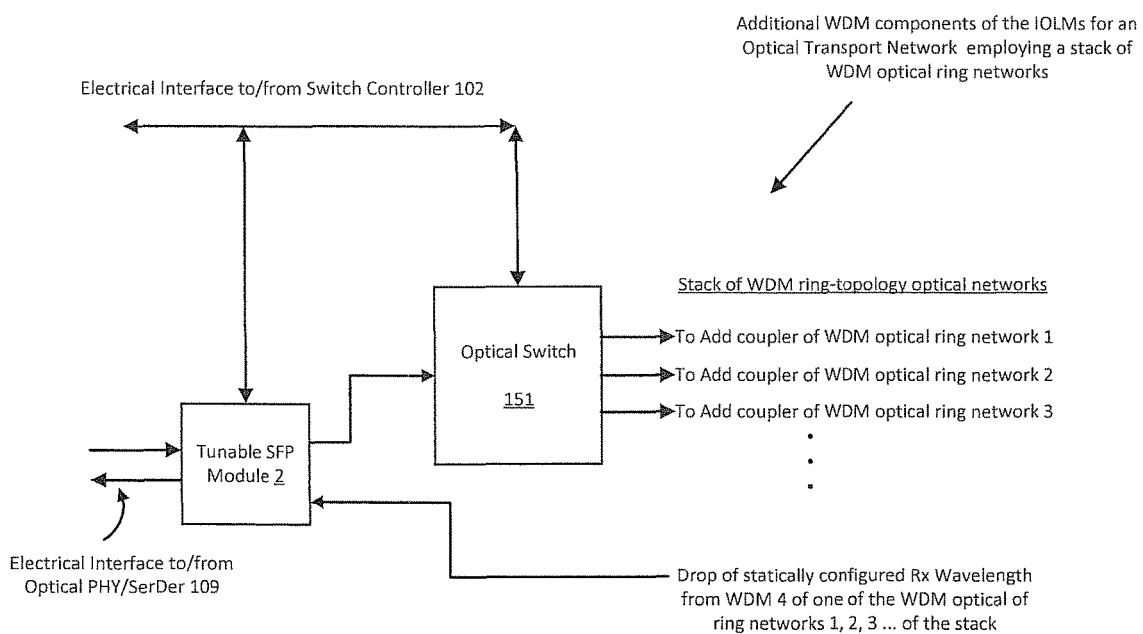
FIG. 20 is a schematic diagram of a network architecture that employs IOLM units that connect to a stack of WDM ring optical networks according to the present disclosure.

In other embodiments, the Optical Transport Network 22 can include a stack of WDM optical ring networks as shown in FIG. 20. In this configuration, the network is provisioned such that different sets of predefined optical channels/wavelengths are carried on the respective optical ring networks of the stack, and an electrically-controlled optical switch 151 can be coupled between the output port of the transmit function of a respective tunable optical transceiver and WDM add multiplexers for the stack of WDM optical ring networks. The switchable optical path of the optical switch 151 can be controlled electrically via commands communicated via an electrical interface between the switch controller 102 of the IOLM unit and the optical switch 151. In this configuration, the commands can configure the switchable optical path to provide an optical path from the output port of the transmit function of a respective tunable optical transceiver to the WDM add multiplexer for a select one WDM optical ring network of the stack of WDM optical ring networks. One or more optical switch configuration parameters for a given path can be part of the Transmit Table entries of the IOLM units where the entries map a destination address to a corresponding transmit function optical channel/Wavelength ID and optical switch configuration parameter(s). In this case, the optical switch configuration parameter(s) of a Transmit Table entry corresponds to a switched optical path provided by the optical switch 151 that leads to the one WDM optical ring of the stack that has been provisioned to carry the optical channel/Wavelength ID of the Transmit Table entry. After looking up and accessing the matching Transmit Table entry, the switch controller 102 can use the transmit function optical channel/Wavelength ID of the matching Transmit Table entry to dynamically configure (i.e., tune) an optical receiver of the IOLM unit (if need be) and use the optical switch configuration parameter(s) of the matching Transmit Table entry to dynamically configure the optical switch 151 that is coupled to the output of the Tx function of the dynamically tuned optical transceiver (if need be). The switch controller 102 can forward the data frame to the link layer and physical devices for this optical receiver for transmission and transport over the WDM optical ring coupled thereto by the optical switch 151.

In other embodiments, an IOLM unit of the network can receive data frames communicated from another predefined IOLM unit over a provisioned point-to-point optical link there between. In this configuration, the Transmit Table entries of the IOLM unit can be used as part of data frame forward processing of the IOLM unit. More specifically, the received data frame can be transmitted by a ring-coupled optical transceiver of the IOLM unit over a particular optical channel/wavelength that corresponds to the destination address of the received data frame.

In yet other embodiments, the Receive Table of an IOLM unit of the network can include one or more entries that map an optical transceiver port ID for a particular ring-coupled optical transceiver to an optical transceiver port ID for an optical transceiver that provides a point-to-point optical link to another predefined IOLM unit. Such entries can be used as part of the data frame forward processing of the IOLM unit in order to forward the data frame received from a particular optical channel/wavelength for transmission by the corresponding optical transceiver over the provisioned point-to-point optical link to the other predefined IOLM unit. In this configuration, the data frames carried on the particular optical channel of the optical ring are forwarded by the IOLM unit to the other predefined IOLM unit based on the static provisioning of the IOLM units of the network.

In still other embodiments, the Transmit Table of an IOLM unit of the network can include one or more entries that map a destination address to an optical transceiver port ID for an optical transceiver that provides a point-to-point optical link to another predefined IOLM unit for point-to-point and point-to-multipoint (star) topologies. Such entries can be used as part of the ingress data frame processing of the IOLM unit in order to forward the ingress data frame for transmission by the corresponding optical transceiver over the provisioned point-to-point optical link to another IOLM unit based on the destination address of the ingress data frame.

In other embodiments, the tunable optical transceiver(s) 2 of one or more IOLMs of the network can support a digital diagnostic monitoring interface that allows real time access to device operating parameters (such as alarm and warning flags when particular operating parameters are outside of a factory set normal range. The tunable optical transceiver(s) 2 can support wavelength/frequency tuning, and the wavelength/frequency tuning support can be indicated by the transceiver description encoded employed product.

The tunable optical transceiver(s) 2 of one or more IOLMs of the network can also employ a directional serial data (electrical and optical) signal (SDA) for serial data transfer. The optical channel/wavelength tuning process of a particular tunable optical transceiver 2 can incorporate SDA in conjunction with SCL to mark the start and end of serial protocol activation. The internal memory of the tunable optical transceiver 2 can be organized as a series of 8-bit to N bit data words that can be addressed individually or sequentially. The employed multiple-wire serial interface provides sequential or random access to the 8 bit to N bit parameters, addressed from 000h to the maximum address of the memory. The optical channel/wavelength tuning process tunes the tunable optical transceiver to a designated optical channel/wavelength by writing the appropriate parameters as data words into the internal memory of the tunable optical transceiver 2. The number identifying the designated optical channel/wavelength can be derived from a number of parameters stored in the internal memory of the tunable optical transceiver 2. For example, the number identifying the designated optical channel/wavelength can be derived as follows: Designated optical channel number=1+(Desired Frequency−First Frequency)/Grid Spacing.

Figure 21:
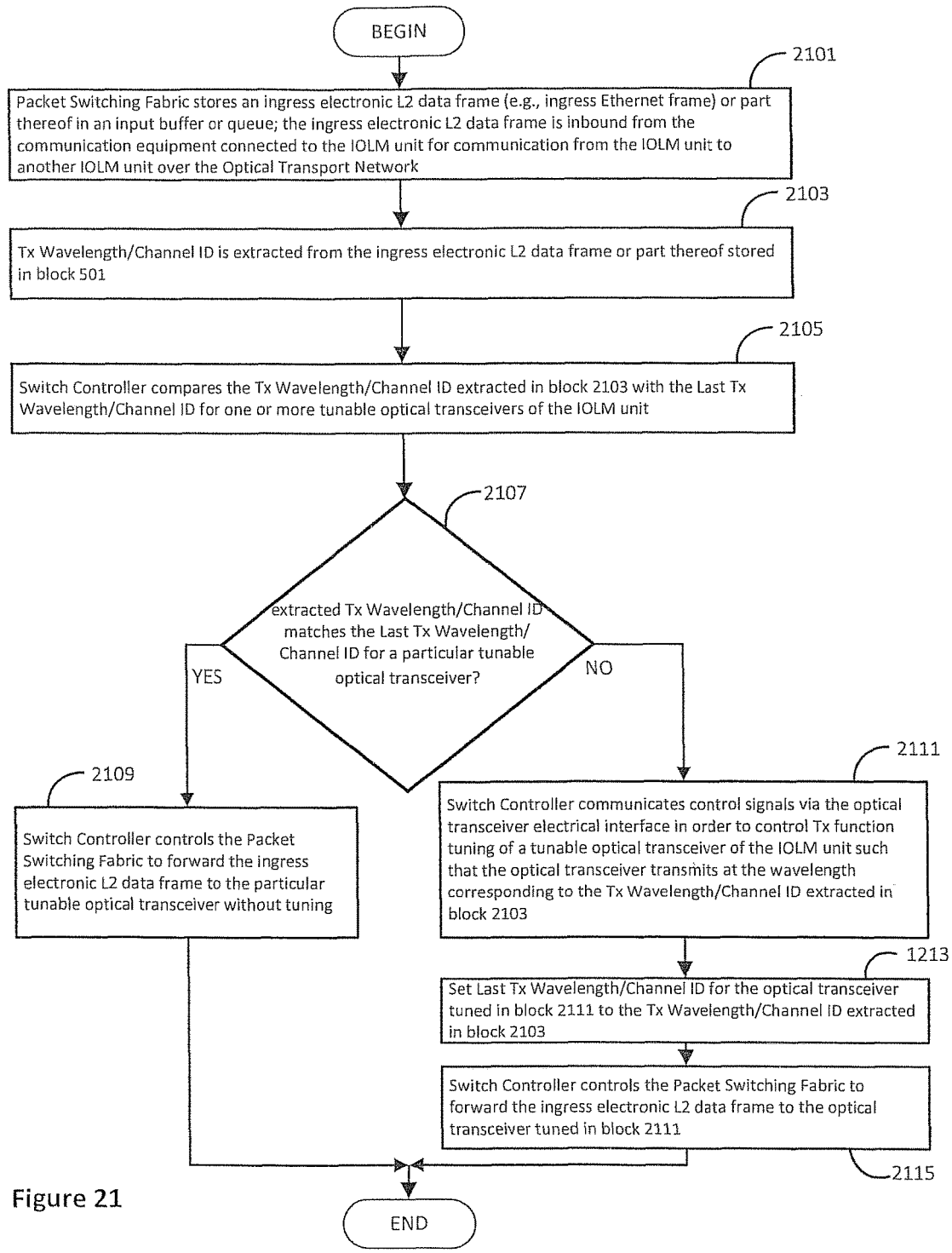
FIG. 21 is a flow chart illustrating ingress data frame processing by the IOLM unit of FIG. 13.
Figures 23A, 23B:
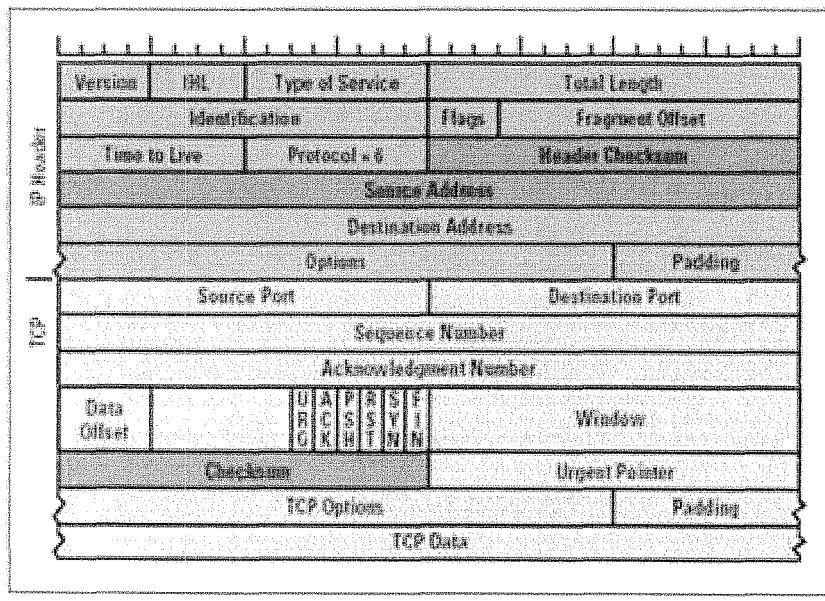
FIG. 23A is a table illustrating the structure of an 802.3 Ethernet Frame.
FIG. 23B is a table illustrating the structure of an TCP/IPv.4 packet.

In another embodiment, optical transceiver channel/wavelength tuning configuration information can be incorporated into the datagram structure of the data frames/packets that are generated by the communication equipment 7 and processed by the IOLM units 1 and carried on the Optical Transport Network 22. In this configuration, one or more predefined fields of the data frame or packet can represent an optical channel/wavelength ID or other tuning configuration information that corresponds to the destination address of the packet or frame. As illustrated in FIG. 21, the tuning configuration information can be extracted from the predefined field(s) of the data frame or packet and used by the ingress packet switching function of the respective IOLM units to dynamically tune the tunable optical transceiver of the IOLM unit and forward the data frame or packet to the specific optical port for such tuned optical transceiver for transmission of optical packet data at the corresponding optical channel/wavelength and transport of such optical packet data over the Optical Transport Network.

More specifically, FIG. 21 illustrates the operations of the packet management unit 3 of IOLM unit 1 of FIG. 13 in processing an ingress electrical L2 data frame (e.g., ingress Ethernet frame). The ingress electronic L2 data frame is inbound from the communication equipment 7 connected to the IOLM unit 1 for communication from the IOLM unit 1 to another IOLM unit over the Optical Transport Network 22. The operations begin in block 2101 where digital logic circuitry of the Packet Switching Fabric 101 stores the ingress electronic L2 data frame or part thereof in an input buffer or queue.

In block 2103, the digital logic circuitry of the Packet Switching Fabric 101 of the packet management unit 3 extracts a Tx Wavelength/Optical channel ID from the predefined field of the ingress electronic L2 data frame or part thereof stored in block 2101.

In block 2105, the Switch Controller 102 of the packet management unit 3 compares the Tx Wavelength/Channel ID extracted in block 2103 with the Last Tx Wavelength/Channel ID for one or more optical transceivers of the IOLM unit.

In block 2107, the Switch Controller 102 of the packet management unit 3 evaluates the comparison of block 2105 to determine if Tx Wavelength/Channel ID extracted in block 2103 matches the Last Tx Wavelength/Channel ID for a particular optical transceiver of the IOLM unit. If so, the operations continue to block 2109; otherwise, the operations continue to blocks 2111 to 2115.

In block 2109, the Switch Controller 102 controls the Packet Switching Fabric 101 of the packet management unit 3 to forward the ingress electronic L2 data frame to the link layer and physical devices coupled to the particular tunable optical transceiver without tuning such that the particular tunable optical transceiver transmits optical packet data corresponding to the ingress electronic L2 data frame at the wavelength corresponding to the Tx Wavelength/Channel ID extracted in block 2103 for transport on the Optical Transport Network 22, and the operations end.

In block 2111, the Switch Controller 102 of the packet management unit 3 communicates control signals via the optical transceiver electrical interface 106 in order to control Tx function tuning of a tunable optical transceiver of the IOLM unit such that the optical transceiver transmits at the wavelength corresponding to the Tx Wavelength/Channel ID extracted in block 2103.

In block 2113, the Switch Controller 102 of the packet management unit 3 sets the Last Tx Wavelength/Channel ID for the optical transceiver tuned in block 2111 to the Tx Wavelength/Channel ID extracted in block 2103.

In block 2117, the Switch Controller 102 controls the Packet Switching Fabric 101 of the packet management unit 3 to forward the ingress electronic L2 data frame to the link layer and physical devices coupled to the optical transceiver tuned in block 2111 such that the tunable optical transceiver transmits optical packet data corresponding to the ingress electronic L2 data frame at the wavelength corresponding to the Tx Wavelength/Channel ID extracted in block 2103 for transport on the Optical Transport Network 22, and the operations end.

The ingress packet switching processing of FIG. 21 can possibly require adaptation of the Layer 2 protocols (e.g., Ethernet protocols) or Layer 3 protocols (e.g., IP Protocol) that defines the datagram structure of the data frames/packets that are generated by the communication equipment 7 and processed by the IOLM units 1 and carried on the Optical Transport Network 22.

In one embodiment, a modified Transmission Control Protocol is created by modifying the standard TCP or Ethernet header format in include one or more predefined fields that represent an optical channel/wavelength ID or other tuning configuration information that corresponds to the destination address of the packet or frame. The modified Transmission Control Protocol can transmit a port activity (FPL-frequency port log, ITU channel log) signal to each port within a network. The modified Transmission Control Protocol instructs the optical transceivers to broadcast the cascading-rotating frequencies to identify and record each active and non-active port (frequency port log) of the network allowing the network to provide the correct port to port connections. Each port configuration has the ability to select different frequencies based on the tunable optical channel/frequency port location log which allows multiple pathways to be established enabling the body packet information to be transmitted to the corresponding port. For example, the modified Transmission Control Protocol used by the IOLMs of the system can be used to detect problems, records port activity, requests retransmission of lost data, rearranges out-of-order data, and even helps minimize network congestion to reduce the occurrence of the other problems. The modified Transmission Control Protocol used by the IOLMs of the system can also be used to reassemble the sequence of octets originally transmitted; it passes to the receiving application. Thus, the modified Transmission Control Protocol can be used to abstract the application's communication from the underlying networking details. Note that the IOLMs of the system can be used in network applications that do not require the reliability of a standard TCP connection. In this case, a connectionless User Datagram Protocol (UDP) can be modified with frequency channel, wavelength channel location parameters, which emphasize low-overhead operation and reduced latency rather than error checking and delivery validation.

The modified Transmission Control Protocol used by the IOLM units of the network can be used to support many of the Internet's most popular applications, including the World Wide Web (WWW), E-mail, File Transfer Protocol, Secure Shell, peer-to-peer file sharing, and some streaming media applications. The Transmission Control Protocol is optimized for accurate delivery rather than timely delivery, and therefore, it can sometimes incur relatively long delays (on the order of seconds) while waiting for out-of-order messages or retransmissions of lost messages. It is not particularly suitable for real-time applications such as Voice over IP. For such applications, protocols like the Real-time Transport Protocol (RTP) running over the User Datagram Protocol (UDP) are usually recommended instead. In this case, the modified User Datagram Protocol (UDP) can be used to support the real-time application.

The modified Transmit Control Protocol used by the IOLM units of the network can increase the reliable stream delivery service that guarantees that all bytes received will be identical with bytes sent and in the correct order while providing for real-time applications such as Voice over IP services. It also increases the reliability of transfer within network systems by combining the Transmit Control Protocols with channel selection over optical transport networks that carry WDM optical packet data.

The modified Transmit Control Protocol used by the IOLM units of the network can be carried out by the packet management unit 3 that is part of each IOLM unit 1. The packet management unit 3 can control the operations of the respective IOLM unit 1 according to a technique known as positive acknowledgment with retransmission to guarantee reliability of packet transfers. This fundamental technique requires the receive path of the optical transceiver(s) of the IOLM unit send a response with an acknowledgment message as it receives optical packet data. The sender IOLM unit keeps a record of each packet it sends and also maintains a timer from when the optical packet data was sent, and retransmits optical packet data if the timer expires before the message has been acknowledged. The timer is needed in case a packet gets lost or corrupted. The IP handles actual delivery of data; the modified Transmit Control Protocol keeps track of the injured individual units of data transmission.

The modified Transmit Control Protocol used by the IOLM units of the network system can be carried out by the packet management unit 3 that is part of each IOLM unit. The packet management unit 3 can maintain a frequency log of the wavelength/frequency optical channel and possibly channel designations for the optical connections used by the optical transceiver(s) of the respective IOLM unit. The optical channel(s) used by the optical transceiver(s) of the respective IOLM unit can be assigned by determining which port is active through a sending and receive protocol in conjunction with configuration of an optical pathway for each active port in order to determine network end-points for communications, which is identified as the Internet socket.

The IOLM units (s) as described herein can be used in conjunction with (or as replacement of) the following applications: router devices which allow multiple networks to be conducted and managed traffic between such devices, providing addresses for all computers within network, including but not limited to desktops, laptops, portable and mobile devices, firewall services, traffic management services, security restrictions, wireless access, expand connection capacity, expand broadband capacity, and operates in tandem with other network systems.

The IOLM units and the Optical Transport Network as described herein can be configured to connect diverse communication equipment 7. The IOLM units and the Optical Transport Network as described can also be configured to provide multi-frequency multi-port network bridge that processes and forwards data at the data link layer (layer 2) of the OSI model. The IOLM(s) and the Optical Transport Network as described herein can also incorporate routing in addition to bridging, which is commonly known as layer-X or multilayer switches. The IOLM(s) and the Optical Transport Network as described herein can also be configured to support various types data link layer protocols such as Fibre Channel, Dynamic Synchronous Transfer Mode, Asynchronous Transfer Mode, Ethernet and others as well as other network protocols such as Infiniband.

The IOLM units and the Optical Transport Network as described herein are also applicable in Ethernet local area networks (LANs), mid to-large sized LANs, small office/home office (SOHO) applications, all-purpose converged devices such as a residential gateway for small office/home broadband services such as DSL or cable Internet. This also includes fiber to the home FTTH applications at the Point-of-Presence (POP).

The IOLM units and the Optical Transport Network as described herein are also applicable in a number of layer-specific functionality in multilayer switch topologies such as, Layer 1 (Hubs versus higher-layer switches), Layer 2 (data link layer, may interconnect a small number of devices in a home or the office), and Layer 3 (layer-3 switch can perform some or all of the functions normally performed by a router. Layer-3 has the capability of IP multicast tracking through IGMP snooping. A Layer-3 switch can increase efficiency by delivering the traffic of a multicast group only to ports where the attached device has signaled that it wants to listen to that group. Layer-4 switching provides for network address translation and/or load distribution. Layer-7 switching distribute loads based on Uniform Resource Locator URL or by some installation-specific technique to recognize application-level transactions. Layer-7 switching may include a web cache and participate in a content delivery network.

The IOLM units and the Optical Transport Network as described herein are also applicable to Rural telecom networks for increasing the bandwidth of the networks—especially from the capacity demand from wireless carriers to support current and new cell tower build outs is creating an expansion of capacity in exhausted fiber networks.

The IOLM units and the Optical Transport Network as described herein can also increase capacity to commercial service provider's applications increasing the capacity of service through fiber networks and fiber ring networks of campus networks, long-haul applications, cell tower networks, internal and external data center network connections, and fiber to the home applications (FTTH).

There have been described and illustrated herein several embodiments of a networking architecture and method of operation that employs switching with packet delivery over pre-assigned optical channels. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as described herein.

What is claimed is:

1. An apparatus for communicating optical packet data over an optical transport network that includes a plurality of wavelength division multiplexed optical ring networks, the apparatus comprising:
   an optical switch with connections to a plurality of add multiplexers that are part of the plurality of wavelength division multiplexed optical ring networks;
   at least one port that is coupled to external communication equipment, wherein the at least one port receives a plurality of data frames each including a destination address;
   at least one tunable optical transceiver, operably coupled to the optical switch, that can be configured to transmit optical packet data to the optical switch for output to one of the plurality of add multiplexers;
   a Transmit Table memory structure that stores entries that map the destination addresses of data frames received by the at least one port to wavelength data that represents corresponding characteristic optical wavelengths and optical switch configuration data; and
   a controller, operably coupled to the at least one tunable optical transceiver and to the optical switch, that operates in response to the port receiving each particular data frame of the plurality of data frames, wherein the controller i) accesses the Transmit Table memory structure using the destination address of the particular data frame to identify a matching entry of the Transmit Table memory structure, ii) uses the wavelength data that is mapped to the destination address of the particular data frame by the matching entry to selectively tune a given tunable optical transceiver such that it transmits optical packet data representing the particular data frame at the characteristic optical wavelength corresponding to the destination address of the data frame, and iii) uses the optical switch configuration data that is mapped to the destination address of the particular data frame by the matching entry to dynamically configure the optical switch to provide an optical path from output of the given tunable optical transceiver to a select one of the plurality of add multiplexers for transport of the optical packet data representing the particular data frame over the corresponding wavelength division multiplexed optical ring network.

2. The apparatus of claim 1, further comprising:
   packet switching logic that forwards on the data frame to one or more devices coupled to the given tunable optical receiver such that the given tunable optical transceiver transmits optical packet data that represents the data frame at the characteristic optical wavelength corresponding to the destination address of the particular data frame.

3. The apparatus of claim 1, wherein:
   the controller that cooperates with an external network manager to carry out an automatic provisioning process that associates a number of destination addresses to different statically provisioned characteristic optical wavelengths, which associations are used to update the Transmit Table memory structure to store entries that map the number of destination addresses to wavelength data that represents the corresponding characteristic optical wavelengths.

4. The apparatus of claim 1, wherein:
the destination address that is part of the data frame is selected from the group consisting of: i) a Destination IP Address that is part of the header of IP packet data encapsulated by the data frame, ii) a Destination MAC address that is part of the header of the data frame or part thereof, iii) a VLAN identifier that is part of the data frame, and iv) a VLAN identifier associated with the port, protocol, Source IP address, subnet mask or other VLAN classifier associated with the data frame.

5. The apparatus of claim 1, wherein:
the at least one tunable optical transceiver comprises a plurality of tunable optical transceivers; and
the controller uses the wavelength data that is mapped to the destination address of the particular data frame by the matching entry to identify one of the plurality of tunable optical transceivers and selectively tune the one tunable optical transceiver such that it transmits optical packet data representing the particular data frame at the characteristic optical wavelength corresponding to the destination address of the data frame for output to the plurality of wavelength division multiplexed optical ring networks.

6. The apparatus of claim 1, wherein:
the at least one tunable optical transceiver has a standardized pluggable form factor.

7. The apparatus of claim 1, wherein:
the at least one tunable optical transceiver comprises at least one transmit function that transmits at one of a number of predefined characteristic optical wavelengths.

8. The apparatus of claim 1, wherein:
the select one of the plurality of add multiplexers is configured to multiplex the optical packet data representing the particular data frame onto the corresponding wavelength division multiplexed optical ring network.

9. The apparatus of claim 8, further comprising:
at least one drop device that demultiplexes optical packet data signals of a predefined characteristic optical wavelength from the wavelength division multiplexed optical signals transported on the plurality of wavelength division multiplexed optical ring networks, wherein the drop device is configured to supply optical packet data signals of the predefined characteristic optical wavelength to a receive function of an optical transceiver of the apparatus.

10. The apparatus of claim 9, wherein:
the drop device comprises an athermal array waveguide grating.

11. The apparatus of claim 9, further comprising:
packet switching logic, wherein the receive function of the optical transceiver generates data frames corresponding to the optical packet data signals of the predefined characteristic optical wavelength received from the drop device, and wherein the packet switching logic forwards the data frames to one or more devices coupled to the at least one port for delivery of the data frames to the external equipment.

12. The apparatus of claim 11, wherein:
the packet switching logic forwards the data frames to one or more devices coupled to the at least one port according to one or more entries stored in a Receive Table memory structure of the apparatus, wherein each entry of the Receive Table memory structure maps data that represents the receive function of a respective optical transceiver of the apparatus to data that represents a respective input/output port of the apparatus.

13. An optical communication network comprising:
a plurality of units that are coupled to one another by an optical transport network that includes a plurality of wavelength division multiplexed optical ring networks each unit also being coupled to external communication equipment;
wherein each given unit includes at least one port that is coupled to external communication equipment, an optical switch with connections to a plurality of add multiplexers that are part of the plurality of wavelength division multiplexed optical ring networks, at least one tunable optical transceiver, a Transmit Table memory structure, and a controller;
wherein the at least one port receives a plurality of data frames that each include a destination address;
wherein the at least one tunable optical transceiver is operably coupled to the optical switch and can be configured to transmit optical packet data to the optical switch for output to one of the plurality of add multiplexers;
wherein the Transmit Table memory structure stores entries that map the destination addresses of data frames received by the at least one port to wavelength data that represents corresponding characteristic optical wavelengths and optical switch configuration data; and
wherein the controller is operably coupled to the at least one tunable optical transceiver and to the optical switch and operates, in response to the port receiving each particular data frame of the plurality of data frames, by i) accessing the Transmit Table memory structure using the destination address of the particular data frame to identify a matching entry of the Transmit Table memory structure, ii) using the wavelength data that is mapped to the destination address of the particular data frame by the matching entry to selectively tune a given tunable optical transceiver such that it transmits optical packet data representing the particular data frame at the characteristic optical wavelength corresponding to the destination address of the data frame, and iii) using the optical switch configuration data that is mapped to the destination address of the particular data frame by the matching entry to dynamically configure the optical switch to provide an optical path from output of the given tunable optical transceiver to a select one of the plurality of add multiplexers for transport of the optical packet data representing the particular data frame over the corresponding wavelength division multiplexed optical ring network.

14. The optical communication network of claim 13, wherein:
the select one of the plurality of add multiplexers is configured to multiplex the optical packet data representing the particular data frame onto the corresponding wavelength division multiplexed optical ring network.

15. The optical communication network of claim 14, wherein:
each given unit further includes at least one drop device that demultiplexes optical packet data signals of a predefined characteristic optical wavelength from the wavelength division multiplexed optical signals transported on the plurality of wavelength division multiplexed optical ring networks, wherein the drop device is configured to supply optical packet data signals of the predefined characteristic optical wavelength to a receive function of an optical transceiver of the given unit.

16. The optical communication network of claim 15, wherein:

each given unit further includes packet switching logic, wherein the receive function of optical transceiver of the given unit generates data frames corresponding to the optical packet data signals of the predefined characteristic optical wavelength received from the drop device, and wherein the packet switching logic forwards the data frames to one or more devices coupled to the at least one port for delivery of the data frames to the external equipment.

17. The optical communication network of claim 13, further comprising:

a network manager that cooperates by network communication with the plurality of units to carry out an automatic provisioning process that associates a number of destination addresses to different statically provisioned characteristic optical wavelengths for use in configuring the plurality of units of the network.

18. The optical communication network of claim 17, wherein:

the automatic provisioning process updates a Transmit Table memory structure maintained by a respective unit to store an entry that maps the particular destination address of the data frame to data that represents the corresponding characteristic optical wavelength.

19. The optical communication network of claim 18, wherein:

the entries of the Transmit Table memory structure maintained by a respective unit are used to dynamically configure the transmit function of an optical transceiver of the respective unit to transmit packet data at a specific characteristic optical wavelength corresponding to a particular destination address that is part of a received data frame.

20. The apparatus of claim 1, wherein:

the data frames received by the at least one port are communicated by the external communication equipment with a data communication protocol involving electrical data transmission.

21. The apparatus of claim 1, wherein:

the data frames received by the at least one port are communicated by the external communication equipment with a data communication protocol involving optical data transmission.

* * * * *